US011063941B2

(12) United States Patent
Teranishi et al.

(10) Patent No.: US 11,063,941 B2
(45) Date of Patent: Jul. 13, 2021

(54) AUTHENTICATION SYSTEM, AUTHENTICATION METHOD, AND PROGRAM

(71) Applicant: NEC Corporation, Tokyo (JP)

(72) Inventors: Isamu Teranishi, Tokyo (JP); Jun Furukawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 306 days.

(21) Appl. No.: 16/085,659

(22) PCT Filed: May 12, 2017

(86) PCT No.: PCT/JP2017/018021
§ 371 (c)(1),
(2) Date: Sep. 17, 2018

(87) PCT Pub. No.: WO2017/195886
PCT Pub. Date: Nov. 16, 2017

(65) Prior Publication Data
US 2019/0116180 A1  Apr. 18, 2019

(30) Foreign Application Priority Data
May 13, 2016  (JP) .............................. JP2016-097422

(51) Int. Cl.
*H04L 29/06* (2006.01)
*H04L 9/32* (2006.01)
(Continued)

(52) U.S. Cl.
CPC .......... *H04L 63/0876* (2013.01); *G06F 21/31* (2013.01); *G06F 21/44* (2013.01);
(Continued)

(58) Field of Classification Search
CPC .......... G06F 21/31; G06F 21/44; G06F 21/32; H04L 9/085; H04L 9/3234; H04L 9/3221;
(Continued)

(56) References Cited

U.S. PATENT DOCUMENTS

2008/0133912 A1* 6/2008 Yamamoto ............ H04L 9/3221
713/168
2009/0276622 A1* 11/2009 Matsuo ................... G06F 21/31
713/155
(Continued)

FOREIGN PATENT DOCUMENTS

| JP | 2011-34259 A | 2/2011 |
|---|---|---|
| JP | 2011-238083 A | 11/2011 |
| WO | 2015-114947 A1 | 8/2015 |

OTHER PUBLICATIONS

FIDO UAF Architectural Overview, FIDO Alliance Proposed Standard Dec. 8, 2014 (9 pages total).
(Continued)

*Primary Examiner* — Alexander Lagor
*Assistant Examiner* — Vu V Tran
(74) *Attorney, Agent, or Firm* — Sughrue Mion, PLLC

(57) ABSTRACT

An authentication system is provided with: a user device; user side assistance device(s) to assist user authentication that authenticates a user of the user device, and apparatus authentication that authenticates the user device; and an apparatus authentication server device to perform apparatus authentication in association with the user device. The user side assistance device(s) use distributed shares of verification information to perform multi-party computation for user authentication in association with the user device, and use distributed shares of a secret key generated by the user device, to perform multi-party computation for apparatus authentication in association with the user device.

19 Claims, 19 Drawing Sheets

(51) Int. Cl.
  H04L 9/08    (2006.01)
  G06F 21/32   (2013.01)
  G06F 21/31   (2013.01)
  G09C 1/00    (2006.01)
  G06F 21/44   (2013.01)
  H04L 9/30    (2006.01)

(52) U.S. Cl.
  CPC ............... *G09C 1/00* (2013.01); *H04L 9/085* (2013.01); *H04L 9/30* (2013.01); *H04L 9/3221* (2013.01); *H04L 9/3234* (2013.01); *H04L 9/3242* (2013.01); *H04L 63/06* (2013.01); *H04L 2209/46* (2013.01)

(58) Field of Classification Search
  CPC ..... H04L 9/3242; H04L 9/30; H04L 63/0876; H04L 63/06
  See application file for complete search history.

(56) References Cited

U.S. PATENT DOCUMENTS

| | | | |
|---|---|---|---|
| 2016/0283737 A1* | 9/2016 | Soman | H04L 9/3228 |
| 2016/0330018 A1* | 11/2016 | Miyata | H04L 9/00 |
| 2017/0104745 A1* | 4/2017 | Camenisch | H04L 9/085 |
| 2018/0019868 A1* | 1/2018 | Pe'er | H04L 9/14 |

OTHER PUBLICATIONS

Haruna Higo et al., "A Private Fingerprint Matching Scheme with Small Templates", The 32nd Symposium on Cryptography and Information Security (SCIS 2015), IEICE, 2015 (8 pages total).

Michael Ben-Or et al., "Completeness Theorems for Non-Cryptographic Fault-Tolerant Distributed Computation", (Extended Abstract), STOC, 1988, pp. 1-10 (10 pages total).

Oded Goldreich et al., "How to Play Any Mental Game or A Completeness Theorem for Protocols with Honest Majority," (Extended Abstract), STOC, 1987 (12 pages total).

Jesper Buus Nielsen et al., "A New Approach to Practical Active-Secure Two-Party Computation," In CRYPTO 2012, Springer (LNCS 7417), pp. 681-700, 2012 (42 pages total).

Ivan Damgard et al., "Constant-Overhead Secure Computation of Boolean Circuits using Preprocessing", In TCC, pp. 621-641, 2013 (23 pages total).

Ivan Damgard et al., "Multiparty Computation from Somewhat Homomorphic Encryption," CRYPTO 2012, pp. 643-662 (46 pages total).

Andrew Chi-Chih Yao, "How to Generate and Exchange Secrets,", (extended abstract), In Foundations of Computer Science, 1986, 27th Annual Symposium, pp. 162-167, IEEE, 1986 (6 pages total).

Donald Beaver et al., "The Round Complexity of Secure Protocols," (Extended Abstract), In Proceedings of the 22nd annual ACM symposium on Theory of Computing, pp. 503-513, ACM, 1990 (11 pages total).

Adi Shamir, "How to Share a Secret," Communications of the ACM 22 (11): pp. 612-613, 1979 (2 pages total).

International Search Report dated Aug. 15, 2017 issued by the International Searching Authority in International Application No. PCT/JP2017/018021.

Written Opinion dated Aug. 15, 2017 issued by the International Bureau in International Application No. PCT/JP2017/018021.

* cited by examiner

AUTHENTICATION SYSTEM, AUTHENTICATION METHOD, AND PROGRAM

CROSS-REFERENCE TO RELATED APPLICATIONS

This application is a National Stage Entry of PCT/JP2017/018021 filed on May 12, 2017, which claims priority from Japanese Patent Application 2016-097422 filed on May 13, 2016, the contents of all of which are incorporated herein by reference, in their entirety. The present invention relates to an authentication system, an authentication method and a program, and in particular relates to an authentication system, an authentication method and a program that perform user authentication and apparatus authentication to authenticate a user and a user device, respectively.

BACKGROUND

Technical Field

As an example of a web service, web banking in which money is transferred is becoming widely used. When the web service in question is used, a user can use the service by authentication of the user by the server that provides the service. The server that performs the authentication is called an "authentication server" below.

In an existing web service, a user is authenticated by sending user unique authentication information such as a password or biometric information to the authentication server that provides the web service, from the user's own terminal.

In these existing authentication methods, confirmation of the user being the person in question is made by comparing authentication information transmitted by the user at a time of authentication to the authentication server, with information (referred to below as "verification information") recorded by the user in the authentication server in advance.

In a case of a simple password for example, the user records a password P as verification information in the authentication server in advance. When authentication is performed later, the user sends a password P' to the authentication server again. In a case where P=P' the authentication server determines that this is the user in question and accepts authentication, and in other cases the authentication is rejected.

On the other hand, in a case of biometric authentication, the user records a characteristic amount C of biometric information such as face, finger print or iris, as verification information in the authentication server. When authentication is performed later, the user sends a characteristic amount C' of the biometric information to the authentication server again. In a case where the "distance" (for example, Hamming distance) between the characteristic amount C and C' is less than or equal to a determined threshold, the authentication server accepts the authentication, and in other cases rejects it.

As related technology, a FIDO (Fast Identify Online) system is described in Non-Patent Literature (NPL) 1. Non-Patent Literature 2 describes an encrypted communication method. Non-Patent Literature 3 describes MPC: Multi-Party Computation outside of a Zero-Knowledge Interactive Proof (ZKIP) system and a Message Authentication Code (MAC) system. Non-Patent Literature 4 describes the ZKIP system. Non-Patent Literature 5-7 describes the MAC system. Non-Patent Literature 8 describes Secure Function Evaluation. Non-Patent Literature 9 describes a Garbled Circuit method. Non-Patent Literature 10 describes Shamir's secret sharing method.

[NPL 1]
FIDO UAF Architectural Overview. FIDO Alliance Proposed Standard 8 Dec. 2014.
[NPL 2]
Higo Haruna, Isshiki Toshiyuki, Mori Kengo, Obana Satoshi, "A Private Fingerprint Matching Scheme with Small Templates" The 32nd Symposium on Cryptography and Information Security (SCIS 2015), IEICE, 2015.
[NPL 3]
Michael Ben-Or, Shafi Goldwasser, Avi Wigderson, "Completeness Theorems for Non-Cryptographic Fault-Tolerant Distributed Computation," (Extended Abstract), STOC 1988 1-10.
[NPL 4]
O. Goldreich, S. Micali and A. Wigderson, "How to play any mental game or a completeness theorem for protocols with honest majority," STOC 1987.
[NPL 5]
J. B. Nielsen, P. S. Nordholt, C. Orlandi, and S. S. Burra, "A New Approach To Practical Active-Secure Two-Party Computation," In CRYPTO 2012, Springer (LNCS 7417), pages 681-700, 2012.
[NPL 6]
I. Damgard and S. Zakarias, "Constant-Overhead Secure Computation of Boolean Circuits using Preprocessing," In TCC, pages 621-641, 2013.
[NPL 7]
Ivan Damgard, Valerio Pastro, Nigel P. Smart, Sarah Zakarias, "Multiparty Computation from Somewhat Homomorphic Encryption," CRYPTO 2012: 643-662.
[NPL 8]
A. Yao, "How to generate and exchange secrets," In Foundations of Computer Science, 1986, 27th Annual Symposium on, pages 162-167, IEEE, 1986.
[NLP 9]
D. Beaver, S. Micali, and P. Rogaway, "The round complexity of secure protocols," In Proceedings of the 22nd annual ACM symposium on Theory of Computing, pages 503-513, ACM, 1990.
[NPL 10]
Shamir, Adi (1979), "How to Share a Secret," Communications of the ACM 22 (11): 612-613.

SUMMARY

The entire disclosed contents of the abovementioned Non-Patent Literature are incorporated herein by reference thereto. The following analysis is given according to the present inventor.

According to existing authentication methods described above, when an authentication server side causes an information leak, there is a risk that user unique verification information will pass into the hands of an unauthorized party. In many authentication systems such as in password authentication or the like, it is easy to reproduce authentication information from verification information. Therefore, by using the reproduced authentication information the unauthorized party can impersonate a user and use a web service provided by the authentication service.

There is a high probability of a user using the same authentication information with multiple web services. On such an occasion, when verification information is leaked by 1 web service, a problem occurs in that an unauthorized party may perform impersonation in all web services used by the user.

In particular in a case of using biometric information as authentication information, a major problem may occur. This is because since a user's biometric information does not change throughout one's life, there is a risk of the user being impersonated forever by one information leak.

A manager of an authentication server that provides a web service can view all the data in an authentication server including user verification information. Therefore, the authentication server manager can easily perform impersonation by obtaining user verification information.

[Simple Problem Workaround Strategy]

With regard to methods for avoiding this problem there are several proposals, but none of them are conclusive solutions. For example, a typical method of avoiding this problem in password authentication is to manage, not a password P itself of a user on the authentication server side, but a hash value h=Hash(P) of the password. In this way, it is not possible for an unauthorized party to directly obtain authentication information P by reading data of the authentication server side.

However, the method in question does not completely solve the abovementioned problem. This is because in a case of successfully reading data on the authentication server side, an unauthorized party can obtain hash values h. Since the entropy of authentication information such as passwords or biometric information is low, identification is possible by exhaustive search of passwords P satisfying h=Hash(P). In particular where the unauthorized party is the manager of the authentication server, since obtaining the hash values h is easy, it is not possible to maintain secrecy of authentication information with regard to the authentication server manager.

As in the abovementioned attack method, a method of attack that identifies authentication information by unauthorized use of a server side device only, not by communication with a user side device, is referred to below as "server side offline attack". With an attack type where communication with a user side device is necessary for every P search, by deciding an upper limit to the number of communications with regard to a user side device, a defense is possible such that an unauthorized party cannot make an exhaustive search. However, in the case of a server side offline attack, there is absolutely no communication with a user side device. In this case, it is a big problem since the unauthorized party can make an exhaustive search of P without a user being aware of it.

Another solution method is known in which, instead of storing verification information P directly in the authentication server, encrypted text Enc(P) in which P in encrypted is stored in the authentication server. According to this method, even if the encrypted text stored in the authentication server is stolen by an unauthorized party, it is possible to hide the P information.

However, with this solution method a problem occurs with regard to where the secret key for decrypting Enc(P) is stored. If the secret key is stored in the authentication server itself, an unauthorized party that intrudes into the authentication server could obtain both Enc(P) and the secret key, and could easily reconstruct the verification information P. In addition, as described above, the unauthorized party could reproduce user authentication information from P. This means that the solution method in question is vulnerable to server side offline attack.

As described above, it is not easy to guarantee security against server side offline attack. In particular, in a case where an unauthorized party is the authentication server manager himself, there is a very big problem in that the unauthorized party could easily execute a server side offline attack.

[Existing Encryption Technology]

Several inventions have already been proposed with regard to authentication. In preparation for describing these existing inventions, a description is given concerning secret sharing, Multi-Party Computation (MPC) and Secure Function Evaluation, which are existing encryption technologies.

[Secret Sharing]

Secret sharing is technology for increasing data secrecy by "distributed shares" of secret data with a plurality of devices.

Secret sharing involves one "sharing device", a plurality of "share holding devices" and one "reconstruction device". It is to be noted that the sharing device and the reconstruction device may be the same, or one of the share holding devices and the sharing device or the reconstruction device may be the same. Below, the sharing device, the share holding devices and the reconstruction device are described for a case where they are separate devices.

Here, the number of share holding devices is M.

The sharing device receives secret data K as input, uses K (and M) to execute a "sharing means", and obtains "shares" $s(1), \ldots, s(M)$ as output of the sharing means. For i=1, ..., M, the sharing device transmits share s[i] to the i-th share holding device.

In a case where the secret data K is necessary, the reconstruction device receives shares from several share holding devices, and by inputting these shares and executing the "reconstruction means", it is possible to reconstruct the secret data K.

A condition known as "secret sharing security condition" exists in the secret sharing, and satisfies the following.

As long as the set of devices hijacked by an unauthorized party satisfies the secret sharing security condition, the unauthorized party cannot know any information of the secret data K.

As long as the set of devices hijacked by an unauthorized party satisfies the secret sharing security condition, the reconstruction means can reconstruct the secret data K by sending shares of devices not hijacked by the unauthorized party to the reconstruction device.

[Shamir's Secret Sharing]

Shamir's secret sharing is one representative method of secret sharing (Non-Patent Literature 10).

In Shamir's secret sharing method, one value t≤M is fixed, one finite field F having t+1 or more as base is fixed, and furthermore base $a[0], \ldots, a[M]$ of F is fixed.

In Shamir's secret sharing method, secret K is a base of the finite field F. In the sharing means of the Shamir secret sharing method, a t dimension polynomial f satisfying $f(a[0])=K$ is randomly selected, and $s[1]=f(a[1]), \ldots, s[M]=f(a[M])$.

The reconstruction device obtains t shares, $s[i1], \ldots, s[it]$ among these shares. Thereupon, since the reconstruction device can uniquely determine the polynomial f that satisfies $s[ij]=f(a[ij])$ for arbitrary $j=1, \ldots, t$, it is possible to reconstruct a secret $K=f(a[0])$ using the polynomial f.

In Shamir's secret sharing method the secret sharing security condition is the condition that "the number of devices hijacked by an unauthorized party is t−1 or less". Therefore, Shamir's secret sharing method satisfies the following.

If the number of devices hijacked by the unauthorized party is t−1 or less, the unauthorized party cannot obtain any information of the secret K.

If the number of devices hijacked by the unauthorized party is t−1 or less, the reconstruction means can reconstruct the secret K by the reconstruction means, by sending shares of devices not hijacked by the unauthorized party to the reconstruction device.

[Multi-Party Computation (MPC)]

With regard to methods of improving authentication security, there are a number of other proposals. In order to describe these, a description is given of Multi-Party Computation (MPC) which is an elemental technology thereof.

MPC is a method of computing data $f(x[1], \ldots, x[M])$ of a computational result, by multiple devices (below, MPC devices) mutually communicating, while preserving confidentiality of given data $x[1], \ldots, x[M]$. Here, f is a predetermined function. In the present specification, below, the function f is called a computation function of MPC.

Various methods are known for multi-party computation. Many of these methods are also secure in the case of collusion in unauthorized actions by a plurality of devices. That is, as long as the group of colluding devices satisfies a predetermined condition (below, referred to an "MPC" security condition. For example, a condition that "the number of colluding devices is less than a threshold k), the following is guaranteed. That is, the confidentiality of data $x[1], \ldots, x[N]$ is guaranteed, and data y outputted as a computation result of MPC is guaranteed to be equal to $f(x[1], \ldots, x[N])$.

On the other hand, in a case where a group of colluding devices does not satisfy the MPC security condition, there is a possibility of a leak of information of data $x[1], \ldots, x[N]$ to the colluding devices, and furthermore there is a possibility that data y outputted as a computation result of MPC will have a value different from $f(x[1], \ldots, x[N])$.

In particular, in a case where all devices participating in MPC are colluding, all information of the data $x[1], \ldots, x[N]$ will leak to the colluding devices.

[MPC Using Secret Sharing]

In many existing MPCs, secret sharing is used as a subroutine. In this type of MPC, a secret sharing "sharing device" and "reconstruction device" are present outside of the abovementioned MPC device. The MPC device corresponds to a share holding device in secret sharing. It is to be noted that consideration is also given to a case where the sharing device and the reconstruction device are the same, a case where the sharing device and a MPC device are the same, or a case where the reconstruction device and a MPC device are the same. However, in what follows a description is given concerning a case where the sharing device, the MPC devices and the reconstruction device are separate devices. The same applies also to cases outside of this.

The MPC is performed by the following means. Below the number of MPC devices is M.

A means of computing function f is inputted in advance (in the form of a circuit diagram or an algorithm) to the respective MPC devices.

First, the sharing device receives secret data $x[i]$ for $i=1, \ldots, N$, and creates "shares" $s[i,1], \ldots, s[i, M]$ of the secret data $x[i]$ by executing a "sharing means" for the secret sharing. Next, the sharing device transmits the shares $s[i,j], \ldots, s[N,j]$ to a j-th MPC, for $j=1, \ldots, M$.

Next, the MPC devices execute "MPC means" while communicating with one another, and obtain "output shares" as a computation result. The output share obtained by the j-th MPC device is $t[j]$. The 1st, . . . , M-th MPC device respectively send output shares $t[1], \ldots, t[M]$ to the reconstruction device.

The reconstruction device obtains "MPC output" y by executing the "reconstruction means" using $t[1], \ldots, t[M]$.

In a case where no unauthorized action is done by any of the sharing devices, the MPC devices and the reconstruction device, the MPC output y is in agreement with $f(x[1], \ldots, x[N])$.

The MPC described above has a secret sharing security condition in which a secret sharing method is decided, which is used as a subroutine. The MPC security condition guaranteeing MPC security does not necessarily match the secret sharing security condition. However, the secret sharing security condition is a necessary condition of the MPC security condition. That is, if the MPC security condition holds true, the secret sharing security condition holds, but the converse does not necessarily hold true.

For example, the secret sharing security condition is the condition: "the number of colluding devices is less than a threshold k", and the MPC security condition is the condition: "the number of colluding devices is less than a threshold t". At this time, $k \geq t$ holds true, but $k=t$ does not necessarily hold true.

[MPC Using Pre-Computation]

In Non-Patent Literature 5 to 7, MPC efficiency is realized by computing some data required for MPC computation in advance.

In the present specification, details of the advance computation are not described. However, by giving consideration to a case where advance computed data is prepared by some method (for example, a method from Non-Patent Literature 5 to 7), wording to the effect of "if there is advance computed data, it is used" is added to the exemplary embodiments.

[ZKIP System, MAC System]

Many existing MPCs using secret sharing have a mechanism such that it is not possible to steal secret information by an MPC device hijacked by an unauthorized party operating fraudulently, nor to falsify a computation result.

Known examples of this type of mechanism are Zero-Knowledge Interactive Proof (ZKIP) system (Non-Patent Literature 4) and Message Authentication Code (MAC) system (Non-Patent Literature 5 to 7). Both systems are provided with a "legitimacy proof creation part" for creating a "legitimacy proof" for indicating that the computation performed by an MPC device is not fraudulent, and a "legitimacy verification part" for verifying the legitimacy proof. However, with regard to the method of creating the legitimacy proof and the verification method thereof, the ZKIP system and the MAC system are different. Furthermore, device configuration itself, which is provided with the "legitimacy proof creation part" and the "legitimacy verification part", is common between the ZKIP system and the MAC system.

The device configuration of the MPC device for the ZKIP system and the MAC system is as follows:

input part
communication part
computation part
   MPC execution part
   legitimacy proof part
   legitimacy proof verification part output part In the ZKIP system and the MAC system, the secret sharing is used as a subroutine, and the "sharing device" for secret sharing outside of the MPC devices and the "reconstruction device" are used.

In the ZKIP system and MAC system, a means for computing a function f in advance is inputted in the form of a circuit diagram to each MPC device. The circuit diagram for the function f is configured from components such as AND gate or OR gate, and a "component number" is allocated to each component. Below, in order to simplify the description, it is assumed that the closer a component is to an input gate the smaller the component number allocated thereto. However, this assumption is not essential.

In the following, a description is given assuming that some sort of advance computation data is prepared. However, by ignoring the description related to the advance computation data in the following description, a similar description is applicable also to an MPC without advance computation.

The ZKIP system and the MAC system both operate as below.

For $j=1, \ldots, M$, the j-th MPC device receives shares $s[1,j], \ldots, s[N,j]$ of secret $x[1], \ldots, x[N]$ from the sharing device using an input part.

For each component R configuring the circuit diagram of the function f, the following is executed in order from lower component number.

Each MPC device inputs component R, a share corresponding to an input terminal of the component R, and advance computation data (if it exists) into the MPC execution part. Processing of the MPC execution part is executed while performing mutual communication by using a communication part.

By each MPC device executing processing of the legitimacy proof part with input of component R, a share corresponding to the input terminal of the component R, advance computation data (if it exists) and a random number (if it exists) used in execution of the MPC execution part, the legitimacy proof is created and the legitimacy proof is transmitted to other MPC devices.

By the respective MPC devices inputting the component R and the legitimacy proof to the legitimacy proof verification part, the legitimacy of the legitimacy proof of another MPC device is verified.

A share corresponding to an output terminal of the circuit diagram of the function f is outputted using an output part.

The outputted share is sent to the reconstruction device. The reconstruction device reconstructs the output of the MPC from the share that has been sent.

In the above, the description assumes that upon the legitimacy proof generated by the legitimacy proof part of the MPC device being received by another MPC device, the legitimacy proof is verified using the legitimacy proof verification part. However, among existing MPC systems, as in the system described in Non-Patent Literature 4, this is accompanied by intercommunication several times between the legitimacy proof part and the legitimacy proof verification part.

As in the system described in Non-Patent Literature 6, the MPC is made efficient by verifying legitimacy proofs collectively at the end.

However, besides when and by what method the processing of the legitimacy proof part and the legitimacy proof verification part is executed, the above described flow is applicable to both systems.

[Problems with ZKIP System and MAC System]

The ZKIP system and the MAC system have the following problems.

Execution speed is slow, and communication volume in both directions between servers and user/server is large.

In an authentication system, many users use the system. Therefore, in order to execute all processing of these users, high performance is required of the system. Existing systems have trouble with regard to execution speed and communication volume. Therefore, in order to realize the performance required by the authentication system, high performance is required of a server used by the system, or a circuit is required to be high speed. At this time, a problem occurs in that costs necessary for building the system increase.

For a user terminal, it is assumed that a terminal is used with low communication performance and computational power as in a smart phone. Therefore, there is a possibility of not being able to use a system that requires high execution speed and large communication volume as in the ZKIP system or MAC system.

[Secure Function Evaluation and Garbled Circuit (GC) Method]

A Secure Function Evaluation is a system that uses two devices. Specifically, the first device holds (a circuit diagram of) function f, and the second device starts from a state of holding secret information $x[1], \ldots, x[N]$, and a goal is that the first device obtains function values $f(x[1], \ldots, x[N])$ (Non-Patent Literature 8).

In Secure Function Evaluation, the second device cannot completely know the information of the function f, and the first device cannot know any of the information of the secret information $x[1], \ldots, x[N]$.

The Garbled Circuit (GC) method (Non-Patent Literature 9) is representative of Secure Function Evaluation. In the GC method, a device on the side holding function f creates "GC (Garbled Circuit)" data, and the side holding secret information $x[1], \ldots, x[N]$ computes a GC. Below, the former device is called "GC creation device" and the latter device is called "GC execution device".

The GC creation device is provided with the following units.
input part
GC generation part
GC output generation part
transmission part
output part Meanwhile the GC execution device is provided with the following units.
input part
GC execution part
transmission part The GC operates as below.

The GC creation device creates the GC and key data K by executing processing of the GC generation part with the function f as input, and transmits the GC to the GC execution device.

By executing processing of the GC execution part with the GC and the secret information $x[1], \ldots, x[N]$ as input, the GC execution device obtains "GC output" E, and transmits the output E of the GC to the GC creation device.

By executing processing of the GC output generation part with the GC output E and key data K as input, the GC creation device obtains output y, and outputs the output y.

In the GC method, the following property is established.

(For example, even where the GC execution device is hijacked by an unauthorized party) as long as the GC creation device is not hijacked by the unauthorized party, the output y matches f(x[1], ..., x[N]).

[Problems with GC Method]

As described later, in the disclosure of the present application, upon performing appropriate improvement in the GC method, it is used as an MPC. However, since the following problems exist in the GC method itself, application is not possible to the disclosure of the present application as things are.

The GC method itself is only a method for realizing a Secure Function Evaluation, and is not a method for realizing MPC. Therefore, it is presumed that the GC execution device knows the secret information x[1], ..., x[N]. However, since in the disclosure of the present application the GC method is used as an MPC, it is necessary to also guarantee concealment of the secret data x[1], ..., x[N].

In the GC method, as long as the GC creation device is not hijacked by an unauthorized party, it is possible to guarantee that output y matches f(x[1], ..., x[N]). However, in a case where the GC creation device is hijacked by an unauthorized party, there is no guarantee.

[Existing Authentication Technology and Problems Thereof]

The description concerning technology used in the disclosure of the present application and in existing systems described above is finished. A description is given below of existing methods concerning authentication.

[FIDO System]

As one method of solving problems related to authentication described above, the standards body FIDO (Fast Identify Online) that performs standardization of online authentication technology proposes an authentication method called UAF (Universal Authentication Framework) (Non-Patent Literature 1). Below, this authentication method is called "FIDO system".

A feature of the FIDO system is the assumption of the existence of an area of high security called a "secure area" in a user device. In the FIDO system, "user authentication" that authenticates the identity of a user, and "apparatus authentication" that authenticates a user's apparatus are performed separately. Verification information used in authenticating the identity of the user and a secret key used in authenticating the user's apparatus are stored in this secure area.

FIG. 1 is a block diagram showing an example of a configuration of the FIDO system.

In performing authentication the following advance preparation is necessary.

The user device 11 has a user information acquisition part 111. The user information acquisition part 111 provides an acquisition part 1111 that acquires 1 or a plurality of user authentication information items such as face information, finger print information, iris information and the like. Since these verification information items are recorded in authentication, the user device 11 acquires user unique information (face information, finger print information, iris information and the like) from the user 13, using the acquisition part 1111. The user device 11 obtains verification information by inputting the acquired user unique information to a verification information derivation part 11211. The recorded verification information is stored in a storage part 1122 of the secure area 112 ("FIDO AUTHENTICATOR" in Non-Patent Literature 1).

The user device 11 uses a key pair generation part 11214 of the secure area 112 to perform key generation (for some public key authentication system decided in advance). The user device 11 stores a generated public key pk and a secret key sk in the storage part 1122 of the secure area 112, and transmits the public key pk to an apparatus authentication server device 12. The apparatus authentication server device 12 stores the received public key pk in its own public key database 1221.

When performing authentication, first the apparatus authentication server device 12 designates which authentication method to use to perform authentication, using a user authentication method selection part 1211.

The user device 11 receives user unique information for the designated authentication method, from the user 13 using the acquisition part 1111. The user device 11 obtains authentication information by inputting the acquired user unique information to an authentication information derivation part 11212.

The user device 11 uses inputted authentication information and verification information stored in the storage part 1122 to execute processing of the user authentication part 11213 of the secure area 112. Thus, the user device 11 confirms the identity of the user 13.

In a case where the user authentication part 11213 rejects authentication of the user 13, the user device 11 communicates that authentication has been rejected using a notification part 114 and finishes the operation.

On the other hand, in a case where the user authentication part 11213 accepts authentication of the user 13, the user device 11 executes processing of the apparatus authentication part 11215 using the secrete key sk and the public key pk stored in the storage part 1122 of the secure area 112. The apparatus authentication server device 12 receives this and executes processing of the apparatus authentication verification part 1212 using the public key pk of the user device 11 stored in the public key database 1221. In this way, the apparatus authentication server device 12 receives or rejects authentication of the user device 11. Finally, the user device 11 communicates to the user 13 that authentication has been accepted or rejected using the notification part 114, and finishes operations.

It is to be noted that when the apparatus authentication part 11215 and the apparatus authentication verification part 1212 communicate, the communication is via a user device front end 1131 and a server device front end 1231. These front ends are front ends standardized according to a communication method according to FIDO and are widely used.

[Problems of the FIDO System]

There is a problem in the FIDO system in that the secure area 112 is assumed to exist (or is a prerequisite) in the user device 11.

For example, in a case where there is an intrusion into the secure area 112 by a malware infection or the like, there is a possibility that verification information or a secret key stored there will be leaked.

In particular, since an unauthorized party can impersonate the user 13 to perform a web service by using the leaked verification information or secret key, a serious problem may occur.

For a corporation that develops user applications using authentication of the FIDO system, there is a risk of damaging the corporate image, with a decrease in profits accompanying this, and furthermore of responsibility for compensation expenses with respect to the user 13.

In addition, in a case of using biometric authentication as the authentication, there may be a significant danger since the verification information is highly sensitive information that is biometric information.

According to the above reasons, a system assuming the existence of the secure area 112 in the user device 11, as in the FIDO system, is not desirable.

[Server Side MPC System]

A description is given concerning an embodiment of an authentication system using MPC. In the following this authentication system is called a "server side MPC system".

FIG. 2 is a block diagram showing an example of a device configuration of the server side MPC system. Below, the number of server side user authentication MPC devices 22 is M.

The basic idea of the server side MPC system is that verification of legitimacy of authentication by 1 server device with a normal authentication system, is verification of legitimacy of authentication while performing MPC using M "server side user authentication MPC devices 22".

In total there are M server side user authentication MPC devices 22. Thus the devices are distinguished by attaching "[j]" to the end in a reference symbol of a unit included in the j-th server side user authentication MPC device 22 below. For example, use is made of the expression "distributed user verification information database 2221[j] of the server side user authentication MPC de 22[j]".

FIG. 2 is a diagram showing a case of providing only 1 authentication method. It is to be noted that similar to the case of the FIDO system, it is also possible to provide a plurality of authentication methods and to expand to select an authentication method from among them.

In the FIDO system, user authentication and apparatus authentication are performed. Meanwhile, in the server side MPC system only user authentication is performed. It is to be noted that an improvement is also possible by performing apparatus authentication in the server side MPC system. However, even with this improvement, problems of the server side MPC system are not solved as described later. In what follows, a description concerning a case of performing apparatus authentication in the server side MPC system is omitted.

In the server side MPC system, the user device 21 fulfills the role of a sharing device in MPC. The user device 21 is provided with an authentication information distribution part 2123 that shares authentication information of the user 23, and a verification information distribution part 2124 that shares verification information.

The server side user authentication MPC device 22 is an MPC device for MPC. However, only one server side user authentication MPC device 22[1] takes the role of reconstruction device, and it has an authentication result reconstruction part 2212[1] for reconstructing an authentication result that is the output of the MPC.

A computation function of the MPC in the server side MPC system is an authentication function for user authentication. That is, the function f receives authentication information and verification information of the user 23 as input, and outputs some type of data indicating that authentication has been accepted or rejected (for example, 1 for acceptance, 0 for rejection). The server side MPC system is performed as below.

First, as advance preparation, the user device 21 receives user unique information from the user 23 using the acquisition part 2111 of the user information acquisition part 211. Next, the user device 21 derives verification information from the user unique information using the verification information derivation part 2121, and inputs the derived verification information to the verification information distribution part 2124 to obtain shares v[1], . . . , v[M] of the verification information. Next, the user device 21 uses a proprietary specification communication part 2131 to send a share v[1] to the server side user authentication MPC device 22[1], . . . , and a share v[M] to the server side user authentication MPC device 22[M].

The server side user authentication MPC device 22[1], . . . , the server side user authentication MPC device 22[M] respectively use a proprietary specification communication part 2231[1], . . . , a proprietary specification communication part 2231[M] to receive shares v[1], v[M], and respectively store them in a distributed user verification information database 2221[1], . . . , distributed user verification information database 2221[M].

In receiving the authentication, the user device 21 receives user unique information from the user 23 using the acquisition part 2111 of the user information acquisition part 211. Next, the user device 21 derives authentication information from the user unique information using the authentication information derivation part 2122, and creates shares s[1], . . . , s[M] of the authentication information by inputting the derived authentication information to the authentication information distribution part 2123. Next, the user device 21 uses a proprietary specification communication part 2131 to send a share s[1] to the server side user authentication MPC device 22[1], . . . , and a share s[M] to the server side user authentication MPC device 22[M].

The server side user authentication MPC device 22[1], . . . , the server side user authentication MPC device 22[M] respectively use the proprietary specification communication part 2231[1], . . . , the proprietary specification communication part 2231[M] to receive shares s[1], . . . , s[M]. Next, the server side user authentication MPC device 22[1], . . . , the server side user authentication MPC device 22[M] respectively read shares v[1], . . . , v[M] of verification information of the user 23 from the distributed user verification information database 2221[1], . . . , the distributed user verification information database 2221[M], and then execute processing of user authentication MPC part 2211[1], . . . , user authentication MPC part 2211[M] while performing intercommunication using shares v[1], . . . , v[M] and shares s[1], . . . , s[M]. In this way, the server side user authentication MPC device 22[1], . . . , server side user authentication MPC device 22[M] respectively obtain shares t[1], . . . , t[M] of MPC output.

The server side user authentication MPC device 22[2], . . . , the server side user authentication MPC device 22[M] respectively use the proprietary specification communication part 2231[2], . . . , the proprietary specification communication part 2231[M] to respectively transmit shares t[2], . . . , t[M] to the server side user authentication MPC device 22[1]. The server side user authentication MPC device 22[1] receives these shares using the proprietary specification communication part 2231[1], and by inputting shares t[1], . . . , t[M] and executing processing of the authentication result reconstruction part 2212[1], comprehends whether the authentication result is accepted or rejected.

[Problems of Server Side MPC System]

There are various standards for communication protocols in normal user authentication. However, all the communication protocols assume 1 to 1 communication for user device and server device. In actuality, the communication protocol proposed by FIDO also assumes 1 to 1 communication for user device and server device. Specifically, the user device front end 1131 and the server device front end 1231 in FIG. 1 are points corresponding to the communication protocol standard proposed by FIDO.

However, the server side MPC system uses 1 to many communications according to one user device 21 and M server side user authentication MPC devices 22. But in the present state where infrastructure and web services using communication protocols assuming 1 to 1 communication are widely used, it is not realistic to use a system using 1 to many communications as in the server side MPC system.

As described above, as long as a group of illegitimate MPC devices satisfies the MPC security conditions, the MPC can maintain security. In the server side MPC system, the user device 21 sends shares of characteristic amount of verification information of the user 23 to the server side. Therefore, in a case where a number of MPC devices exceeding the MPC security conditions collude in an illegitimate activity, there is a risk of highly sensitive information becoming known, such as the characteristic amount of verification information of the user 23 to the server side.

[Modified Example of Server Side MPC System and Problems Thereof]

The abovementioned server side MPC system assumes performing authentication using only authentication information of a user. Here, as a modified example of the server side MPC system, consideration is given to authentication using both user secret key information and user authentication information as in the FIDO system.

However, according to the modified example in question there is a problem as to how the user secret key should be stored.

As in the FIDO system here, assuming the existence of a security area in the user device 21, in a case where the user secret key is stored in the secure area, there is a risk of intrusion into the secure area by malware or the like, similarly to the FIDO system.

In a case of sharing the user secret key among M server side user authentication MPC devices 22, a problem occurs in that concealment of the user secret key cannot be guaranteed when the server side MPC device side carries out collusion exceeding the MPC conditions.

[Encrypted Communication System]

Finally, an embodiment of an authentication system using encrypted communication is described. Below, this system is called an "encrypted communication system". An example of the encrypted communication system is described in Non-Patent Literature 2 for example. Here, an example more simplified than Non-Patent Literature 2 is introduced.

The basic idea of the encrypted communication system is that the user authentication information and the verification information are encrypted with a public key of the server device and transmitted to the server device. In this way, the authentication information and verification information are stored only in encrypted form in the server device. Therefore, even if data on the server device is seen by an unauthorized party it is possible to maintain security.

However, in a case where the secret key of the server device is also placed on the server device, when data on the server device is seen by an unauthorized party, not only encrypted text of authentication information or verification information but also the secret key is taken by the unauthorized party. At this time there is a problem in that, by the unauthorized party decrypting the encrypted text, sensitive information such as authentication information and verification information can be reconstructed.

Therefore, in the encrypted communication system, a device known as a "server assistance device" is provided separately from the server device, and the secret key of the server device is stored not on the server device but on the server assistance device.

In the FIDO system, user authentication and apparatus authentication are performed. On the other hand, in the encrypted communication system, only user authentication is performed. It is to be noted that the encrypted communication system may be improved by performing apparatus authentication. However, even with this improvement, problems of the encrypted communication system are not solved as described later. Therefore, in what follows, a description concerning a case of performing apparatus authentication in the encrypted communication system is omitted.

FIG. 3 is a block diagram showing an example of a configuration of the encrypted communication system.

First, as advance preparation, by executing processing of a server assistance device key generation part 3311 of a computation part 331, the user authentication server assistance device 33 generates a server assistance device secret key sk and a server assistance device public key pk (for some type of public key encryption system), stores the server assistance device secret key sk in the storage part 332, and sends the server assistance device public key pk to the user device 31 via the communication part 333.

The user device 31 receives the server assistance device public key pk and stores it in the stores in the storage part 313.

Next the user device 31 receives user unique information from the user 34 using the acquisition part 3111 of the user information acquisition part 311. The user device 31 obtains verification information by inputting the user unique information to a verification information derivation part 3122. The user device 31 creates encrypted text of the verification information by inputting verification information and the user assistance device public key pk into a verification information encryption part 3124. The user device 31 sends the encrypted text to the user authentication server device 32 via a user device proprietary specification front end 3141. The user authentication server device 32 receives the encrypted text via the user device proprietary specification front end 3231, and stores the encrypted text in the encryption user verification information database 3221.

When performing the authentication, the user device 31 receives user unique information from the user 34 using the acquisition part 3111 of the user information acquisition part 311. The user device 31 obtains authentication information by inputting the user unique information to the authentication information derivation part 3121. The user device 31 creates encrypted text of the authentication information by inputting authentication information and the user assistance device public key into the authentication information encryption part 3123. The user device 31 sends the encrypted text to the user authentication server device 32 via the user device proprietary specification front end 3141. The user authentication server device 32 retrieves encrypted verification information of the user from the encrypted user verification information database 3221.

Next the user authentication server device 32 inputs the encrypted verification information and the encrypted authentication information to the server device encrypted authentication verification part 3211. The user authentication server assistance device 33 inputs the server assistance device secret key sk to a server assistance device encryption authentication verification part 3312. The user authentication server device 32 and the user authentication server assistance device 33 respectively execute processing of the server device encryption authentication verification part 3211 and the server assistance device encryption authentication verification part 3312 while performing intercommunication, using an assistance communication part 3232 and the assistance communication part 3331. Finally, an authentication result (accept or reject) is decided, and the user authentication server device 32 uses the server device proprietary specification front end 3231 to notify the authentication result to the user device 31. The user device 31 receives the authentication result using the user device proprietary specification front end 3141. The user device 31 uses a notification part 315 to notify the authentication result to the user 34.

There are various methods for how to realize the server device encryption authentication verification part 3211 and the server assistance device encryption authentication verification part 3312. As an example, a method may be considered in which acceptance or rejection of authentication is decided by executing MPC.

[Problems with Encrypted Communication System]

In a case where both the user authentication server device 32 and the user authentication server assistance device 33 are hijacked by an unauthorized party, there is a problem in that the most highly sensitive information, which is user authentication information, will pass into the hands of the unauthorized party.

Even in a case where only the user authentication server device 32 is hijacked by an unauthorized party, a server side offline attack by the following method is possible.

The user authentication server device 32 receives encrypted text C of verification information of the user device 31 by a normal means.

The user authentication server device 32 encrypts arbitrary information M to create encrypted text C'.

The user authentication server device 32 inputs the encrypted text C, C' to the server device encryption authentication verification part 3211, and executes processing of the server device encryption authentication verification part 3211 while communicating with the user authentication server assistance device 33.

In response to whether output of the server device encryption authentication verification part 3211 is accepted or rejected, the user authentication server device 32 can determine whether or not arbitrary information M is in agreement with the user's authentication information.

The abovementioned attack can be executed without communicating with the user device 31. Therefore, an unauthorized party can execute an attack many times without the user device 31 (or a user holding the user device 31) being aware of it. In a case where the user authentication information is a password or biometric information, entropy of the authentication information is low. Therefore, by executing the abovementioned attack many times while changing M, the unauthorized party can identify the user's authentication information.

Another problem with the encrypted communication system is that exchange (in an encrypted state) of authentication information takes place between the user device 31 and the user authentication server device 32.

With a front end standardized according to FIDO, exchange of authentication information between the user device 31 and the user authentication server device 32 is not assumed. Therefore, in the encrypted communication system, there is a problem in that it is not possible to use an already popular standard, that is a FIDO front end.

[Modified Example of the Encrypted Communication System and Problems Thereof]

As modified examples of the encrypted communication system, the following may be considered. However, each of the modified examples has problems similar to the abovementioned problems.

Common key encryption, not public key encryption, is used in encryption of user verification information and authentication information.

In the abovementioned system, it is assumed that there is one user side assistance device. Therefore, a plurality of user side assistance devices are provided and distributed sharing of a user side assistance device secret key is performed.

Next, a more detailed description is given concerning problems the present invention is intended to solve. As described up to now, each existing authentication system has 1 or more problems as cited below.

It is necessary to assume that a secure area exists in the user device. Therefore, in a case where there is a malware intrusion into the secure area, the most highly sensitive information, that is user authentication information, is leaked to an unauthorized party.

If the server side devices (server device or server assistance device) engage in collusion at or above MPC conditions, the most highly sensitive information, that is user authentication information, is leaked to an unauthorized party.

This is not secure with regard to server side offline attacks. Therefore, if an unauthorized party succeeds in hijacking a server, the most highly sensitive information, that is user authentication information, is leaked to an unauthorized party by the server side offline attack. In particular, in a case where a server manager himself is the unauthorized party, no security at all is provided.

Existing communication standards, including front end standardized by FIDO, are not satisfied. Therefore, communication with a large number of devices using existing communication standards is not possible.

It is to be noted that among existing authentication systems there are systems that use MPC. However, the following problems exist in the ZKIP system and the MAC system which are existing MPC.

Since computation costs and communication costs occur in generating, receiving and transmitting, and verifying ZKIP or MAC, computation efficiency and communication efficiently deteriorate. In particular in a case where the user device is a powerless device such as smart phone, bad computation efficiency and communication efficiency become an obstruction. Therefore, existing authentication systems are limited in utility.

Furthermore, GC has the following problems.

The GC method itself is only a method for realizing a Secure Function Evaluation, and is not a method for realizing MPC. Therefore, with the GC method, confidentiality of input data cannot be guaranteed.

In a case where the GC creation device is hijacked by an unauthorized party, there is no guarantee.

Therefore, in an authentication system for performing user authentication and apparatus authentication, a problem is to be able to use a communication front end for an existing apparatus authentication server, without requiring a secure area in a user device. It is an object of the present invention to provide an authentication system, an authentication method and a program that contribute to solving the problems in question. Other problems and solution means will become clear in the description below.

In a first aspect of the present invention, an authentication system is provided with: a user device; user side assistance device(s) to assist user authentication that authenticates a user of the user device, and apparatus authentication that authenticates the user device; and an apparatus authentication server device to perform apparatus authentication in association with the user device. The user side assistance device(s) use distributed shares of verification information to perform multi-party computation for the user authentication in association with the user device, and use distributed shares of a secret key generated by the user device to perform multi-party computation for the apparatus authentication in association with the user device.

In a second aspect of the present invention, an authentication method in an authentication system includes: a user device; user side assistance device(s) to assist user authentication that authenticates a user of the user device and apparatus authentication that authenticates the user device; and an apparatus authentication server device that performs the apparatus authentication in association with the user device, the method including: generating, by the user device, distributed shares of a secret key; performing multi-party computation for the user authentication in association with the user side assistance device(s) using distributed shares of verification information; and performing multi-party computation for the apparatus authentication in association with the user side assistance device(s) using the distributed shares of the secret key.

In a third aspect of the present invention, an authentication method in an authentication system including: a user device; user side assistance device(s) to assist user authentication that authenticates a user of the user device and apparatus authentication that authenticates the user device; and an apparatus authentication server device that performs the apparatus authentication in association with the user device; the method including: performing, by the user side assistance device(s), multi-party computation for the user authentication in association with the user device, using distributed shares of verification information; and performing multi-party computation for the apparatus authentication in association with the user device, using distributed shares of a secret key generated by the user device.

In a fourth aspect of the present invention, an authentication program in an authentication system including: a user device; user side assistance device(s) to assist user authentication that authenticates a user of the user device and apparatus authentication that authenticates the user device; and an apparatus authentication server device that performs the apparatus authentication in association with the user device; the program executing, by a computer provided in the user device: a process of generating distributed shares of a secret key; a process of performing multi-party computation for the user authentication in association with the user side assistance device(s) using distributed shares of verification information; and a process of performing multi-party computation for the apparatus authentication in association with the user side assistance device(s) using the distributed shares of the secret key.

In a fifth aspect of the present invention, an authentication program in an authentication system including: a user device; user side assistance device(s) to assist user authentication that authenticates a user of the user device and apparatus authentication that authenticates the user device, and an apparatus authentication server device that performs the apparatus authentication in association with the user device; the program executing, by a computer provided in the user device: a process of performing multi-party computation for the user authentication in association with the user device using distributed shares of verification information; and a process of performing multi-party computation for the apparatus authentication in association with the user device using distributed shares of a secret key generated by the user device. The program may be provided as a program product recorded on a non-transitory computer-readable storage medium.

According to the authentication system, the authentication method and the program according to the present invention, in an authentication system for performing user authentication and apparatus authentication, it is possible to use a communication front end with an existing apparatus authentication server, without requiring a secure area in a user device.

PREFERRED MODES

Exemplary Embodiment

Figure 1:
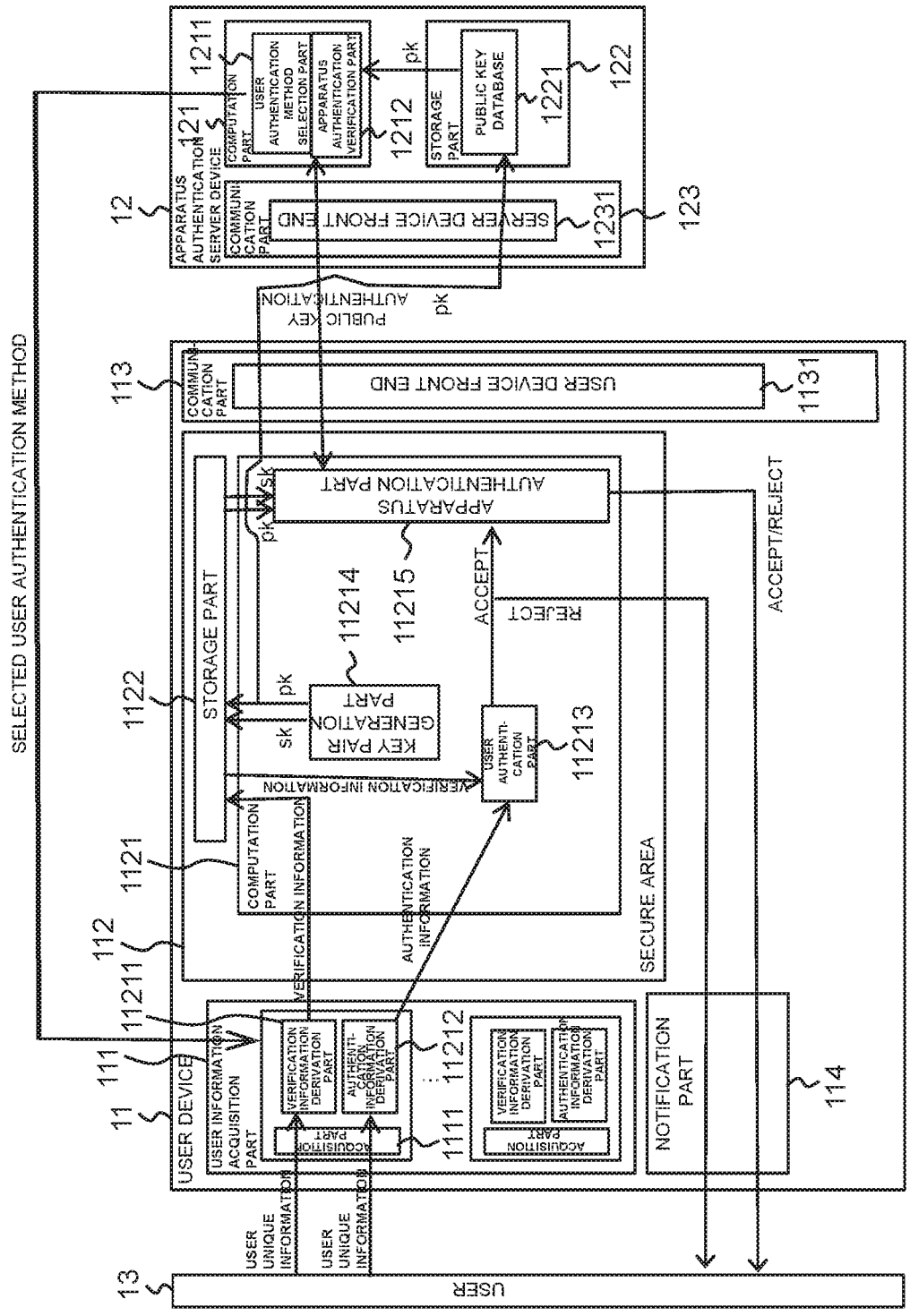
FIG. 1 is a block diagram showing an example of a configuration of a FIDO system.

First, a description is given concerning an outline of an exemplary embodiment. It is to be noted that reference symbols in the drawings attached to this outline are examples for the purpose of aiding understanding, and are not intended to limit the present invention to modes illustrated in the drawings.

Figure 19:
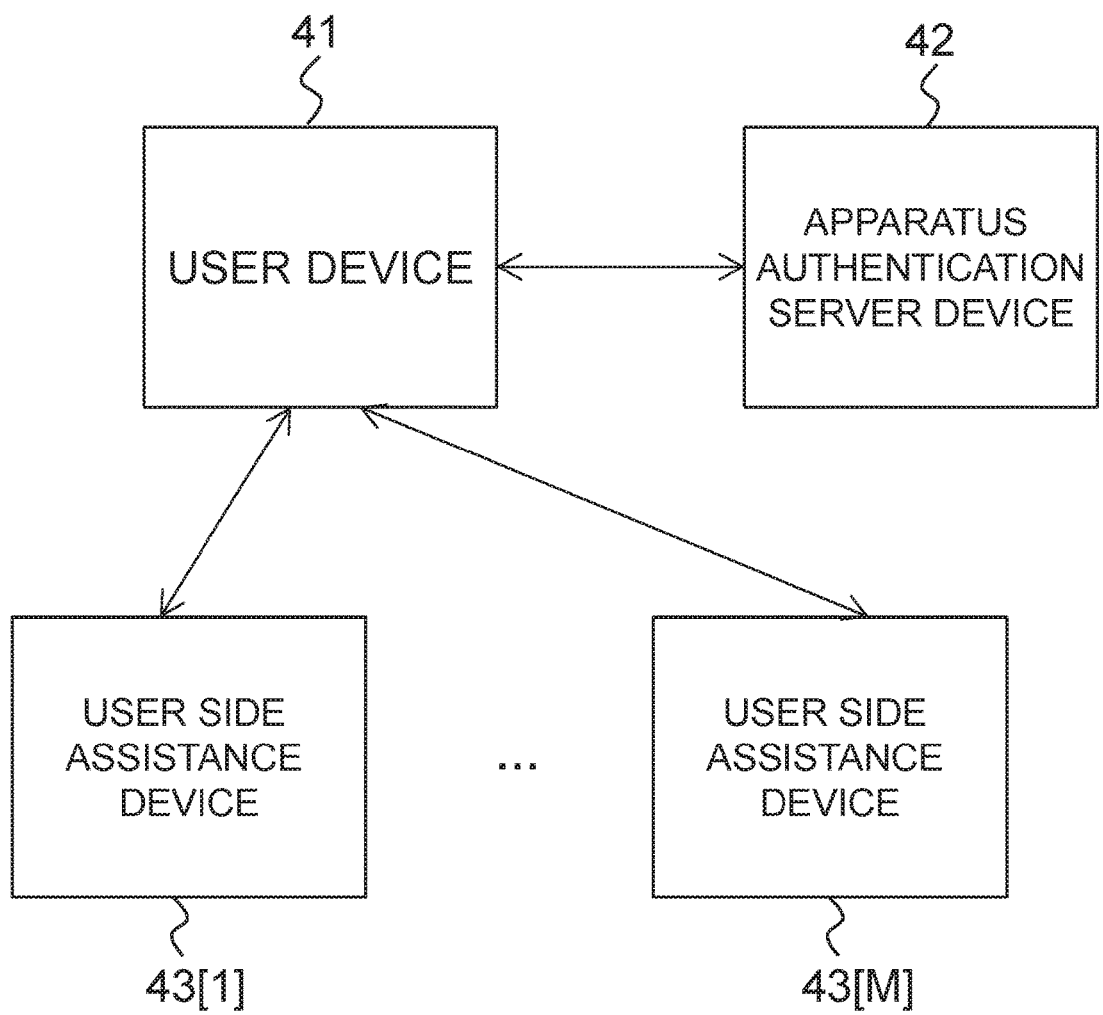
FIG. 19 is a diagram showing an example of a configuration of an authentication system according to an exemplary embodiment.

FIG. 19 is a diagram showing an example of a configuration of an authentication system according to an exemplary embodiment. Referring to FIG. 19, the authentication system is provided with: a user device 41, user side assistance devices 43[1]-43[M] (M is a natural number) that assist user authentication that authenticates a user of the user device 41 and apparatus authentication that authenticates the user device 41; and an apparatus authentication server device 42 that performs apparatus authentication with respect to the user device 41. The user side assistance devices 43[1]-43[M] perform multi-party computation for user authentication with respect to the user device 41 using distributed shares of verification information, and also perform multi-party computation for apparatus authentication with respect to the user device 41, using the distributed shares of a secret key generated by the user device 41.

In the authentication system according to the exemplary embodiment multi-party computation is performed using distributed shares of verification information in association with the user device. Therefore, the user device does not have to hold the verification information as it is, and there is no need to assume the existence of a secure area within the user device as in the FIDO system. In the exemplary embodiment, data exchanged between the user device and the apparatus authentication server device is similar to the existing FIDO system. Therefore, according to the exemplary embodiment it is possible to use a communication front end with an existing apparatus authentication server, without providing a proprietary specification communication front end as in a server side MPC system and encrypted communication system. Moreover, according to the exemplary embodiment it is possible to perform both user authentication and apparatus authentication similar to the FIDO system. That is, according to the authentication system of the exemplary embodiment, in an authentication system that performs user authentication and apparatus authentication, it is possible to use a communication front end for an existing apparatus authentication server, without requiring a secure area within the user device.

<Outline of First to Eighth Exemplary Embodiments>

First an outline is given concerning configurations and effects of the first to eighth exemplary embodiments detailed below.

In the exemplary embodiments, usage of two types of machine is assumed. The first machine is a machine used as the user's own user device, specifically a smart phone, a tablet, a PC (personal computer) or the like. The second machine is a server machine. The server machine has higher performance than the machine used as the user device, and communication with a plurality of user devices is possible.

In the exemplary embodiment, for the following reasons the machine used as a server has security that is much stronger than the machine used as the user device. In the user device where a low price is demanded, there is a tendency for security protection functions to be casually regarded, and the user can freely install various applications in the user device. Therefore, the probability of the user device being hijacked by an unauthorized party is high due to the user installing fraudulent applications. Meanwhile, user side assistance devices, which are server machines, can provide higher security protection functions than the user device, and moreover since application installation and the like is not performed, the security is much higher than the user device.

Therefore, in the following exemplary embodiment, the "user side assistance devices", which are server machines that assist authentication of the user device, are provided. It is to be noted that, here, "user side" (for example the side of the user device 11 in FIG. 1) merely means the user side in comparison to server side (for example the side of the apparatus authentication server device 12 in FIG. 1). That is, a usage mode is assumed in which a "user side assistance device" does not mean a device held by a user of the user device, but rather that "user side assistance devices" are shared by a plurality of (multiple) user devices.

In the exemplary embodiment, user authentication and apparatus authentication are separated, similar to the FIDO system. The user device performs user authentication using the assistance of a user side assistance device. Thereafter, the user device receives apparatus authentication from an external "apparatus authentication server device" while using assistance of the user side assistance device.

Specifically, in the exemplary embodiment a user device secret key and public key are created (for some form of public key authentication system), and the secret key is distributed and shared by the user device and the user side assistance devices. The user device and the user side assistance devices perform user authentication by executing MPC using distributed shares of user verification information and authentication information. Thereafter, information necessary in public key authentication for the apparatus authentication server device is created by executing MPC using the distributed shares of the user secret key.

It is to be noted that an assumption is made that the user side assistance devices store distributed shares of verification information of many users, and are servers that performs MPC for user authentication along with multiple user devices.

In the exemplary embodiment, in order to efficiently execute MPC for the public key authentication system for the apparatus authentication, the following ideas are used. Authentication in many existing public key authentication systems is divided into "secret key usage computation" using a secret key, and portions "outside of that". Below, portions "outside of that" are called "secret key unnecessary computation". For example, in a type of authentication in which Hash-then-RSA signature $H(c)^d \mod N$ is computed for a random number c, computation of $h=H(c)$ is equivalent to "secret key unnecessary computation". Meanwhile, computation of $h^d \mod N$ is equivalent to "secret key usage computation".

An efficient MPC is known for the secret key usage computation.

For example, x is the secret key and it is desired to calculate $y=g^x \mod p$. The order of g is taken as q.

There are M user side assistance devices, and in a case where the i-th user side assistance device holds x distributed shares $x[i] \in \{0, \ldots, q-1\}$, and $x=x[1]+ \ldots +x[M] \mod q$ holds, y can be computed by the following MPC. For i=1, ..., M, the i-th user side assistance device computes $y[i]=h^{x[1]} \mod q$, and y[i] is transmitted to the user side assistance device.

Each user side assistance device computes product $y=y[1] \ldots y[M] \mod q$.

In this way, an efficient MPC is known for the secret key usage computation. Therefore, the user device along with the user side assistance devices execute the secret key usage computation efficiently by executing this efficient MPC. On the other hand, in secret key unnecessary computation, the secret key is not used. Therefore, the user device does not get assistance of the user side assistance devices, and the secret key unnecessary computation is executed by the user device alone.

[Outline of First Exemplary Embodiment]

In the first exemplary embodiment problems are solved based furthermore on the ideas below.

As described above, it is assumed that the user side assistance devices in the exemplary embodiment are server machines. That is, the user side assistance devices are much more secure that a normal machine. Moreover, in the server machine, normal log monitoring and the like is performed. Therefore, even if the server machine is hijacked by an unauthorized party, it is possible to identify the illegitimate activity performed by the unauthorized party by the log monitoring.

In the exemplary embodiment, even if the unauthorized party succeeds in hijacking a user side assistance device, in a case of deviation from the established MPC protocol, the unauthorized party's presence is detected by the log monitoring. In the case in question, consideration is given to where the unauthorized party does not deviate from the MPC protocol.

In a ZKIP system and a MAC system which are existing MPCs, in order to prevent an MPC device from deviating from an MPC protocol, ZKIP or MAC are generated, these are transmitted to another MPC device, and the receiving MPC device verifies the legitimacy of the ZKIP or MAC. This series of procedures deteriorates the MPC computation efficiency and communication efficiency.

However, in the device configuration of the exemplary embodiment, the user side assistance devices according to the abovementioned description do not deviate from the MPC protocol. Therefore, the user side assistance devices do not have to generate ZKIP or MAC. Meanwhile, for a user device where a PC or a smart phone is assumed, there is no log monitoring function. That is, in a case of a user device being hijacked by an unauthorized party, there is a risk that the user device operated by the unauthorized party will deviate from the MPC protocol.

For the above reasons, in user authentication in the exemplary embodiment, only the user device generates ZKIP or MAC, and the user side assistance devices do not generate ZKIP or MAC. Thus, according to the present exemplary embodiment, it is possible to reduce the cost required in generating, sending and receiving, and verifying in ZKIP and MAC in comparison to existing inventions.

In existing inventions, generation, transmitting and receiving, and verifying in ZKIP or MAC are dominant with regard to MPC computation efficiency and communication efficiency. Therefore, according to the exemplary embodiment, processing with much better efficiency is realizable in comparison with existing inventions.

[Outline of Second Exemplary Embodiment]

In a second exemplary embodiment, the GC method is used as MPC. In the GC method there are two problems as described above. In the second exemplary embodiment these problems are solved as below A first problem is that security is impaired in a case where a device that creates BC in the GC method performs an illegitimate operation. In the exemplary embodiment described above, consideration may be given to where a user side assistance device does not deviate from MPC protocol. Therefore, in the second exemplary embodiment it is possible to avoid the problem in question by the user side assistance devices acting as devices that create GC.

A second problem is that since the GC method is a Secure Function Evaluation, not MPC, it is not possible to protect confidentiality of input data. In order to solve this problem, in the exemplary embodiment, input data (in the exemplary embodiment, authentication information or verification information is treated as input data) is distributed and shared among the user device and user side assistance devices. Below, the distributed shares of the authentication information and the verification information held by the user device are respectively s[0] and v[0]. Meanwhile, the distributed shares of the authentication information and the verification information held by the user side assistance devices are respectively s[1] and v[1].

Furthermore, f(a,b) is a function as below. That is, the function f(a,b) regards a, b as distributed shares of the authentication information and the verification information, authentication information x is reconstructed using the distributed share a and distributed share s[1], verification information y is reconstructed using the distributed share b and distributed share v[1], the authentication information x and verification information y are used to perform user authentication, and an authentication result is outputted.

The user side assistance devices which are devices for creating GC creates a circuit diagram for f(a,b) by using the distributed shares s[1] and v[1], GC and key data K are created by inputting this circuit diagram to a GC generation part, and GC is sent to the user device. The user device inputs GC and distributed shares s[0] and v[0] to a GC executing part to obtain output E of GC, and sends the output E to the user side assistance devices. Finally, the user side assistance devices obtain output ans from output E and the key data K.

In a case of performing authentication according to the abovementioned method, data that can be inputted by the user device is not authentication information and verification information itself, but only shares s[0] and v[0] thereof and GC. Therefore, according to the present exemplary embodiment, the problem of authentication information and verification information, which are secret information, being leaked to the user device is solved.

It is to be noted that in the exemplary embodiment, the following three methods for improving security may be incorporated.

[Method 1 for Improving Security]

First, a description is given of the first method. Details of this method are described as the third exemplary embodiment. In the exemplary embodiment, after finishing user authentication by MPC, the user device and the user side assistance devices create a response by MPC with regard to an apparatus authentication protocol for the apparatus authentication server. At this time, the apparatus authentication is performed only in a case where the user authentication passes. That is, in the exemplary embodiment, in a case of "reject" being outputted by the former MPC, there is no need to execute the latter MPC. However, where the latter MPC is not performed in a case of "reject" by the former MPC, the user side assistance devices obtain information of 1 bit as to whether or not the latter MPC is performed.

In order to improve confidentiality of user authentication information, information as to whether or not a user is accepted by user authentication is preferably hidden from user side assistance devices. Therefore, in a case where it is desired to hide information concerning whether or not the user has been accepted by the user authentication, from the user side assistance devices, the following operations are performed. That is, in a case of the user authentication being accepted, the user device performs MPC concerning apparatus authentication in the normal way. On the other hand, in other cases, a protocol for pretending that MPC concerning the apparatus authentication is being performed (below referred to as "apparatus authentication simulator MPC") is executed. Thus, it is possible to hide from the user side assistance devices, information of 1 bit concerning whether or not MPC has been performed with regard to the apparatus authentication.

It is to be noted that the "apparatus authentication simulator MPC" is an option for dealing with a case where it is desired to hide, from the user side assistance devices, information as to whether or not a user has been accepted by user authentication. Therefore, in a case where it is not necessary to hide the information in question from the user side assistance devices, there is no need to execute the "apparatus authentication simulator MPC".

[Method 2 for Improving Security]

Next, a description is given concerning a second method for improving security. Details of this method are described as the fourth and fifth exemplary embodiments.

In order to describe this method, first a description is given concerning an attack on an authentication system according to the exemplary embodiment. In the authentication system of the exemplary embodiment, an unauthorized party that has hijacked a user device can make the user side assistance devices execute a user authentication MPC by pretending that a request for user authentication from the user was made (in spite of there not actually being a request for user authentication from the user). Specifically, a user authentication MPC is executed along with a user side assistance devices by using arbitrarily selected authentication information M, and it is possible to know whether or not a result was accepted. In this way, the unauthorized party can know whether or not the arbitrarily selected authentication information M matches the authentication information of the user. Since the entropy of the authentication information is low, by making a complete search while changing the authentication information M to various values, the unauthorized party can identify authentication information of the user.

However, this attack method accompanies communication between the user device and user side assistance devices. Therefore, by placing a limit on the number of communications with the user side assistance devices by the user device side, it is possible to avoid analysis by the unauthorized party and to guarantee security.

[Method 3 for Improving Security]

Next, a description is given concerning a third method for improving security. Details of this method are described in the sixth to eighth exemplary embodiments. In the sixth to eighth exemplary embodiments there is a small difference in the configuration. Therefore, a description is given first concerning the sixth exemplary embodiment.

Before describing this method, a description is given concerning background motivation. In the exemplary embodiments described up to now, the user device and user side assistance devices jointly perform MPC for the user authentication. Therefore, it is assumed that both the user device and the user side assistance devices hold an algorithm for user authentication. However, an algorithm for user authentication, and in particular biometric authentication, is often an object to be protected as a corporate secret. Furthermore, authentication information derivation or verification information derivation where a characteristic amount is extracted to obtain authentication information or verification information from user unique information (information of face, iris, finger print or the like) accompanying user authentication, is often an object to be protected as a corporate secret. Therefore, in order to protect the corporate secret, a case may be considered where it is desired to hide an algorithm for authentication information derivation, an algorithm for verification information derivation, and a user authentication algorithm, with respect to a user device where there is a risk of information passing into the hands of an unknown large number of users.

As a method of hiding these algorithms from a user device, the following may be considered. That is, the user device only executes the obtaining of user unique information and secret sharing thereof. On the other hand, on the side of the user side assistance devices, a method may be considered where distributed shares of verification information or authentication information are computed by an MPC using distributed shares of user unique information, and a user authentication algorithm is executed by an MPC.

However according to the method in question, in a case where an unauthorized party colludes with user side assistance devices above the MPC security conditions, there is a problem of extremely sensitive information, as in verification information or authentication information, passing into the hands of the unauthorized party.

Therefore, in the sixth exemplary embodiment, first the user device obtains the user unique information from the user, and by performing secret sharing of the user unique information, obtains distributed shares $e[1], \ldots, e[M]$. Here, M is the number of user side assistance devices. For $i = 1, \ldots, M$, by performing further secret sharing of distributed shares $e[i]$, the "distributed shares of the user unique information distributed shares" $c[i], d[i]$ are obtained, $c[1], \ldots, c[M]$ are stored by the user device itself, and the i-th user side assistance device stores $d[i]$.

In this way, in the sixth exemplary embodiment, distributed shares of the user unique information are divided and stored by the user device and the user side assistance devices. Therefore, it is possible to guarantee security also in a case where an unauthorized party hijacks user side assistance devices above the MPC security conditions.

On the other hand, the authentication information derivation algorithm, the verification information derivation algorithm and the user authentication algorithm are made secret from the user device, and are stored only in the user side assistance devices.

In user authentication, the user device sends the "distributed share of the user unique information distributed shares" $c[i]$ that it itself holds, to the i-th user side assistance device, and the i-th user side assistance device reconstructs $e[i]$ from $c[i]$ and $d[i]$.

In addition, the user device performs secret sharing of the user unique information obtained from the user, obtains distributed shares $f[1], \ldots, f[M]$, and sends $f[i]$ for $i = a, \ldots, M$ to the i-th user side assistance device. The i-th user side assistance device performs user authentication by using $e[i], f[i]$, the authentication information derivation algorithm, the verification information derivation algorithm, and the user authentication algorithm, to perform MPC while carrying out intercommunication with other user side assistance devices.

It is to be noted that in the sixth exemplary embodiment, in user authentication the user device forwards a "distributed share of the user unique information distributed shares" $c[i]$ to a user side assistance device. Therefore, in a case in user authentication when a user side assistance device is hijacked by an unauthorized party, the unauthorized party can reconstruct $e[i]$ by using $d[i]$ stored in the user side assistance device and $c[i]$ received from the user device. Thus, in a case where user side assistance devices exceeding the MPC security conditions are hijacked by the unauthorized party at this stage, the user unique information or authentication information and verification information are reconstructed from e[i], and it is not possible to maintain the secrecy of these sensitive information items.

Therefore, in the sixth exemplary embodiment when user authentication is finished, the "share of the user unique information shares" c[i] is compulsorily deleted by the user side assistance device. In this way, the danger in question is avoided as much as possible.

Meanwhile in a seventh exemplary embodiment, a problem is solved by a method similar to the sixth exemplary embodiment based on the same motivation as the sixth exemplary embodiment. However, in the seventh exemplary embodiment, when the user device obtains user unique information at a recording stage in advance, upon secret sharing thereof it is sent to user side assistance devices, and MPC among the user side assistance devices is performed. In this way, for i=1, . . . , M, the i-th user side assistance device obtains distributed share v[i] of the user verification information. By the i-th user side assistance device performing secret sharing of v[i], "distributed shares of the verification information distributed shares" u[i] and w[i] are created, u[i] is sent to the user device, and w[i] is stored by itself.

In user authentication, the user device sends u[i] to the i-th user side assistance device, and the i-th user side assistance device reconstructs distributed share v[i] of the verification information from u[i] and w[i]. In addition, by performing secret sharing of the user unique information obtained from the user, the user device obtains distributed shares f[1], . . . , f[M] of the user unique information, and sends f[i] for i=1, . . . , M to the i-th user side assistance device. The i-th user side assistance device performs user authentication by using v[i], f[i], the authentication information derivation algorithm, the verification information derivation algorithm, and the user authentication algorithm to perform MPC while carrying out intercommunication with other user side assistance devices.

In the eighth exemplary embodiment a "user authentication information distributed share generating device" which is a dedicated server machine for computing user authentication information and shares thereof, and a "user verification information distributed share generating device" which is a dedicated server machine for computing user verification information and shares thereof, are provided. These devices execute authentication information, verification information and computation of shares thereof, instead of the user device.

According to the method in question the user device does not perform computation of authentication information or verification information. Therefore, derivation algorithms for authentication information or verification information need not be disclosed to the user device.

<Outline of Effect Realized by the Exemplary Embodiments>

According to the respective exemplary embodiments of the present invention the respective problems described above are solved.

First, since in a FIDO system the authentication information and the verification information are stored in the user device, the user device must have a secure area for protecting this information, and in a case where the secure area is intruded by an unauthorized party, there is a problem in that the most highly sensitive information, which is user authentication information and verification information, will pass into the hands of the unauthorized party. However, in the exemplary embodiments of the present invention, the user device itself does not store authentication information or verification information (although distributed shares of authentication information or verification information are stored). Therefore, even if the user device is completely hijacked by an unauthorized party, there is no risk of the authentication information or verification information being stolen by the unauthorized party, and a secure area is not necessary.

It is to be noted that in the exemplary embodiments, in a case where not only the user device but also the user side assistance device side are hijacked by an unauthorized party exceeding the MPC conditions, the authentication information and the verification information leak to the unauthorized party. However, in the exemplary embodiments as described above, a server machine is assumed as a user side assistance device. Therefore, the risk of the user side assistance devices being hijacked along with the user device by an unauthorized party is extremely low.

In the exemplary embodiments, a method of hiding whether or not the user authentication has passed, from the user side assistance devices, is presented as the third exemplary embodiment. If the method in question is used, it is possible to improve security in a case where a user side assistance device is hijacked by an unauthorized party.

Furthermore, in the FIDO system by storing the user authentication algorithm, the authentication information derivation algorithm, and the verification information derivation algorithm in the secure area, protection is realized such that these algorithms do not leak. However, this means that in a case where the secure area is intruded by an unauthorized party, these algorithms are leaked. In a case of using biometric authentication as a user authentication method, these algorithms are often corporate secrets. Therefore, there is much concern with regard to algorithms leaking to an unauthorized party.

Therefore, in the exemplary embodiments a method of executing user authentication while hiding these algorithms from the user device is presented in the sixth and seventh exemplary embodiments.

Second, in the existing technology, if the authentication server device or devices assisting this exceed MPC conditions and are hijacked by an unauthorized party, there is a problem that the most highly sensitive information, that is authentication information or verification information, will leak to an unauthorized party. However, in the exemplary embodiments disclosed in the present specification, user authentication and apparatus authentication are separated, similar to a FIDO system. Therefore, not only does the authentication server device not inform about authentication information or verification information, but also does not inform about distributed shares of these. Therefore, even if the authentication server device or devices assisting this exceed MPC conditions and are hijacked by an unauthorized party, the unauthorized party cannot know any of the authentication information or verification information.

Third, the existing systems may be vulnerable to "server side offline attacks" where the authentication server device completely searches authentication information without communicating with the user device. However, in the exemplary embodiments of the disclosure of the present application, the authentication information or verification information clearly does not inform about distributed shares thereof to the authentication server device or assistance devices thereof as described above. That is, in the exemplary embodiments of the disclosure of the present application the attacks in question are not possible.

In the exemplary embodiments, even in a case where the user device is hijacked by an unauthorized party, a method of preventing leakage of authentication information or verification method by limiting the number of user authentications is presented in the fourth and fifth exemplary embodiments.

Fourth, in the exemplary embodiments, data communicated between the user device and server device is created by MPC. At this time, there is a difference between the exemplary embodiments and existing authentication systems such as the FIDO system or the like, with regard to the way of creating the data. However, the data itself that is communicated is completely the same as in the existing authentication systems. Therefore, according to the exemplary embodiments disclosed in the present application, it is possible to use communication standards of existing authentication systems as they are. That is, according to the exemplary embodiments disclosed in the disclosure of the present application, communication is possible with all server devices satisfying the communication standards of existing authentication systems and there is no problem of compatibility of communication protocols as in existing systems.

First Exemplary Embodiment

Next, a description is given concerning an authentication system according to a first exemplary embodiment, making reference to the drawings.
[Configuration]

Figure 4:
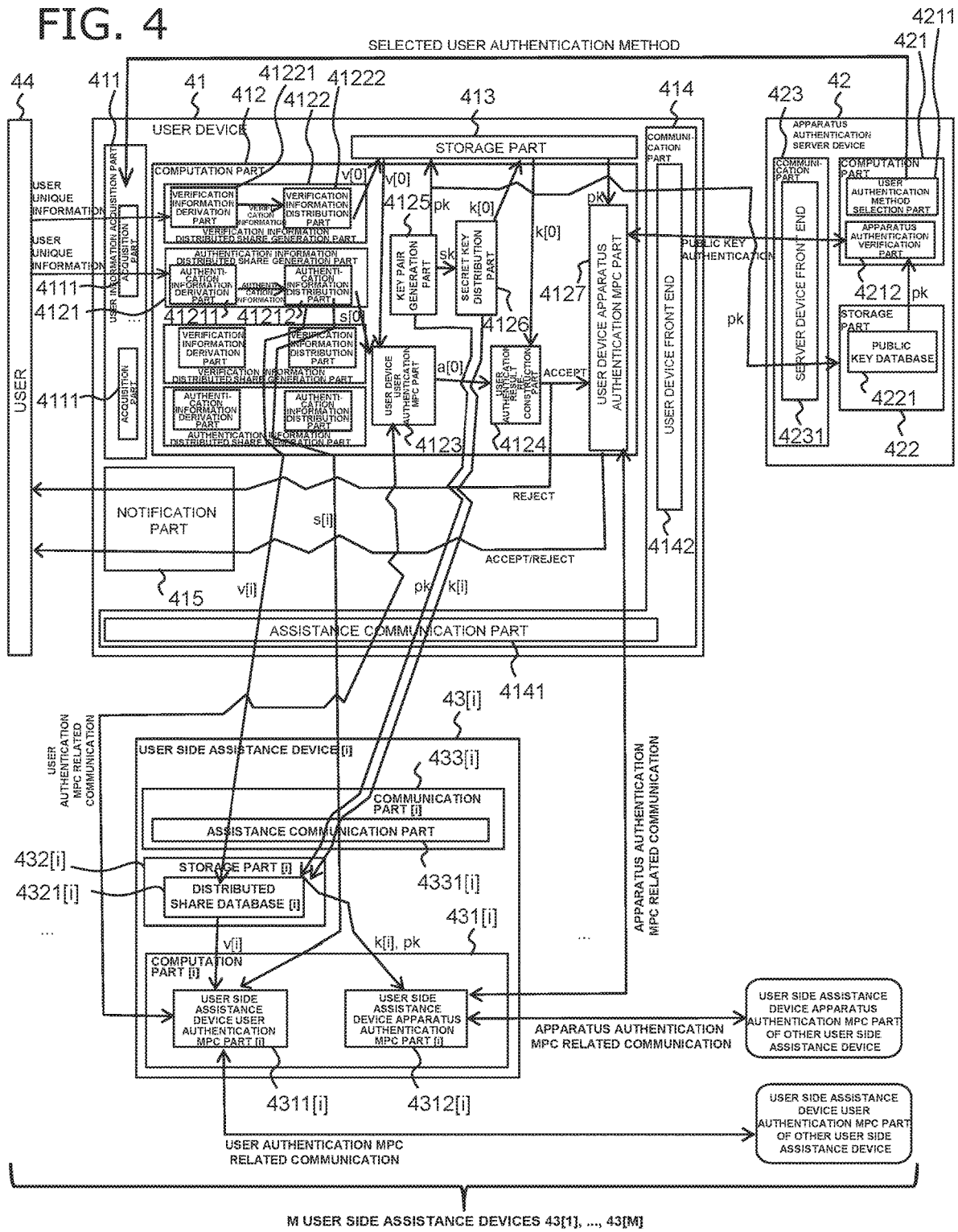
FIG. 4 is a block diagram showing an example of a configuration of an authentication system according to a first exemplary embodiment.

Referring to FIG. 4 a description is given of a configuration of the authentication system of the present exemplary embodiment.

The authentication system of the present exemplary embodiment is provided with a user device 41, user side assistance devices 43, and an apparatus authentication server device 42. A user 44 is a user holding the user device 41.

The user device 41 is a device held by the user 44, and for example, a smart phone, a tablet, a PC (personal computer) or the like is assumed.

The user side assistance devices 43 and the apparatus authentication server device 42 are assumed to be some sort of server machine.

The user device 41, the user side assistance devices 43 and the apparatus authentication server device 42 are provided with a "computation part", a "storage part" and a "communication part". The computation part is a processor such as a CPU (Central Processing Unit) or the like. The storage part is a storage medium such as a memory, hard disk or the like. The communication part is a part for enabling devices to communicate with each other via the Internet or the like.

The user device 41 is further provided with a user information acquisition part 411 and a notification part 415. The user information acquisition part 411 acquires information used in authentication from the user 44. The notification part 415 communicates whether or not the authentication has been accepted, to the user 44. The notification part 415 is, for example, a PC or smart phone display.

In the authentication system of the present exemplary embodiment, one or a plurality of users 44 exist. Each user 44 holds one or more user devices 41. FIG. 4 shows one user 44 among them, and one user device 41 held by the user 44 in question.

The apparatus authentication server device 42 is a server that authenticates the user device 41. The apparatus authentication server device 42 is used in authentication when, for example, the user 44 uses the user device 41 to utilize some sort of web service. In the authentication system of the present exemplary embodiment, in general there are multiple apparatus authentication server devices 42. FIG. 4 shows only one among these.

The apparatus authentication server device 42 generally communicates with multiple user devices 41. The apparatus authentication server device 42 holds a public key database 4221, which is a database for storing public keys of respective devices, in a storage part 422. It is to be noted that the storage part 422 has an area outside of the public key database 4221, and necessary information may be stored there in a timely fashion.

The user side assistance devices 43 assist the user device 41 in authentication. FIG. 4 shows M user side assistance devices 43. When authentication is performed, these user side assistance devices 43 execute authentication while communicating with the user device 41 or other user side assistance devices 43.

Each user side assistance device 43 generally assists multiple authentications, and in each authentication, communicates with the user device 41 (which is the same or different in respective authentications).

Below, 1-st to M-th user side assistance devices 43 are denoted user side assistance device 43[1], . . . , user side assistance device 43[M].

Similarly, for units included in the user side assistance devices 43, the i-th user side assistance device 43 is specified by attaching "[i]" at the end. For example, the computation part 431 of the user side assistance device 43[3] is denoted as computation part 431[3].

Each user side assistance device 43 stores, in a storage part 432, verification information distributed shares for the user 44, and a distributed shares database 4321, which is a database for holding secret key distributed shares for the user device 41 held by the user 44. It is to be noted that the storage part 432 has an area outside of the distributed share database 4321, and necessary information may be stored there in a timely fashion.
[Authentication in the Present Exemplary Embodiment]

In the present exemplary embodiment there are two types of authentication: "user authentication" that authenticates the user 44, and "apparatus authentication" that authenticates the user device 41 which is a device held by the user 44. In the present exemplary embodiment, user authentication indicates the act of proving that the user 44 is the same as the user 44 recorded in advance for the user device 41. Meanwhile, apparatus authentication indicates proving that the user device 41 is the same as the device recorded in advance, for the apparatus authentication server device 42.

The user 44 performs user authentication using the user device 41. The user device 41 performs user authentication by communicating with the user side assistance device 43[1], . . . , user side assistance device 43[M]. In a case where the user authentication is accepted, the user device 41 performs apparatus authentication by communicating with the apparatus authentication server device 42. On this occasion, the user side assistance device 43[1], . . . , user side assistance device 43[M] assist the apparatus authentication by communicating with the user device 41.

In the apparatus authentication, the user device 41 and the apparatus authentication server device 42 decide data to be communicated according to some sort of communication protocol (for example, UAF standard proposed by FIDO) that is decided in advance. Units (or means) for communicating according to this communication protocol are a user device front end 4142 of a communication part 414 and server device front end 4231 of a communication part 423.

The above described user device front end 4142 is for communicating with the apparatus authentication server device 42 according to the communication protocol of the apparatus authentication. Meanwhile, separately the communication part 414 of the user device 41 has an assistance communication part 4141 for communicating with the user side assistance device 43[1], . . . , user side assistance device 43[M]. Similarly, the communication part 433 of the user side assistance device 43[1], . . . , user side assistance device 43[M] has an assistance communication part 4331 for communicating with the user device 41.

The assistance communication part 4141 and the assistance communication part 4331 perform various communications between the user device 41 and the user side assistance device 43, such as transmitting authentication information or verification information shares.

In the user authentication, the following three types of information, for example, are used as information for identifying the user 44 (referred to below as "user unique information").

Recording of user (personal identification number, password, pass phrase, or the like).

User biometric information (face, finger print, iris, or the like).

User held object (security token, IC (Integrated Circuit) card, or the like).

The user device 41 has a means for reading one or more of these user unique information items. The user information acquisition part 411 of the user device 41 has an acquisition part 4111 for reading this information for each authentication information item to be read.

The following may be considered, for example, as the acquisition part 4111.

Keyboard for reading personal identity number, password, pass phrase or the like.

Camera for reading face, finger print, iris, or the like.

Reading device for reading information within security token or IC card.

The user device 41 has an authentication information derivation part 41211 for obtaining "authentication information" by processing the user unique information obtained by the acquisition part 4111, and a verification information derivation part 41221 for obtaining "verification information" by processing user unique information.

The "authentication information" is information for indicating that the user is the person in question, in user authentication. Meanwhile, the "verification information" is information recorded in advance for comparing with authentication information.

Several specific examples are shown for the authentication information derivation part 41211 and the verification information derivation part 41221.

For example, in a case where the authentication information and the verification information are biometric information, the acquisition part 4111 acquires biometric information as image data. The authentication information derivation part 41211 and the verification information derivation part 41221 extract a characteristic amount of biometric information from the image data, and use the extracted characteristic amount as the authentication information and verification information.

Meanwhile, in a case where the authentication information is password P, from the viewpoint of security, consideration may be given to using a hash value Hash(P) of P, not the password P itself, as verification information. In this case, the verification information derivation part 41221 handles an operation to hash the password P obtained from the acquisition part 4111. Meanwhile the authentication information derivation part 41211 uses the password P obtained by the acquisition part 4111 as it is. At this time, the authentication information derivation part 41211 is a means to "output information P obtained by the acquisition part 4111 as it is".

According to the configuration shown as an example in FIG. 4, a user authentication method selection part 4211 provided in the computation part 421 of the apparatus authentication server device 42 determines which among the multiple user authentication methods to use. Note that the user authentication method selection part 4211 may be implemented in the user device 41.

Concerning apparatus authentication, authentication is performed using a public key/secret key pair (for some sort of public key authentication system) created by the user device 41. FIG. 4 is described assuming that 1 public key authentication system to be used in the apparatus authentication is decided in advance. However, similar to the case of user authentication, it is also possible to expand as in selecting 1 system from multiple public key authentication systems.

[Data Recording in Device in Advance]

The user device 41 receives the following data in advance and holds it in the storage part 413.

The number of user side assistance devices 43 is M.

Verification protocol for user authentication (in a case where a plurality of user authentications are provided, all of these authentication protocols).

Authentication protocol for apparatus authentication.

The user side assistance device 43[1], . . . , user side assistance device 43[M] receive the following data in advance and hold it in the storage part 432.

The number of user side assistance devices 43 is M.

Verification protocol for user authentication (in a case where a plurality of user authentications are provided, all of these authentication protocols).

The apparatus authentication server device 42 receives the following data in advance and holds it in the storage part 422.

Verification protocol for apparatus authentication.

In a case where an MPC carried out in user authentication or apparatus authentication requires advance computation, the user device 41 and the apparatus authentication server device 42 respectively store MPC advance computation data in the storage part 413 and the storage part 432.

[Overall Flow]

Before describing details of each part of the authentication system in the present exemplary embodiment, the overall flow is summarized.

In the present exemplary embodiment, the following advance preparations are performed ahead of authentication.

User authentication advance preparation.

Data required in user authentication is prepared in advance. In the present exemplary embodiment, verification information is computed.

Apparatus authentication advance preparation.

Data required in apparatus authentication is prepared in advance. In the present exemplary embodiment a public key and a secret key for the user device are generated.

The following 2 operations are performed in authentication.

User authentication.

The user device 41 authenticates the user 44 using assistance of the user side assistance devices 43.

Apparatus authentication.

The user device 41 receives authentication from the apparatus authentication server device 42 while using assistance of the user side assistance devices 43.

[User Authentication Advance Preparation]

In the present exemplary embodiment, in user authentication advance preparation the user 44 records verification information in advance. Various methods may be used as a method of recording the verification information in advance. FIG. 4 shows a case where the verification information is recorded in advance by using the acquisition part 4111 of the user device 41. However, in a case where, for example, a company records all new recruits together in an authentication system, a dedicated machine for recording the verification information may be prepared and used to perform recording in advance in the verification part. Below, a description is given of advance recording of verification information in a device configuration described in FIG. 4.

In a case where a plurality of user authentications are prepared, the following operations are performed for all authentications.

Figure 5:
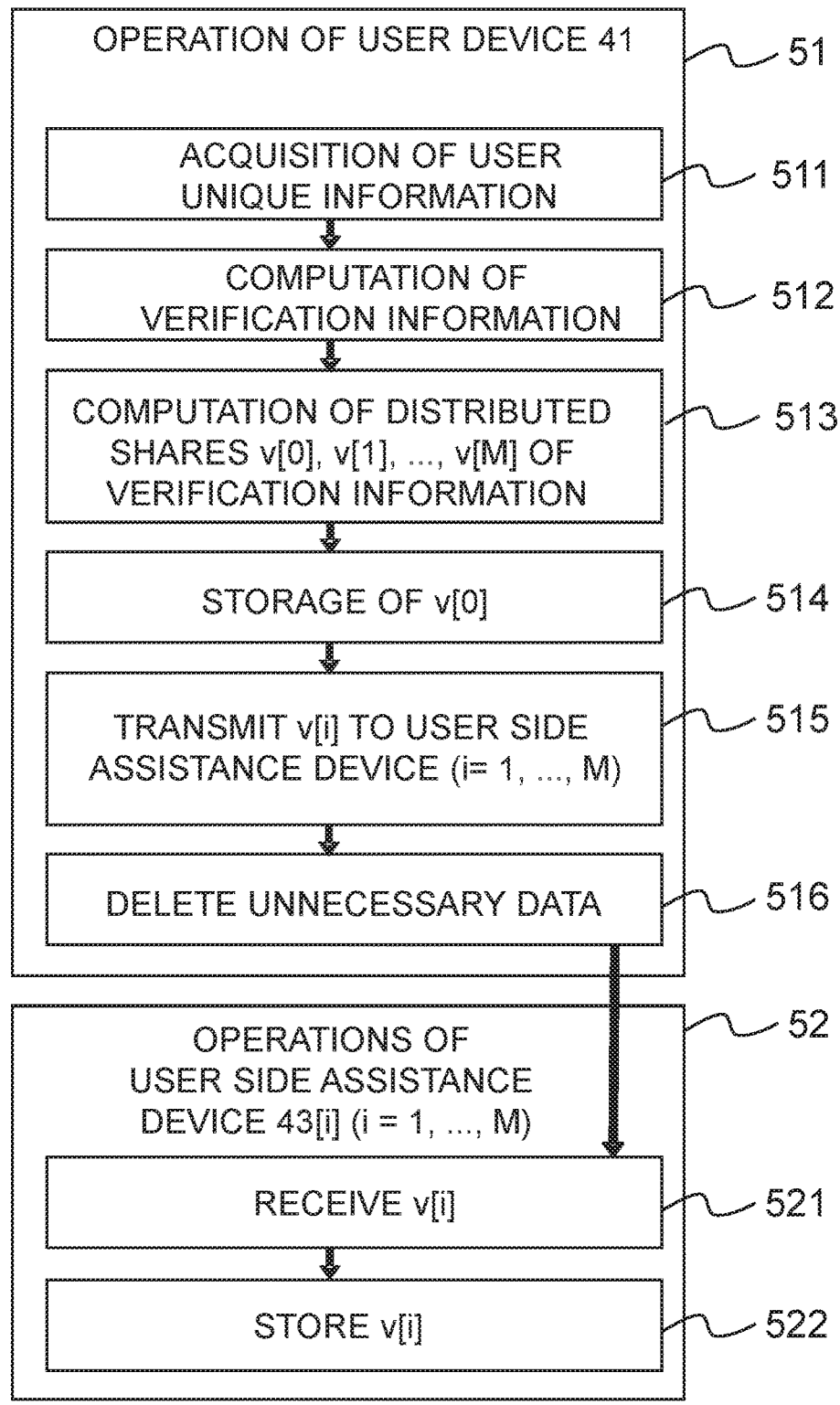
FIG. 5 is a flow diagram showing an example of operation in user authentication advance preparation (recording of verification information).

A description is given of recording of the verification information according to FIG. 5.

Step 51: first the user device 41 executes the following.

Step 511: the acquisition part 4111 obtains user unique information from the user 44.

Step 512: the verification information derivation part 41221 inputs the user unique information and outputs verification information.

Step 513: a verification information distribution part 41222 inputs verification information and the number M of user side assistance devices 43, and outputs distributed shares v[0], v[1], . . . , v[M] of the verification information.

Step 514: the storage part 413 stores distributed share v[0].

Step 515: the assistance communication part 4141 of the communication part 414 transmits the distributed share v[1] to the user side assistance device 43[1], and . . . , distributed share v[M] to the user side assistance device 43[M].

Step 516: the user device 41 deletes user unique information, verification information, and distributed shares v[1], . . . , v[M].

Step 52: next, for i=1, . . . , M, the user side assistance device 43[i] executes the following.

Step 521: the assistance communication part 4331[i] of the communication part 433[i] receives the distributed share v[i] transmitted by the user device 41.

Step 522: the distributed share database 4321[i] holds distributed share v[i].

[Apparatus Authentication Advance Preparation]

In the present exemplary embodiment a public key/secret key pair is generated and recorded as advance preparation for the apparatus authentication.

Figure 6:
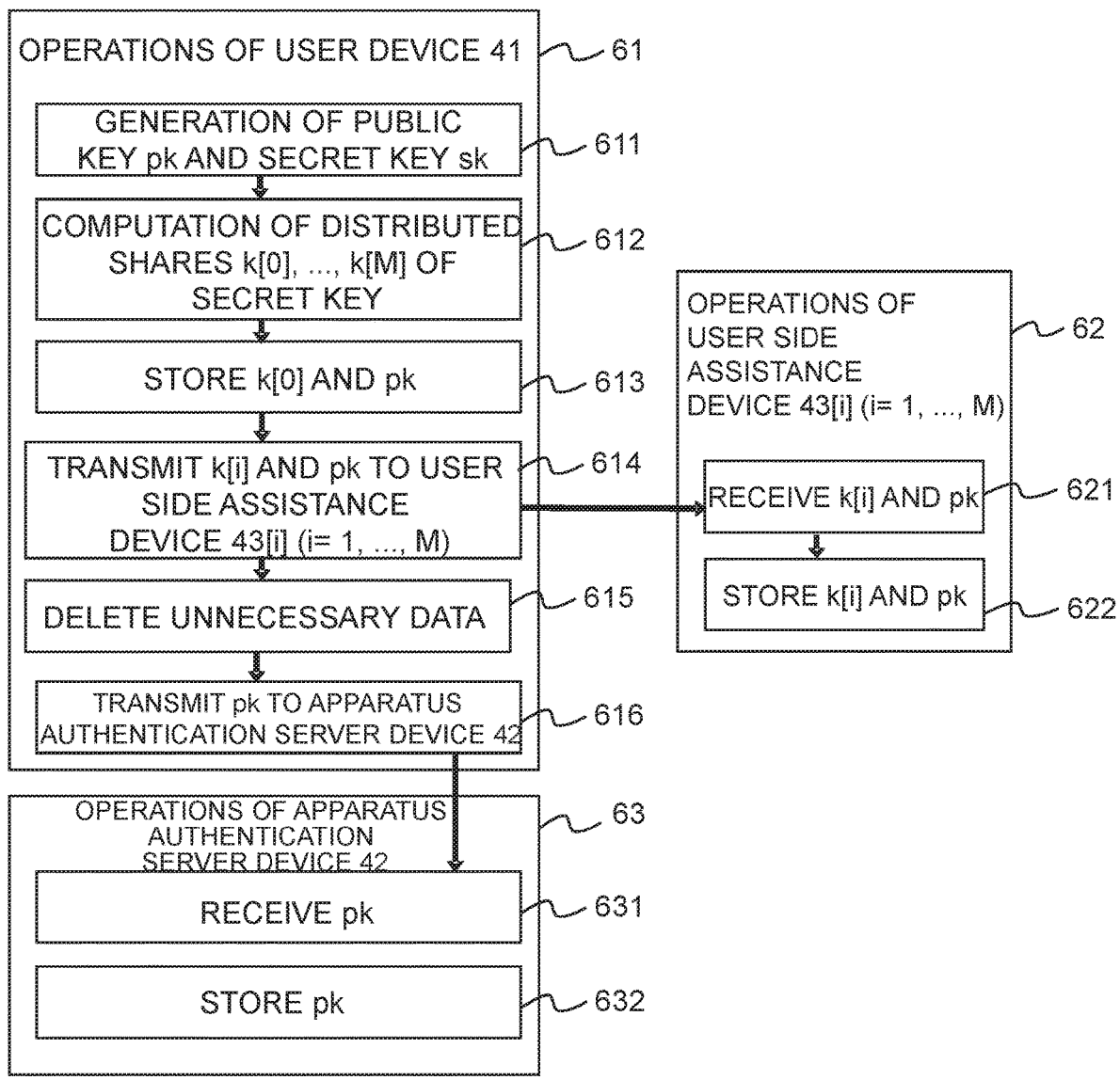
FIG. 6 is a flow diagram showing an example of operations in apparatus authentication advance preparation (generation and recording of public key—private key pair).

A description is given of generating and recording the pubic key/secret key according to FIG. 6.

Step 61: the user device 41 executes the following.

Step 611: a key pair generation part 4125 generates a public key pk and a secret key sk for the user device 41.

Step 612: a secret key distribution part 4126 inputs the generated secret key sk, and outputs distributed shares k[0], . . . , k[M] of the secret key.

Step 613: the storage part 413 holds the secret key distributed share k[0] and the public key pk.

Step 614: for i=1, . . . , M, the assistance communication part 4141 of the communication part 414 transmits the secret key distributed share k[i] and the public key pk to the user side assistance device 43[1].

Step 615: the user device 41 deletes the secret key sk and the secret key distributed shares k[1], . . . , k[M].

Step 616: the user device front end 4142 transmits the public key pk to the apparatus authentication server device 42.

Step 62: next, for i=1, . . . , M, the user side assistance device 43[i] executes the following.

Step 621: the assistance communication part 4331[i] of the communication part 433[i] receives the secret key distributed share k[i] and the public key pk.

Step 622: the distributed share database 4321[i] holds the secret key distributed share k[i] and the public key pk.

Step 63: the apparatus authentication server device 42 executes the following.

Step 631: a server device front end 4231 receives a public key pk for the user device 41.

Step 632: the public key database 4221 holds the received public key pk.

[User Authentication]

Figure 7:
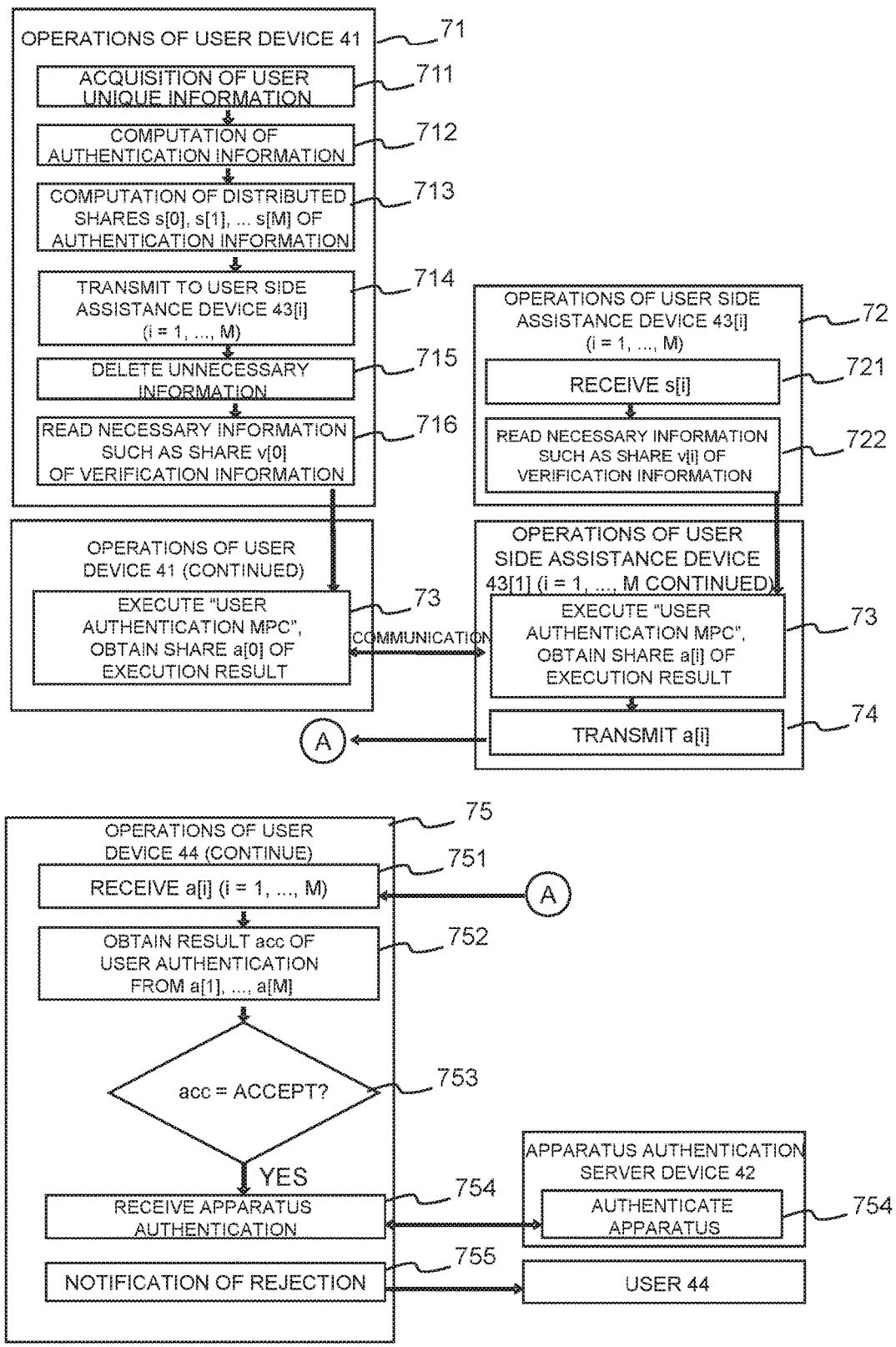
FIG. 7 is a flow diagram showing an example of operation in user authentication.

A description is given of user authentication according to FIG. 7.

Step 71: the user device 41 executes the following.

Step 711: the acquisition part 4111 obtains user unique information from the user 44.

Step 712: the authentication information derivation part 41211 inputs the user unique information and outputs authentication information.

Step 713: the authentication information distribution part 41212 inputs authentication information and the number M of user side assistance devices 43, and outputs distributed shares s[0], s1], . . . , s[M] of the authentication information.

Step 714: for i=1, . . . , M, the assistance communication part 4141 of the communication part 414 transmits the distributed share s[i] of the authentication information to the user side assistance device 43[i].

Step 715: the user device 41 deletes user unique information and distributed shares s[1], . . . , s[M] of authentication information.

Step 716: a user device user authentication MPC part 4123 reads share v[0] of the verification information of the user 44, the verification protocol for the user authentication, and advance computation data p[0] (if it exists), from the storage part 413.

Step 72: for i=1, . . . , M, the user side assistance device 43[i] executes the following.

Step 721: the assistance communication part 4331[i] of the communication part 433[i] receives distributed share s[i] of the authentication information.

Step 722: a user side assistance device user authentication MPC part 4311[i] reads, from the distributed share database 4321[i], share v[i] of the verification information of the user 44 and the verification protocol of the user authentication held by the user device 41, and reads advance computation data p[i] (if it exists), from the storage part 432[i].

Step 73: the user device 41 inputs distributed share s[0] of the authentication information, distributed share v[0] of the verification information, advance computation data p[0] (if it exists), and verification protocol for user authentication, to the user device user authentication MPC part 4123. For i=1, . . . , M, the user side assistance device 43[i] inputs distributed share s[i] of the authentication information, distributed share v[i] of the verification information, advance computation data p[i] (if it exists), and verification protocol for user authentication, to the user side assistance device user authentication MPC part 4311[i]. In this way, "user authentication MPC" is executed. As an execution result, the user device 41 obtains the user authentication result share a[0]. For i=1, . . . M, the user side assistance device 43[i]

obtains the user authentication result share a[i]. It is to be noted that details of the "user authentication MPC" are described later.

Step 74: for i=1, . . . M, the assistance communication part 4331[i] of the user side assistance device 43[i] sends the user authentication result share a[i] to the user device 41.

Step 75: the user device 41 executes the following.

Step 751: the assistance communication part 4141 receives the user authentication result shares a[1], . . . a[M].

Step 752: a user authentication result reconstruction part 4124 inputs a[0], . . . , a[M], and outputs a result acc of the user authentication.

Step 753: the user authentication result reconstruction part 4124 judges whether the result acc of the user authentication is "accept" or "reject".

Step 754: in a case where the user authentication result acc is "accept", the user device 41 receives apparatus authentication from the apparatus authentication server device 42 being assisted by the user side assistance device 43[1], . . . , user side assistance device 43[M]. It is to be noted that details of the "apparatus authentication" are described later.

Step 755: in a case where the user authentication result is "reject", the user device 41 communicates that the authentication has been rejected to the user 44 via the notification part 415 and finishes.

[User Authentication MPC]

A method of realizing user authentication MPC based on the ZKIP system or MAC system is described.

Details of the user authentication MPC performed in step 73 of the user authentication described in FIG. 7 are described. In the user authentication MPC, the user device 41 uses the user device user authentication MPC part 4123. Meanwhile the user side assistance devices 43 use the user side assistance device user authentication MPC part 4311.

First, a description is given of a configuration of the user device user authentication MPC part 4123 and the user side assistance device user authentication MPC part 4311.

Figure 8:
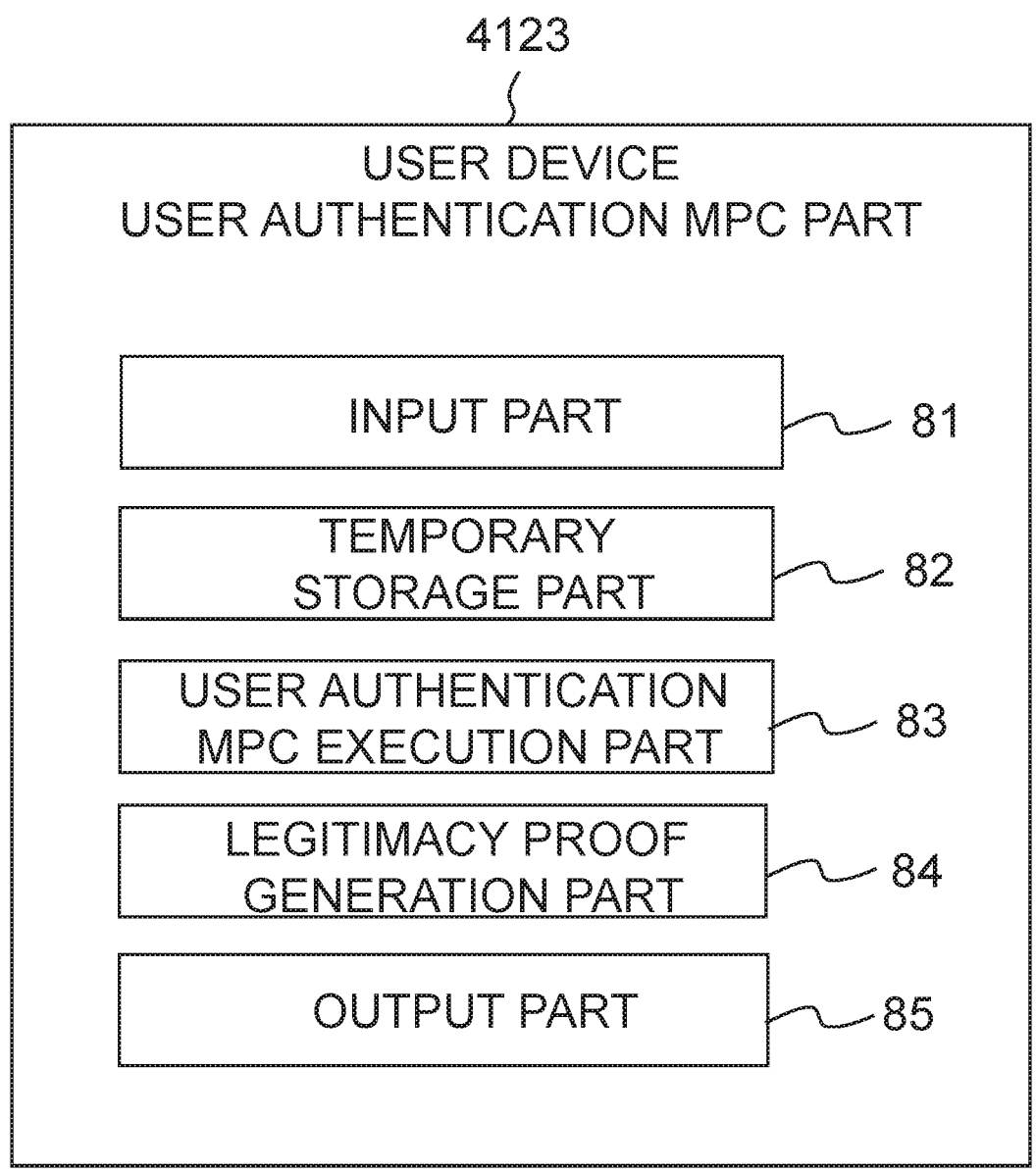
FIG. 8 is a block diagram showing an example of a configuration of a user device user authentication MPC part.

FIG. 8 is a block diagram showing an example of a configuration of the user device user authentication MPC part 4123.

Figure 9:
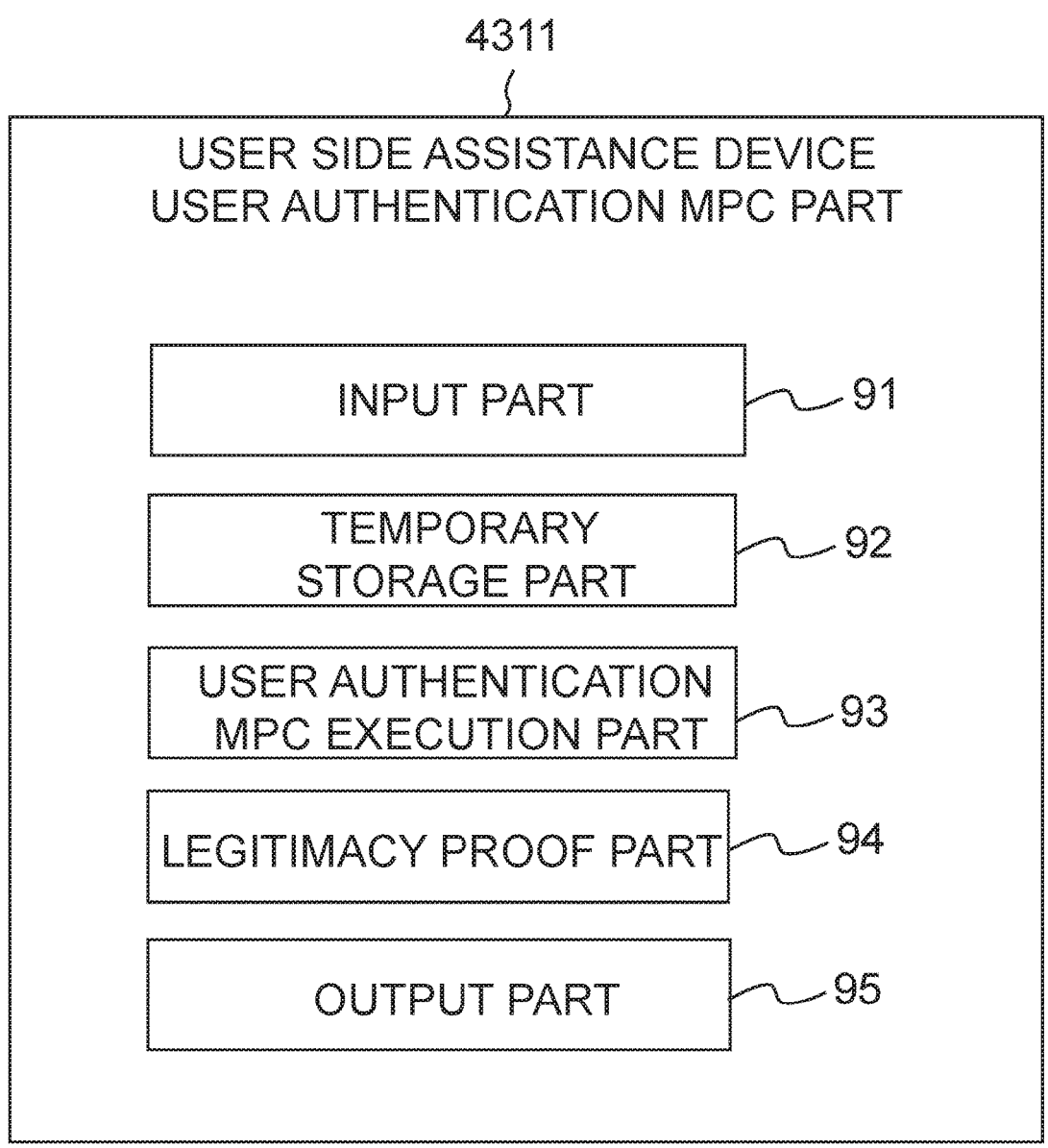
FIG. 9 is a block diagram showing an example of a configuration of a user side assistance device user authentication MPC part.

FIG. 9 is a block diagram showing an example of a configuration of the user side assistance device user authentication MPC part 4311.

Referring to FIG. 8 and FIG. 9, the user device user authentication MPC part 4123 has a legitimacy proof generation part 84, but on the other hand, differs in that the user side assistance device user authentication MPC part 4311 has a legitimacy proof verification part 94.

The existing ZKIP system and MAC system, whenever respective steps in MPC are executed, both have a step of generating a legitimacy proof that proves that each MPC device has correctly executed that step, and a step of verifying the legitimacy proof generated by other MPC devices in order to confirm that the other MPC devices have correctly executed that step.

However, in the case of the present exemplary embodiment, for the reason mentioned in "Outline of First Exemplary Embodiment", a legitimacy proof generation part 84 is provided, which creates a legitimacy proof for the user device 41 only, and a legitimacy proof verification part 94 only, which verifies the legitimacy proof of the user device 41, is provided in the user side assistance devices 43.

Figure 10:
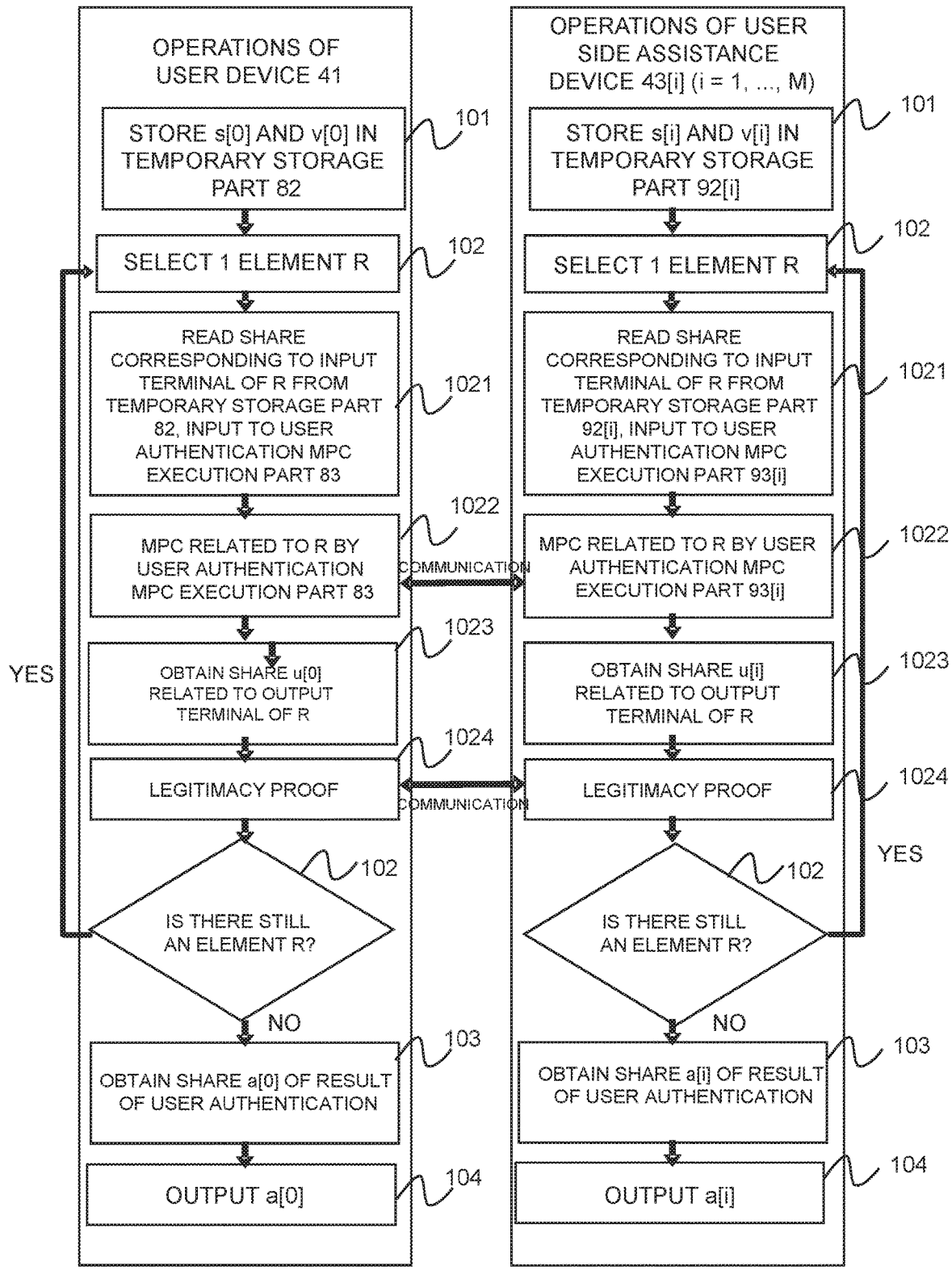
FIG. 10 is a flow diagram showing an example of operations in user authentication MPC.

A description is given of user authentication MPC according to FIG. 10.

Step 101: in the user device 41, an input part 81 of the user device user authentication MPC part 4123 inputs a distributed share s[0] of the authentication information and a distributed share v[0] of the verification information and a verification protocol for user authentication, and stores the distributed share s[0] of the authentication information and the distributed share v[0] of the verification information in a temporary storage part 82. For i=1, . . . M, an input part 91[i] of the user side assistance device user authentication MPC part 4311[i] in the user side assistance device 43[i] inputs a distributed share s[i] of the authentication information and a distributed share v[i] of the verification information and a verification protocol for user authentication, to be stored in a temporary storage part 92[i].

Step 102: for each element R of the verification protocol of the user authentication, the following are executed in order, from the smaller element number.

Step 1021: input terminals of element R are c[1], . . . , c[N] Here N is the number of input terminals of element R. The user device 41 reads shares t[0,1], . . . , t[0,N] corresponding to input terminals c[1], . . . , c[N] of element R, and advance computation data q[0,R] (if it exists) from the temporary storage part 82, and inputs element R and shares t[0,1], . . . , t[0,N] to a user authentication MPC execution part 83. For i=1, . . . , M, the user side assistance device 43[i] reads shares t[i,1], . . . , t[i,N] corresponding to input terminals c[1], . . . , c[N] of element R from the temporary storage part 92[i], and inputs element R and shares t[i,1], . . . , t[i,N] and advance computation data q[i,R] (if it exists) to the user authentication MPC execution part 93[i].

Step 1022: the user authentication MPC execution part 83 and the user authentication MPC execution part 93[1], . . . , user authentication MPC execution part 93[M] communicate using communication part 414, and communication part 433[1], . . . , communication part [433], and execute MPC related to element R.

Step 1023: the user authentication MPC execution part 83 returns share u[0] of an output terminal of element R to the user device 41. For i=1, . . . , M, the user authentication MPC execution part 93[i] returns share u[i] to the user side assistance device 43[i] an output terminal of element R.

Step 1024: the user device 41 inputs element R, shares t[0,1], . . . , t[0,N], a random number used in execution of the user authentication MPC execution part 83 (if it exists), and advance computation data q[0,R] (if it exists) to the legitimacy proof generation part 84. For I-1, . . . , M, the user device 41 and the user side assistance device 43[i] respectively use the communication part 414 and communication part 433[i] to execute processing of the legitimacy proof generation part 84 and the legitimacy proof verification part 94, while performing communication.

Step 103: as an execution result, the user device 41 obtains the user authentication result share a[0]. For i= 1, . . . M, the user side assistance device 43[i] obtains the user authentication result share a[i].

Step 104: the user device 41 outputs the user authentication result share a[0]. For i=1, . . . M, the user side assistance device 43[i] obtains the user authentication result share a[i].

[Apparatus Authentication]

Next, a description is given concerning details of apparatus authentication according to the present exemplary embodiment. In the apparatus authentication of the present exemplary embodiment, the user device 41 and the apparatus authentication server device 42 execute some sort of public key authentication such as authentication standardized according to the UAF standard in FIDO. In already known pubic key authentication, the user authentication 41 performs authentication by using its own secret key. On the other hand, the apparatus authentication server device 42 verifies authentication of the user device 41 by using the public key of the user device 41.

However, in the case of the present exemplary embodiment, the user device 41 does not hold its own secret key, and the secret key of the user device 41 is distributed and shared by the user device 41, the user side assistance device 43[1], ..., user side assistance device 43[M]. Therefore, the already known public key authentication cannot be used in the present exemplary embodiment as it is.

Therefore, in the present exemplary embodiment, the data computed by the user device 41 using the secret key in the public key authentication is changed so as to have computation by MPC of the user device 41, the user side assistance device 43[1], ..., user side assistance device 43[M].

It is to be noted that as described above, in the present exemplary embodiment the method of computing necessary data by the user device 41 is different from normal public key authentication. However, communication data exchanged between the user device 41 and the apparatus authentication server device 42 is the same as in normal pubic key authentication. Computation performed on the apparatus authentication server device 42 side is the same as in normal public key authentication. Therefore, in the present exemplary embodiment it is possible to use a communication standard of a known authentication system as it is. That is, according to the present exemplary embodiment, communication is possible with all server devices satisfying the communication standard of the known authentication system. In this way, in the present exemplary embodiment no problem of compatibility of communication protocols occurs as in existing technology.

The apparatus authentication based on public key authentication in the present exemplary embodiment satisfies the following assumptions. The apparatus authentication is performed using a subroutine (or unit) known as a "secret key usage computation part" (or a unit including a "secret key usage computation" in a portion of the unit name; the same applies below), and the secret key is only used by the "secret key usage computation part".

A portion outside of the "secret key usage computation part" in the subroutine that performs the apparatus authentication is called a "secret key unnecessary computation part".

In the present exemplary embodiment, only the portion of the secret key usage computation part in the authentication means is executed by MPC between the user device 41 and the apparatus authentication server device 42. On the other hand, the portion of the secret key unnecessary computation part is executed by the user device 41 alone.

Figure 11:
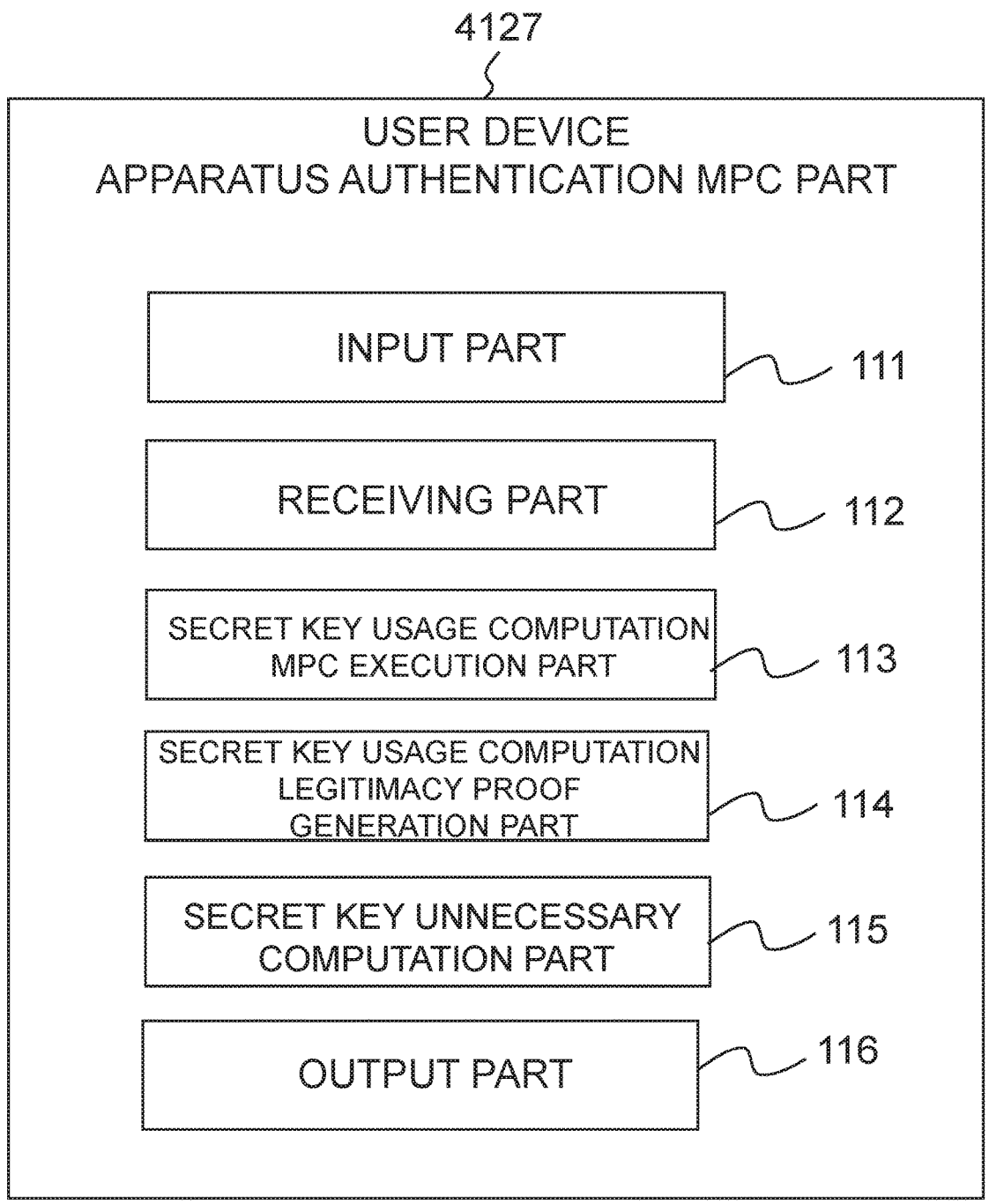
FIG. 11 is a block diagram showing an example of a configuration of a user device apparatus authentication MPC part.

FIG. 11 is a block diagram showing an example of a configuration of a user device apparatus authentication MPC part 4127.

Figure 12:
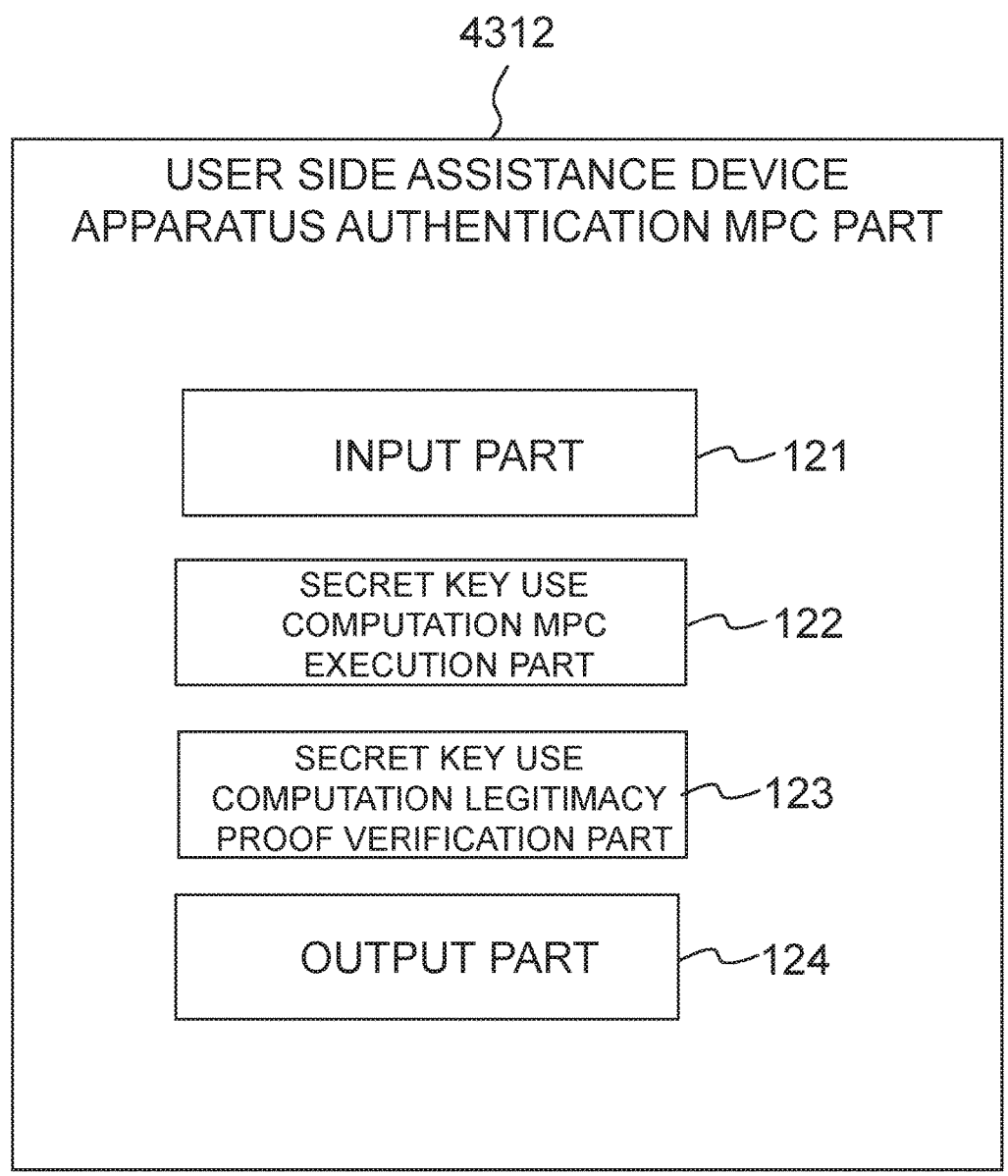
FIG. 12 is a block diagram showing an example of a configuration of a user side assistance device apparatus authentication MPC part.

FIG. 12 is a block diagram showing an example of a configuration of a user side assistance device apparatus authentication MPC part 4312.

Figure 13:
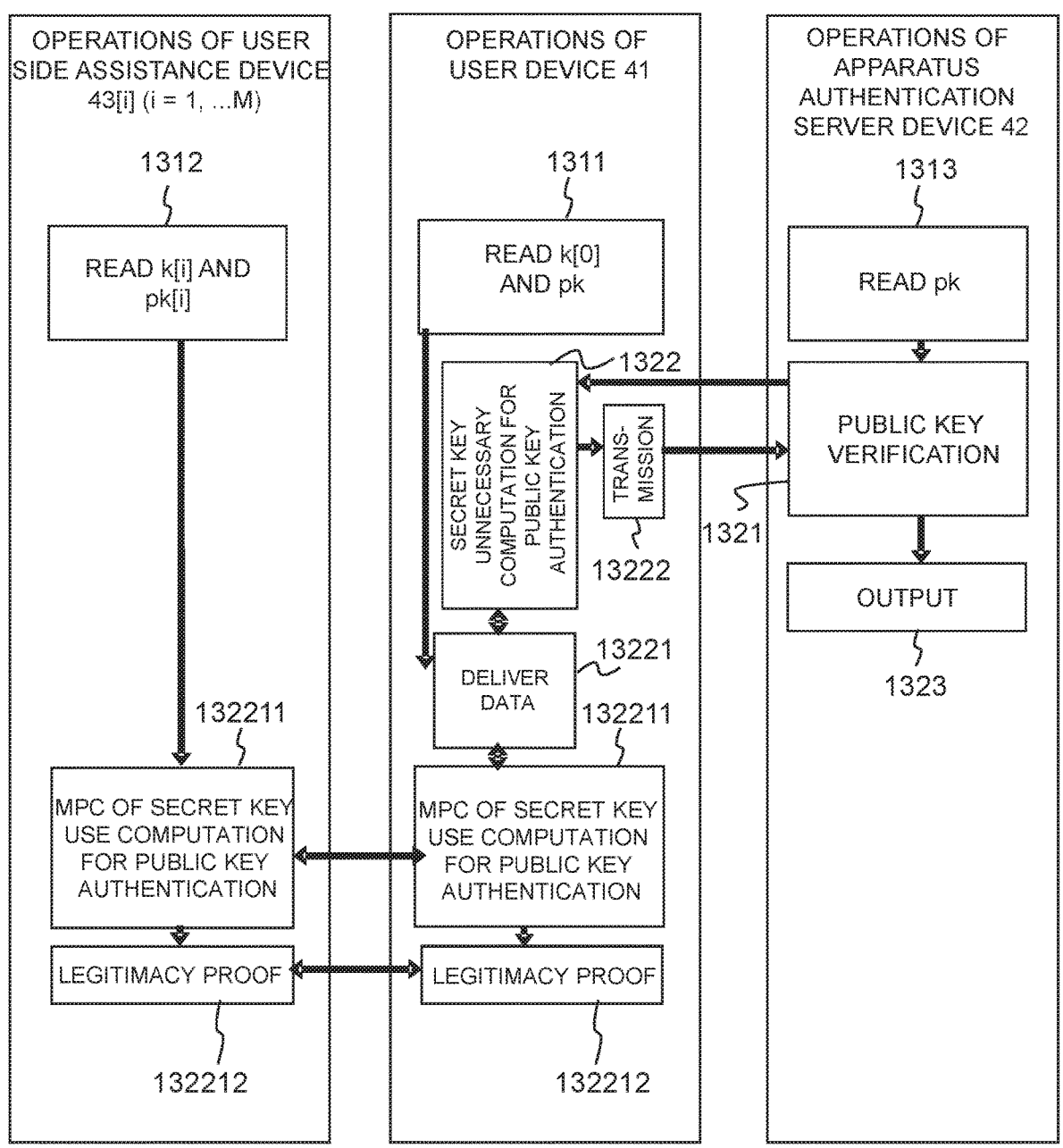
FIG. 13 is a flow diagram showing an example of operations in apparatus authentication.

FIG. 13 is a flow diagram showing an example of operations in apparatus authentication.

Step 131: Respective devices perform input of data as follows.

Step 1311: The user 41 reads share [0] of the secret key and public key pk of the user device 41 from the storage part 413, and inputs to an input part 111 of the user device apparatus authentication MPC part 4127.

Step 1312: For i=1, ..., M, the user side assistance device 43[i] reads share [i] of the secret key and the public key pk of the user device 41 from the distributed share database 4321, and inputs to the input part 121 of the user side assistance device apparatus authentication MPC part 4312.

Step 1313: the apparatus authentication server device 42 reads the public key pk of the user device 41, from the public key database 4221, and inputs to the apparatus authentication verification part 4212.

Step 132: the apparatus authentication server device 42 and the user device 41 perform exchange of data as follows.

Step 1321: the apparatus authentication server device 42 executes the apparatus authentication verification part 4212, and the in a case where the apparatus authentication verification part 4212 outputs a data transmission request to the user device 41, data is transmitted to the user device 41 using the server device front end 4231.

Step 1322: the user device 41 receives the data sent by the apparatus authentication server device 42 using the user device front end 4142, inputs the received data to the secret key unnecessary computation part 115, and performs execution as follows.

Step 13221: each time the secret key unnecessary computation part 115 requests secret key usage computation as a subroutine, the secret key unnecessary computation part 115 inputs data given to the subroutine, to a secret key usage computation MPC execution part 113, and performs execution as follows.

Step 132211: the secret key usage computation MPC execution part 113 executes MPC by performing intercommunication with the secret key usage computation MPC execution part 122[1], ..., secret key usage computation MPC execution part 122[M] of the user side assistance device 43[1], ..., user side assistance device [43]M], computes necessary data, and responds to the secret key unnecessary computation part 115 with the computed data.

Step 132212: For i=1, ..., M, the user device 41 and the user side assistance device 43[i] respectively execute processing of the secret key usage computation legitimacy proof generation part 114 and the secret key usage computation legitimacy proof verification part 123[i], while performing communication using the assistance communication part 4141 and assistance communication part 4331[i]. In this way, legitimacy proof of MPC performed in Step 132211 and verification thereof are performed.

Step 13222: In a case where the secret key unnecessary computation part 115 outputs a data transmission request to the apparatus authentication server device 42, the user device 41 uses the user device front end 4142 to transmit data to the apparatus authentication server device 42.

Step 1323: Finally, in a case where the apparatus authentication verification part 4212 of the apparatus authentication server device 42 outputs data indicating "accept" or "reject", the apparatus authentication server device 42 finishes the apparatus authentication verification part 4212.

In the authentication system according to the present exemplary embodiment, multi-party computation is performed using distributed shares of verification information and authentication information between the user side assistance device and the user device. Therefore, the user device does not have to hold the verification information and the authentication information as is, and there is no need to assume the existence of a secure area within the user device as in the FIDO system. In the present exemplary embodiment, data exchanged between the user device and the apparatus authentication server device is similar to the existing FIDO system. Therefore, according to the present exemplary embodiment it is possible to use a communication front end with regard to an existing apparatus authentication server, without providing a proprietary specification communication front end as in a server side MPC system and encrypted communication system. Moreover, according to the present exemplary embodiment it is possible to perform both user authentication and apparatus authentication similar to the FIDO system. That is, according to the authentication system of the present exemplary embodiment, in an authentication system that performs user authentication and apparatus authentication, it is possible to use a communication front end for an existing apparatus authentication server, without requiring a secure area within the user device. Therefore, according to the present exemplary embodiment it is possible to eliminate the abovementioned problems of existing systems such as the FIDO system, server side MPC system and encrypted communication system.

In the present exemplary embodiment, by employing a server machine as the user side assistance device, deviation from the MPC protocol by the user side assistance device is prevented. At this time, the user device only creates a legitimacy proof, and it is possible to omit generation of legitimacy proof by the server side assistance device. Therefore, according to the present exemplary embodiment it is possible to greatly improve computation efficiency and communication efficiency in comparison to the existing ZKIP system and MAC system.

Second Exemplary Embodiment

Next, a description is given concerning an authentication system according to a second exemplary embodiment, making reference to the drawings. In the present exemplary embodiment a user authentication MPC based on a Garbled Circuit (GC) method is employed.

A configuration of the authentication system of the present exemplary embodiment is the same as the configuration (FIG. 4) of the first exemplary embodiment.

A flow diagram indicating user authentication of the present exemplary embodiment is similar to the first exemplary embodiment (FIG. 7). However, in the present exemplary embodiment a user authentication MPC of step 73 is substituted as described below.

[User Authentication MPC]

A description is given concerning a user authentication MPC based on the GC method.

A description is given concerning details of the user authentication MPC performed in step 73 of authentication procedures shown in FIG. 7. In the user authentication MPC a user device 41 executes processing of a user device user authentication MPC part 4123. Meanwhile a user side assistance devices 43 execute processing of a user side assistance device user authentication MPC part 4311.

First, a description is given of a configuration of the user device user authentication MPC part 4311 and the user side assistance device user authentication MPC part 4123.

Figure 14:
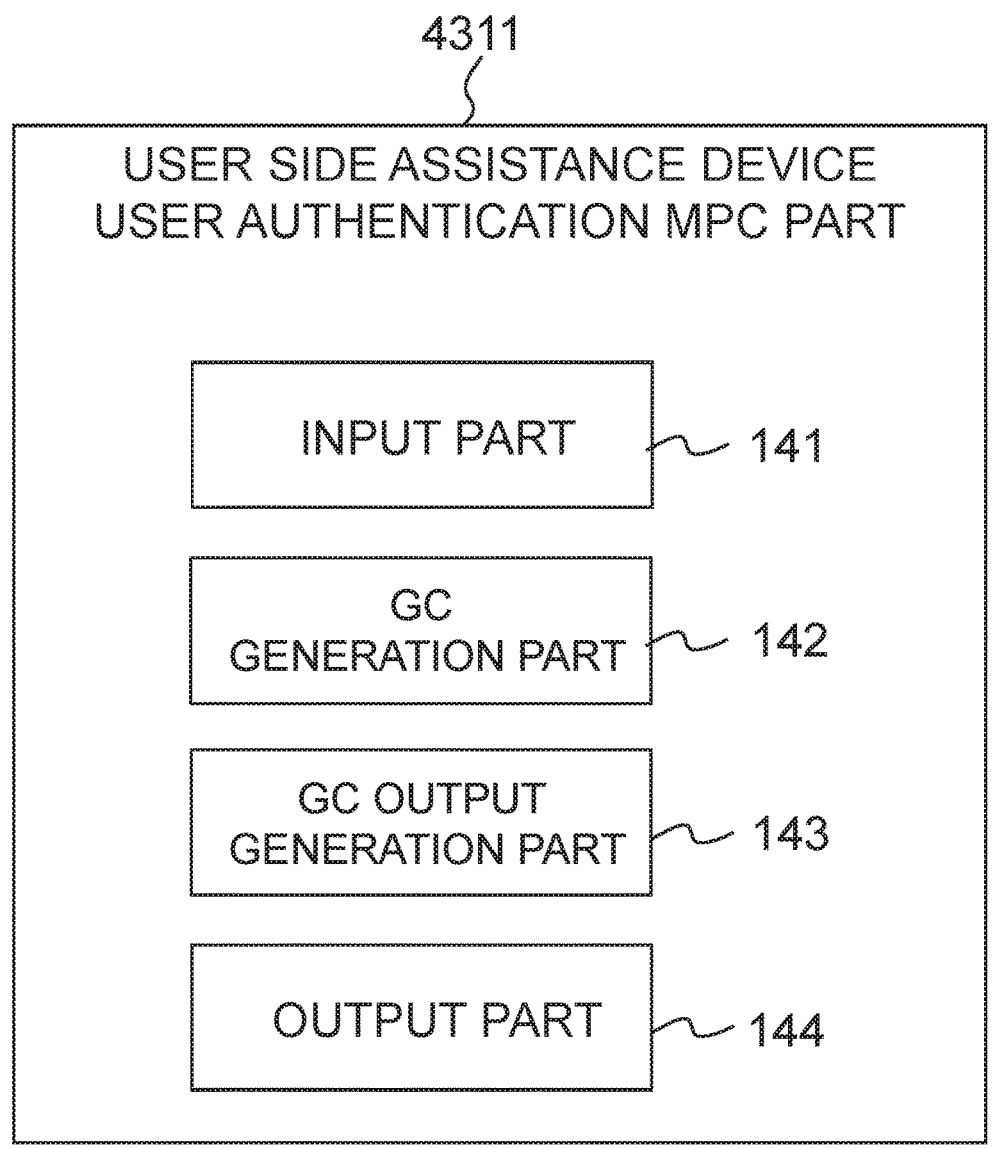
FIG. 14 is a block diagram showing an example of a configuration of a user side assistance device user authentication MPC part.

FIG. 14 is a block diagram showing an example of a configuration of the user side assistance device user authentication MPC part 4311.

It is to be noted that in the user authentication mentioned here, there is only one user side assistance device 43. The device configuration of FIG. 14 is for describing only this one user side assistance device 43[1].

Figure 15:
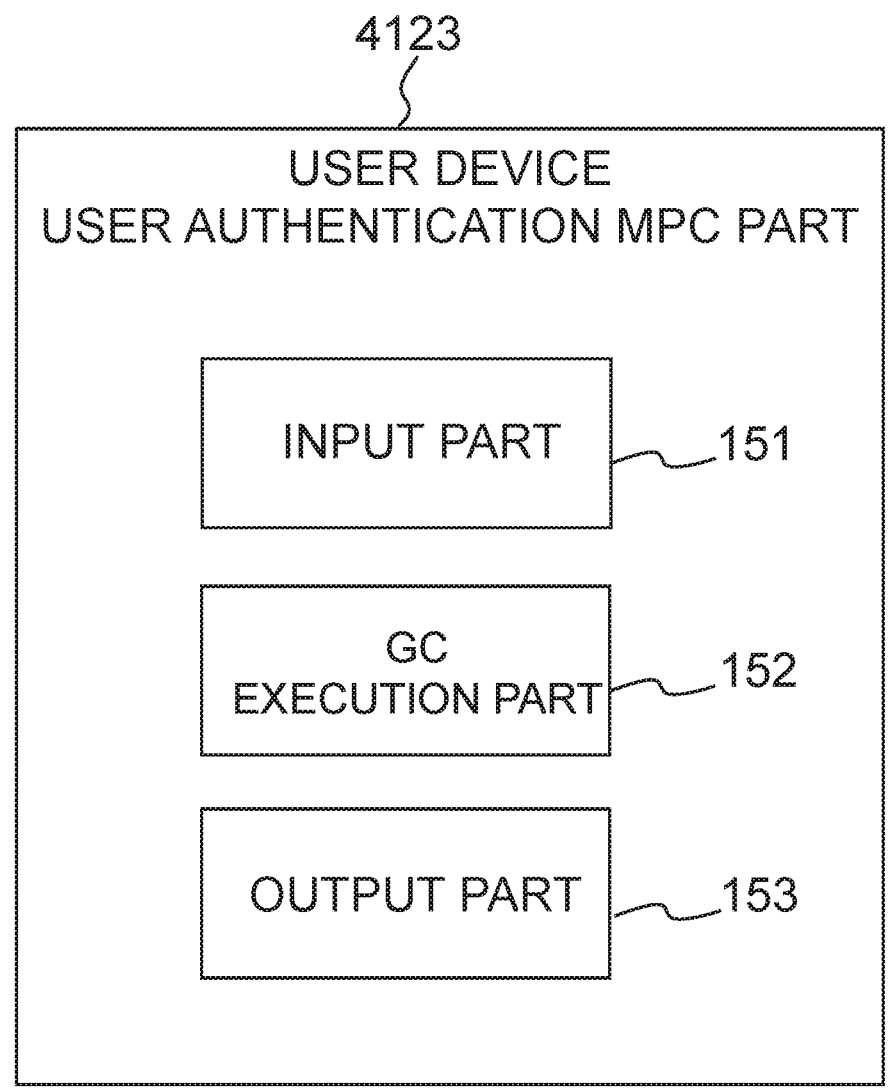
FIG. 15 is a block diagram showing an example of a configuration of a user device user authentication MPC part.

FIG. 15 is a block diagram showing an example of a configuration of the user device user authentication MPC part 4123.

Figure 16:
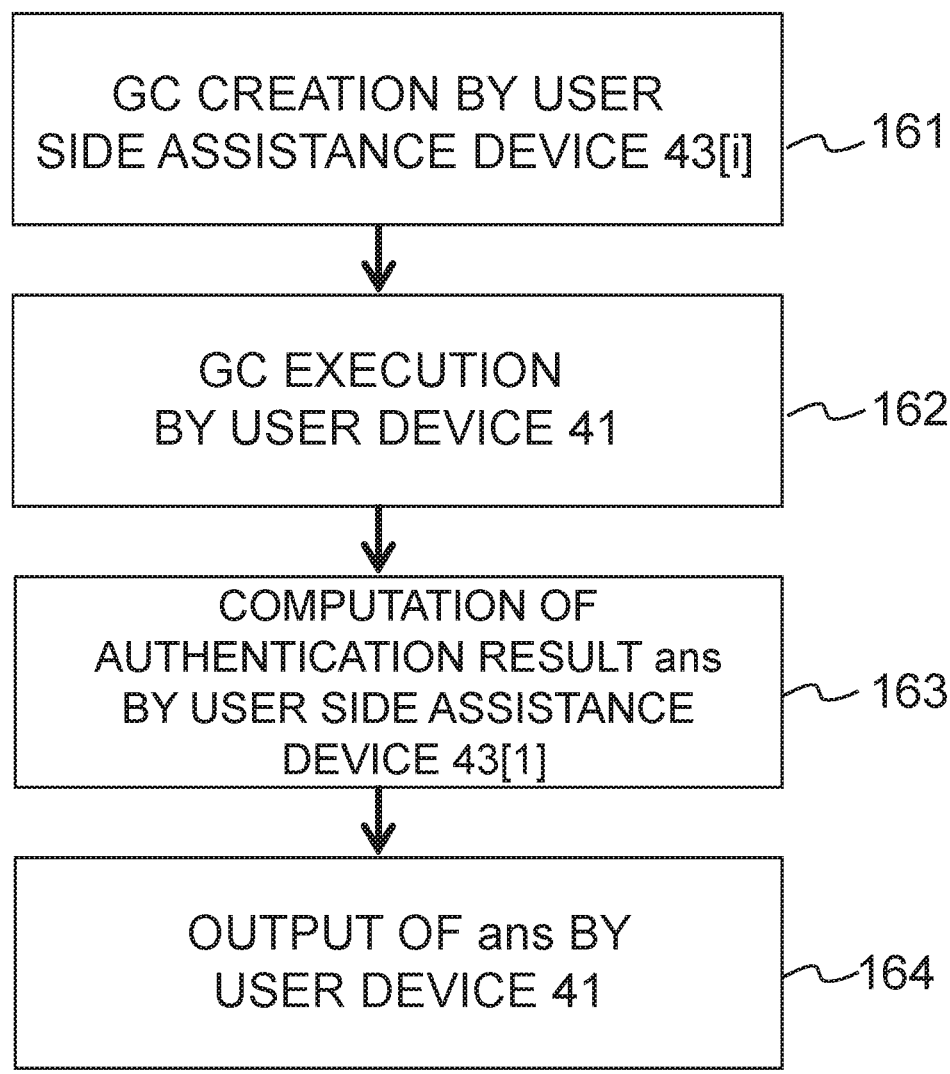
FIG. 16 is a flow diagram showing an example of operations in user authentication MPC in a second exemplary embodiment.

A description is given of user authentication MPC according to the present exemplary embodiment following FIG. 16.

Step 161: the user side assistance device 43[1] inputs distributed share s[1] of authentication information, distributed share v[1] of verification information, and verification protocol for user authentication, to the user side assistance device user authentication MPC part 4311. The user side assistance device user authentication MPC part 4311 receives this data from an input part 14, and creates GC and key data K by inputting a circuit diagram for function f to a GC generation part 142. Here, function f(a,b) is a function in which "a, b are regarded as distributed shares of the authentication information and the verification information, authentication information x is reconstructed using a and s[1], the verification information y is reconstructed using b and v[1], x and y are used to perform user authentication, and an authentication result is outputted". The user side assistance device 43[1] transmits GC to the user device 41 using the communication part 433[1].

Step 162: The user device user authentication MPC part 4123 of the user device 41 receives the GC using the communication part 414, and uses the GC to execute processing of the GC execution unit 152. The user device 41 obtains output E of the GC execution part 152, and uses the notification part 414 to send the output E to the user side assistance device 43[1].

Step 163: The user side assistance device user authentication MPC part 4311 of the user side assistance device 43[1] receives output E using the notification part 415[1], inputs the output E and key data K to the GC output generation part 143, and obtains data "ans" as output, indicating that the result of the user authentication is "accept" or "reject".

Step 164: the user device 41 does not output anything from the output part 144. That is, share s[0] of MPC output is a null character string. The user side assistance device 43[1] outputs ans as share s[1] of MPC output. Next, the user device 41 receives s[1]=ans from the user side assistance device 43[1], and the user authentication result reconstruction part 4124 outputs ans.

In the abovementioned MPC, similar to the first exemplary embodiment a description was given assuming that authentication information is secretly shared by the authentication information distribution part 41212 as performed in Step 713, and distributed shares s[0], s[1] are generated as a result. However in a case where in Step 713 the authentication information distribution part 41212 does not perform execution, and with s[0] as the authentication information itself, s[1] is a null character string, the present exemplary embodiment operates correctly, and it is possible to guarantee security.

In the authentication system according to the present exemplary embodiment also, an effect similar to the first exemplary embodiment is realized. That is, according to the authentication system of the exemplary embodiment, in an authentication system that performs user authentication and apparatus authentication, it is possible to use a communication front end for an existing apparatus authentication server, without requiring a secure area within the user device. In the present exemplary embodiment, the user device cannot obtain authentication information and verification information, but rather only shares thereof and GC. Therefore, according to the present exemplary embodiment it is possible to eliminate the problem of the GC method where the authentication information and verification information leak to the user device.

Third Exemplary Embodiment

Next, a description is given concerning an authentication system according to a third exemplary embodiment, making reference to the drawings.

In the first and second exemplary embodiments, in a case where user authentication is accepted, the user device 41 performs apparatus authentication while being assisted by the user side assistance devices 43. On the other hand, in a case where the user authentication is rejected, apparatus authentication is not performed, a notification is given to the user 44 that the user authentication has been rejected, and the processing finishes. At this time, the user side assistance devices 43 obtain information of 1 bit as to whether the user authentication was accepted or rejected.

In the present exemplary embodiment a description is given of a method of hiding the information as to whether the user authentication was accepted or rejected, with regard to the user side assistance devices 43.

A configuration of the authentication system of the present exemplary embodiment is the same as the first exemplary embodiment (FIG. 4). However, in the present exemplary embodiment the user device 41 also has an apparatus authentication simulator MPC part 17 in a back stage (of "reject") of the user authentication result reconstruction part 4124.

Operations of the present exemplary embodiment are similar to the first exemplary embodiment, excepting step 755 of the flow diagram (FIG. 7) showing user authentication.

In the present exemplary embodiment, instead of step 755, the following operations are executed.

In a case where the user authentication result is "reject", the user device 41 executes the apparatus authentication simulator MPC instead of the apparatus authentication server device 42, while receiving assistance of user side assistance device 43[1], . . . , user side assistance device 43[M]. Details of the apparatus authentication simulator are described later. When the apparatus authentication simulator MPC is finished, the user device 41 communicates that the authentication has been rejected to the user 44 via the notification part 415 and finishes.

For the user authentication MPC of Step 73 in FIG. 7, the ZKIP system or the MAC system described in the first exemplary embodiment may be used, or the GC method described in the second exemplary embodiment may be used.

For the apparatus authentication of Step 754 in FIG. 7, the RSA described in the first exemplary embodiment may be used, or the discrete logarithm described in the second exemplary embodiment may be used.

[Apparatus Authentication Simulated MPC]

The basic idea of apparatus authentication simulator MPC is that the user device 41 executes operations of an apparatus authentication verification part 4212, which are executed by the apparatus authentication server device 42 in normal apparatus authentication. In this way, Step 754 in FIG. 7 is the same, with the exception of whether processing of the apparatus authentication verification part 4212 is executed by the apparatus authentication server device 42 or the user device 41.

A user side assistance device 43 has no method of judging whether the apparatus authentication verification part 4212 is executed by the apparatus authentication server device 42 or the user device 41. Therefore, the user side assistance device 43 does not have a method of judging whether user authentication is accepted (that is Step 754 is executed) or user authentication is rejected (that is, step 755 is executed).

Figure 17:
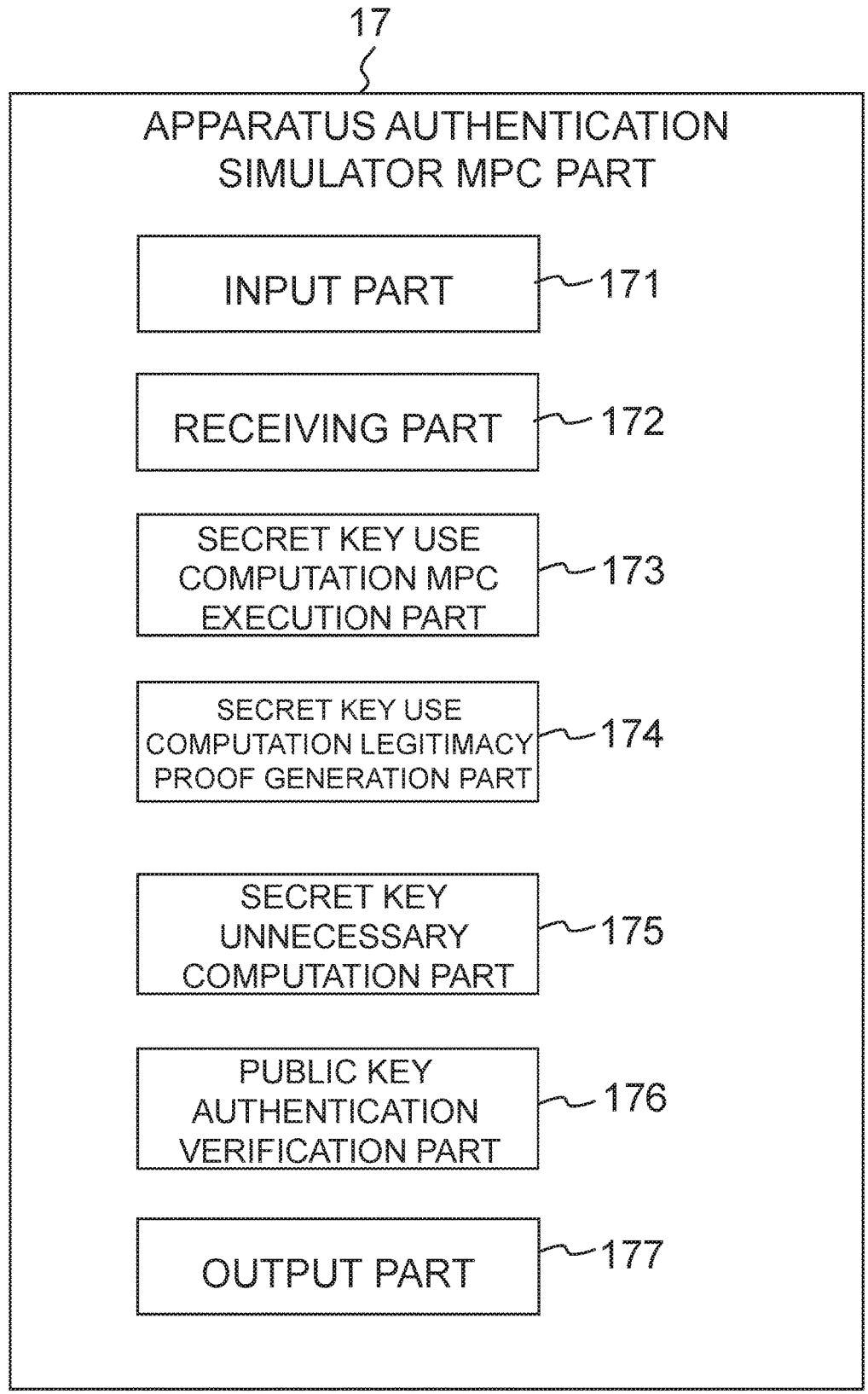
FIG. 17 is a block diagram showing an example of a configuration of an apparatus authentication simulation MPC part.

FIG. 17 is a block diagram showing an example of a configuration of an apparatus authentication simulator MPC part 17.

When the user device 41 executes processing of a secret key usage computation MPC execution part 173, the apparatus authentication simulator MPC part 17 executes MPC while performing intercommunication with the secret key usage computation MPC execution part 122 of the user side assistance device 43.

The secret key usage computation MPC execution part 173, a secret key usage computation legitimacy proof generation part 174 and a secret key unnecessary computation part 175 in FIG. 17 are respectively the same as the secret key usage computation MPC execution part 113, the secret key usage computation legitimacy proof generation part 114 and the secret key unnecessary computation part 115 of the user device apparatus authentication MPC part 4127 in FIG. 11. The public key authentication verification part 176 in FIG. 17 is the same as the apparatus authentication verification part 4212 of the apparatus authentication server device 42 in FIG. 4.

Figure 18:
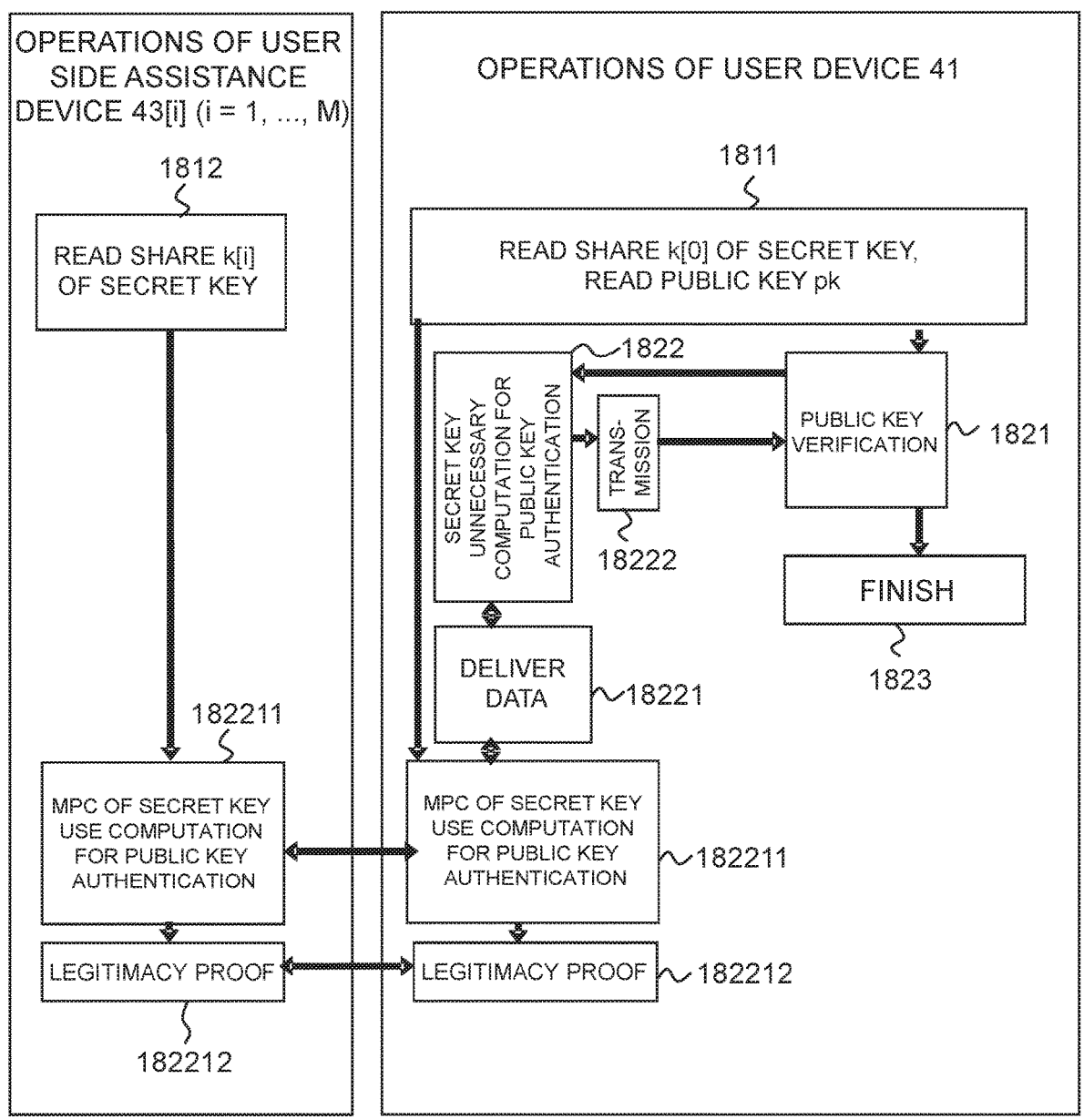
FIG. 18 is a flow diagram showing an example of operations in apparatus authentication simulation MPC.

FIG. 18 is a flow diagram showing an example of operations in the apparatus authentication simulator MPC.

Step 181: Respective devices perform input of data as follows.

Step 1811: The user device 41 reads share k[0] of a secret key from a storage part 413 and inputs to an input part 171 of the apparatus authentication simulator MPC part 17. The user 41 further reads its own public key pk from the storage part 413, and inputs to the public key authentication verification part 176.

Step 1812: For i=1, . . . , M, the user side assistance device 43[i] reads share [i] of the secret key from the distributed share database 4321, and inputs to an input part 121 of a user side assistance device apparatus authentication MPC part 4312.

Step 182: the user device 41 executes the following.

Step 1821: when the user device 41 executes the public key authentication verification part 176, and the public key authentication verification part 176 outputs a data transmission request, the data requested to be transmitted is inputted to the secret key unnecessary computation part 175.

Step 1822: the user device 41 inputs the data requested to be transmitted to the secret key unnecessary computation part 175, and performs execution as follows.

Step 18221: each time the secret key unnecessary computation part 175 requests secret key usage computation as a subroutine, the secret key unnecessary computation part 175 inputs data given to the subroutine, to a secret key usage computation MPC execution part 173, and performs execution as follows.

Step 182211: the secret key usage computation MPC execution part 173 executes MPC by performing intercommunication with the secret key usage computation MPC execution part 122[1], . . . , secret key usage computation MPC execution part 122[M] of the user side assistance device 43[1], . . . , user side assistance device [43]M], computes necessary data, and responds to the secret key unnecessary computation part 175 with the computed data.

Step 182212: For i=1, . . . , M, the user device 41 and the user side assistance device 43[i] execute processing of a secret key usage computation legitimacy proof generation part 174 and a secret key usage computation legitimacy proof verification part 123[i], while performing communication using an assistance communication part 4141 and an assistance communication part 4331[i]. In this way, legitimacy proof of MPC performed in Step 182211 and verification thereof are performed.

Step 18222: when the secret key usage computation legitimacy proof generation part 174 outputs a data transmission request, the user device 41 inputs the requested data to a public key authentication verification part 176.

Step 1823: Finally, when the public key authentication verification part 176 outputs data indicating "accept" or "reject", the user device 41 finishes the apparatus authentication simulator MPC.

In the authentication system according to the present exemplary embodiment also, an effect similar to the abovementioned exemplary embodiments is realized. That is, according to the authentication system of the present exemplary embodiment, in an authentication system that performs user authentication and apparatus authentication, it is possible to use a communication front end for an existing apparatus authentication server, without requiring a secure area within the user device. In the present exemplary embodiment in a case where user authentication is denied, by the user device executing the apparatus authentication simulator MPC, it is possible to give absolutely no information concerning whether or not a user has been accepted, to the user side assistance devices. Therefore, according to the present exemplary embodiment the security of the authentication system according to the abovementioned exemplary embodiments is further improved.

Fourth Exemplary Embodiment

Next, a description is given concerning the authentication system according to a fourth exemplary embodiment, making reference to the drawings.

In the present exemplary embodiment, for i=1, ..., M, a counter for counting the number of times user authentication has been rejected is added to the user side assistance device 43[i] of the first exemplary embodiment, and in a case where the counter exceeds a determined threshold the user authentication is rejected.

In the present exemplary embodiment, for i=1, ... M, the user side assistance device 43[i] is also provided with a user authentication result reconstruction part 4124, similar to the user device 41. Excepting this point, system configuration of the present exemplary embodiment is the same as the configuration of the first exemplary embodiment.

For i=1, ... M, a storage part 432[i] of the user side assistance device 43[i] stores the number of times C that a user 44 has been rejected (for each user device 41), in user authentication using the user device 41. Here, the number of times C that the user 44 has been rejected is called a rejection counter. The rejection counter C is initialized to zero (0) beforehand. A threshold T is decided in advance, and the user side assistance device 43[i] stores the threshold T in the storage part 432[i].

Operations of the present exemplary embodiment are similar to the first exemplary embodiment, excepting the point that the following steps are inserted between Step 74 and Step 75 of the flow diagram (FIG. 7) showing user authentication.

For i=1, ... M, j=1, ..., M, the user side assistance device 43[i] sends share a[i] of a user authentication result to the user side assistance device 43[j] using an assistance communication part 4331[i], for j=1, ..., M, the user device 41 sends share a[0] of the user authentication result to the user side assistance device 43[i] using an assistance communication part 4141.

For i=1, ... M, the user side assistance device 43[i] receives shares a[0], ..., a[M] of the user authentication result using the assistance communication part 4331[i], inputs the shares a[0], ..., a[M] of the user authentication result, and executes processing of a user authentication result reconstruction part. In this way, the user side assistance device 43[i] obtains the result acc of the user authentication. In a case where the result acc of the user authentication represents "reject", the user side assistance device 43[i] adds 1 to the rejection counter C of the user device 41 held by the storage part 432[i]. In a case where the value of the rejection counter C is greater than or equal to a threshold value T stored in the storage part 432[i], the user side assistance device 43[i] rejects all user authentication requests from the user device 41 henceforth.

In the authentication system according to the present exemplary embodiment also, an effect similar to the abovementioned exemplary embodiments is realized. That is, according to the authentication system of the present exemplary embodiment, in an authentication system that performs user authentication and apparatus authentication, it is possible to use a communication front end for an existing apparatus authentication server, without requiring a secure area within the user device. In the present exemplary embodiment, if the number of times the user authentication is rejected is greater than or equal to a prescribed threshold, the user side assistance devices reject user authentication henceforth. Therefore, according to the present exemplary embodiment, it is possible to avoid analysis by an unauthorized party, and the security of the authentication system according to the first exemplary embodiment is further improved.

Fifth Exemplary Embodiment

Next, a description is given concerning an authentication system according to a fifth exemplary embodiment, making reference to the drawings. In the present exemplary embodiment, a counter for counting the number of times user authentication has been rejected is added to the user side assistance device 43[1] of the second exemplary embodiment, and in a case where the counter exceeds a determined threshold the user authentication is rejected.

A configuration of the authentication system of the present exemplary embodiment is the same as the configuration of the second exemplary embodiment.

The storage part 432[1] of the user side assistance device 43[1] stores the number of times C that a user 44 has been rejected (for each user device 41), in user authentication using the user device 41. Here, the number of times C that the user 44 has been rejected is called a rejection counter. The rejection counter C is initialized to zero (0) beforehand. A threshold T is decided in advance, and the user side assistance device 43[1] stores the threshold T in the storage part 432[1].

Operations of the present exemplary embodiment are similar to the second exemplary embodiment, excepting the point that the following steps are added between Step 163 and Step 164 of the flow diagram (FIG. 16) showing the user authentication MPC part.

In a case where acc represents "reject", the user side assistance device 43[1] adds 1 to the rejection counter C of the user device 41 held by a storage part 432[1]. In a case where the value of the rejection counter C is greater than or equal to a threshold value T stored in the storage part 432[1], the user side assistance device 43[1] rejects user authentication requests from the user device 41 henceforth.

In the authentication system according to the present exemplary embodiment also, an effect similar to the abovementioned exemplary embodiments is realized. That is, according to the authentication system of the present exemplary embodiment, in an authentication system that performs user authentication and apparatus authentication, it is possible to use a communication front end for an existing apparatus authentication server, without requiring a secure area within the user device. In the present exemplary embodiment, if the number of times the user authentication is rejected is greater than or equal to a prescribed threshold, the user side assistance devices reject user authentication henceforth. Therefore, according to the present exemplary embodiment, it is possible to avoid analysis by an unauthorized party, and the security of the authentication system according to the second exemplary embodiment is further improved.

Sixth Exemplary Embodiment

Next, a description is given concerning an authentication system according to a sixth exemplary embodiment, making reference to the drawings.

A configuration of the authentication system of the present exemplary embodiment differs in the following points from the configuration of the first exemplary embodiment.

In the first exemplary embodiment, the user device 41 is provided with a verification information distributed share generation part 4122. On the other hand, in the present exemplary embodiment, the user device 41 and the user side assistance devices 43 both participate in the "verification information distributed share generation". Unlike the first exemplary embodiment, verification information distributed share generation of the present exemplary embodiment does not have functionality of the verification information derivation part 41221 and the verification information distribution part 41222 of the first exemplary embodiment.

In the first exemplary embodiment, the user device 41 is provided with a authentication information distributed share generation part 4121. On the other hand, in the present exemplary embodiment, "authentication information distributed share generation" is an MPC in which the user side assistance devices 43 participates, and the user device 41 does not participate in this MPC. Unlike the first exemplary embodiment, "authentication information distributed share generation" of the present exemplary embodiment does not have functionality of the authentication information derivation part 41211 and the authentication information distribution part 41212 of the first exemplary embodiment.

The "verification information distributed share generation" of the present exemplary embodiment includes the following three operations.

User unique information distributed share creation for input verification at time of advance preparation.

User unique information distributed share creation for MPC input verification.

Verification information distributed share creation multi-party computation.

When a device that executes "user unique information distributed share creation for input verification at time of advance preparation" is executed, and for input and output, the following applies.

This processing is performed in user authentication advance preparation.

This processing is executed by the user device 41.

In this processing, the user unique information and the number M of user side assistance devices 43 are received as input, and the "user unique information distributed share creation for input verification at time of advance preparation" is outputted. Among these, one is for the user device 41, and the other M devices are for the user side assistance devices 43.

Details of the "user unique information distributed share creation for input verification at time of advance preparation" are as follows. The user unique information received from the user as input is secretly shared, to obtain distributed shares $e[1], \ldots, e[M]$ of the M user unique information items.

For $i=1, \ldots, M$, distributed share [i] of the user unique information is secretly shared, to obtain "distributed shares of the user unique information distributed shares" $c[i], d[i]$.

Distributed shares $e[1], \ldots, e[M]$ are deleted.

The "user unique information distributed shares for verification at time of advance preparation" are $D=(c[1], \ldots, c[M])$. For $i=1, \ldots, M$, the "user unique information distributed shares for verification at time of advance preparation" of the user side assistance device 43[i] is $d[i]$.

When a device that executes "user unique information distributed share creation for MPC input verification" is executed, and for input and output, the following applies.

This processing is executed at a time of user authentication.

This processing is executed by the user side assistance device 43[1], . . . , user side assistance device 43[M].

The input of this processing includes the follow 2 items.

Data required by "user unique information distributed share for verification at time of advance preparation" that is stored by the user device 41.

The "user unique information distributed shares for verification at time of advance preparation" stored by the user side assistance device 43[i].

The processing output is the user unique information distributed shares (referred to below as "user unique information distributed shares for MPC input verification".

For $i=1, \ldots, M$, details of the "user unique information distributed share creation [i] for MPC input verification" executed by the user side assistance device 43[i] are as follows.

Data $c[i]$ obtained from "user unique information distributed shares for verification at time of advance preparation" $D=(c[1], \ldots, c[M])$ stored by the user device 41, and input of the "user unique information distributed share for verification at time of advance preparation" $d[i]$ stored by itself are received as input.

By executing reconstruction of secret sharing using $c[i], d[i]$, user unique information distributed shares (that is, user unique information distributed share for MPC input verification) $e[i]$ is obtained and $e[i]$ is outputted.

When a device that executes "verification information distributed share creation multi-party computation" is executed, and for input and output, the following applies.

This processing is executed at a time of user authentication.

This processing is an MPC in which the user side assistance device 43[1], . . . , user side assistance device 43[M] participate.

For $i=1, \ldots M$, the user side assistance device 43[i] uses a user unique information distributed share it holds, in MPC, to obtain the verification information distributed shares as output of the MPC.

When a device that executes "authentication information distributed share generation" in the present exemplary embodiment is executed, and for input and output, the following applies.

This processing is executed at a time of user authentication.

This processing is an MPC in which the user side assistance device 43[1], . . . , user side assistance device 43[M] participate.

For i=1, . . . M, the user side assistance device 43[i] uses user unique information distributed share it holds, in MPC, to obtain the authentication information distributed shares as output of the MPC.

The "verification information distributed share creation multi-party computation" and the "authentication information distributed share generation MPC" may receive pre-computed data as input, similar to other MPCs in the first exemplary embodiment.

As mentioned in the first exemplary embodiment, the user side assistance devices 43, which are server machines, have much higher security in comparison with the user device 41, and log monitoring is also performed. At this time, even if, for example, an unauthorized party has hijacked a user side assistance device 43, it would be hard to envisage the user side assistance devices 43 performing actions outside of determined operations.

Therefore, in MPC of "verification information distributed share creation multi-party computation" and "authentication information distributed share generation", legitimacy proof and verification in the ZKIP system or MAC system, which are existing MPCs. At this time, it is possible to execute these MPCs at high speed.

Next, among the operations of the first exemplary embodiment, a description is given of details that differ from the present exemplary embodiment.

The user side assistance device user authentication MPC part 4311[i] receives verification information distributed share v[i], authentication information distributed share s[i] and pre-computation data (if it exists) as input, proceeds with MPC computation while performing inter-communication with the user side assistance device user authentication MPC part 4311 of another user side assistance device 43, and outputs the authentication result distributed share a[i]. However, in the present exemplary embodiment, the user device 41 does not participate in this MPC, unlike the first exemplary embodiment. In the first exemplary embodiment, MPC is executed while performing inter-communication with the user device 41 where security is inferior to the user side assistance devices 43 that are server machines. Therefore, the user side assistance device user authentication MPC part 4311[i] of the first exemplary embodiment is provided with a legitimacy proof verification part 94 that verifies legitimacy of operations of the user device 41. However, in the present exemplary embodiment, as described above, the user device 41 does not participate in MPC performed by the user side assistance device user authentication MPC part 4311[i]. Therefore, in the present exemplary embodiment when performing MPC it is possible to omit execution of the legitimacy proof verification part 94.

In the first exemplary embodiment, the user authentication result reconstruction part 4124 receives M+1 distributed shares as input. On the other hand, in the present exemplary embodiment, the user authentication result reconstruction part 4124 only receives M distributed shares as input. As described above this is because the user device 41 does not participate in user authentication MPC, and in the first place only M shares exist.

[User Authentication Advance Preparation]

The user authentication advance preparation of the present exemplary embodiment is as follows.

First the user device 41 executes the following.

The acquisition part 4111 obtains user unique information from the user 44. The "user unique information distributed share creation for input verification at time of advance preparation" is executed using the user unique information and M user side assistance devices 43, and M+1 "user unique information distributed shares for input verification at time of advance preparation" D=(c[1], . . . , c[M]), d=(d[1], . . . , d[M]) are obtained.

D=(c[1], . . . , c[M]) is stored in the storage part 413.

For i=1, . . . , M, d[i] is transmitted to user side assistance device 43[i] using the assistance communication part 4141 of the communication part 414.

The user unique information and distributed shares d[1], . . . , d[M] are deleted.

Next, for i=1, . . . , M, the user side assistance device 43[i] executes the following.

The distributed share d[i] transmitted by the user device 41 is received using the assistance communication part 4331[i] of the communication part 433[i].

The distributed share d[i] is stored in the distributed share database 4321[i].

[Apparatus Authentication Advance Preparation]

This is the same as the First Exemplary Embodiment.

[User Authentication]

User authentication in the present exemplary embodiment is as follows.

The user device 41 executes the following.

The acquisition part 4111 obtains user unique information from the user 44.

The user unique information and M user side assistance devices 43 are used to perform secret sharing of the user unique information, and distributed shares f[1], . . . , f[M] of authentication information are obtained.

The "user unique information distributed shares for verification at time of advance preparation" D=(c[1], . . . , c[M]) are read from the storage part 413. For i=1, . . . , M, f[i] and c[i] are transmitted to user side assistance device 43[i] using the assistance communication part 4141 of the communication part 414.

The user unique information and distributed shares f[1], . . . , f[M] are deleted.

For i=1, . . . , M, the user side assistance device 43[i] executes the following.

The assistance communication part 4331[i] of the communication part 433[i] is used to receive f[i] and c[i].

The "user unique information distributed share for verification at time of advance preparation" d[i] is read from the distributed share database 4321[i]. By inputting c[i] and d[i] and executing "user unique information distributed shares creation for MPC input verification", the user unique information distributed share (user unique information distributed share for MPC input verification) e[i] is obtained.

An algorithm of a verification information derivation part and pre-computation data p[i] (if it exists) are read from the storage part 432, and by using e[i], pre-computation data p[i] (if it exists) and the verification information derivation part algorithm, the "verification information distributed share creation multi-party computation [i]" is executed while performing inter-communication with the user side assistance device 43, and verification information distributed share v[i] is obtained as output.

An algorithm of an authentication information derivation part and pre-computation data q[i] (if it exists) are read from the storage part 432, and by using f[i], pre-computation data q[i] (if it exists) and the authentication information derivation part algorithm, the "authentication information distributed share generation [i]" is executed by multi-party computation while performing inter-communication with the "authentication information distributed share generation [j]" of another user side assistance device 43, and authentication information distributed share s[i] is obtained as output.

An algorithm for user authentication and pre-computation data b[i] (if it exists) are read from the storage part 432, v[i], s[i] and b[i] (if they exist) and the algorithm for user authentication are inputted to the user side assistance device user authentication MPC part 4311[i], the user side assistance device user authentication MPC part 4311[i] is executed while performing inter-communication with the user side assistance device user authentication MPC part 4311 of another user side assistance device 43, and distributed share a[i] of the user authentication result is obtained as an execution result.

Using the assistance communication part 4331[i], a[i] is sent to the user part 41.

f[i], c[i], v[i], s[i] and a[i] are deleted.

The user device 41 executes the following.

a[1], . . . a[M] are received using the assistance communication part 4141.

a[1], . . . a[M] are inputted to the user authentication result reconstruction part 4124, and a user authentication result acc is obtained as output thereof.

A judgment is made as to whether the user authentication result acc is "accept" or "reject".

In a case where the user authentication result acc is "accept", the user device 41 receives apparatus authentication from the apparatus authentication server device 42, while being assisted by the user side assistance device 43[1], . . . , user side assistance device 43[M].

In a case where the user authentication result is "reject", the user device 41 communicates that the authentication has been rejected to the user 44 via the notification part 415, and finishes.

In the present exemplary embodiment, similar to the first exemplary embodiment, in the case where the user authentication result is "reject", this is communicated to the user 44 and processing is finished. However, similar to the third exemplary embodiment, after the apparatus authentication simulator MPC is executed, a notification of "reject" may be made to the user 44. In this way, it is possible to arrange such that the user side assistance devices 43 do not know whether or not the user authentication result is "reject".

In the present exemplary embodiment, also, similar to the fourth exemplary embodiment, it is possible to fix an upper limit to the number of times that user authentication is rejected, and to improve security.

In the authentication system according to the present exemplary embodiment also, an effect similar to the above-mentioned exemplary embodiments is realized. That is, according to the authentication system of the present exemplary embodiment, in an authentication system that performs user authentication and apparatus authentication, it is possible to use a communication front end for an existing apparatus authentication server, without requiring a secure area within the user device. In the present exemplary embodiment, respective algorithms for authentication information derivation, verification information derivation and user authentication are stored in the user side assistance devices only. Therefore, according to the present exemplary embodiment, these algorithms may be hidden from user devices used by an unspecified large number of people.

Seventh Exemplary Embodiment

Next, a description is given concerning an authentication system according to a seventh exemplary embodiment, making reference to the drawings.

A configuration of the authentication system of the present exemplary embodiment is the same as the configuration of the first exemplary embodiment, excepting the following points.

In the first exemplary embodiment, the user device 41 is provided with a verification information distributed share generation part 4122. On the other hand, in the present exemplary embodiment, the user device 41 and the user side assistance devices 43 both participate in the "verification information distributed share generation". Unlike the first exemplary embodiment, "verification information distributed share generation" of the present exemplary embodiment does not have functionality of the verification information derivation part 41221 and the verification information distribution part 41222 in the first exemplary embodiment.

In the first exemplary embodiment, the user device 41 is provided with an authentication information distributed share generation part 4121. On the other hand, "authentication information distributed share generation" in the present exemplary embodiment is an MPC in which the user side assistance devices participate, and the user device 41 does not participate in this MPC. Unlike the first exemplary embodiment, "authentication information distributed share generation" of the present exemplary embodiment does not have functionality of the authentication information derivation part 41211 and the authentication information distribution part 41212 of the first exemplary embodiment.

The "verification information distributed share generation" of the present exemplary embodiment includes the following 4 processes.

User unique information distributed share creation for MPC input verification.

Verification information distributed share creation multi-party computation. Distributed share creation for storing.

Verification information distributed share reconstruction.

When a device that executes "creation of user unique information distributed share for MPC input verification" is executed, and for input and output, the following applies.

This processing is executed by the user device.

This processing is executed in user authentication advance preparation.

In this processing, the user unique information and the number M of user side assistance devices 43 are received as input, and user unique information distributed shares are outputted.

Details of "user unique information distributed share creation for MPC input verification" are as follows.

The user unique information E and the number M of user side assistance devices 43 are received as input.

Secret sharing of M items of the user unique information E is performed, and user unique information distributed shares (user unique information distributed shares for MPC input verification) e[1], . . . , e[M] are obtained. e[1], . . . , e[M] are outputted.

When a device that executes "verification information distributed share creation multi-party computation" is executed, and for input and output, the following applies.

This processing is an MPC in which the user side assistance device 43[1], . . . , user side assistance device 43[M] participate.

This processing is performed in user authentication advance preparation.

For i=1, . . . M, the user side assistance device 43[i] uses user unique information distributed share e[i] it holds, in an MPC, to obtain the verification information distributed share v[i] as output of the MPC.

When a device that executes "distributed share creation for storing" is executed, and for input and output, the following applies.

This processing is executed in user authentication advance preparation.

In this processing, verification information distributed shares are received as input, and distributed shares for storage are outputted.

In this processing, first for i=1, ... M, by the user side assistance device 43[i] performing execution, distributed shares for its own storage and data to be sent to the user device 41 are created. The user device 41 creates distributed shares for its own storage based on the data sent by the user side assistance device 43.

Details of "distributed share creation for storing" are as follows.

For i=1, ... , M, the user side assistance device 43[i] executes the following. Verification information distributed share v[i] is received as input, and by secret sharing that puts v[i] into 2 items, "distributed shares of the verification information distributed shares" u[i] and w[i] are obtained.

w[i] is a distributed share for storage of the user side assistance device 43[i] itself.

u[i] is sent to the user device 41.

The user device 41 executes the following.

For i=1, ... , M, u[i] is received from the user side assistance device 43[i].

W=(u[1], ... , u[M]) are distributed shares for storage of the user device 41.

When a device that executes "verification information distributed share reconstruction" is executed, and for input and output, the following applies.

This processing is executed in user authentication.

In this processing, distributed shares for storage are received as input, and verification information distributed shares are outputted.

In this processing, first the user device 41 sends information obtained from its own distributed shares for storage to the user side assistance device 43, and the user side assistance devices 43 compute user authentication from the data that has been sent and its own distributed shares for storage.
I
Details of "verification information distributed share reconstruction" are as follows.

For i=1, ... , M, the user device 41 sends data u[i] requested from its own distributed shares for storage W=(u[1], ... , u[M]) to the user side assistance device 43[i].

For i=1, ... M, the user side assistance device 43[i] uses data [i] sent by the user and its own distributed share for storage w[i] to perform reconstruction of secret shares, and obtain verification information distributed share v[i].

When a device that executes "authentication information distributed share generation" in the present exemplary embodiment is executed, and for input and output, the following applies.

This processing is executed at a time of user authentication.

This processing is an MPC in which the user side assistance device 43[1], ... , user side assistance device 43[M] participate.

For i=1, ... M, the user side assistance device 43[i] uses user unique information distributed shares it holds, in MPC, to obtain distributed shares of authentication information as output of the MPC.

The MPC of the "verification information distributed share creation multi-party computation" and the "authentication information distributed share generation" may receive pre-computation data as input, similar to other MPC in the first exemplary embodiment.

As mentioned in the first exemplary embodiment, the user side assistance devices 43, which are server machines, has much higher security in comparison with the user device 41, and log monitoring is also performed. At this time, even if, for example, an unauthorized party has hijacked a user side assistance device 43, it would be hard to envisage the user side assistance devices 43 performing actions outside of determined operations.

Therefore, in MPC of "verification information distributed share creation multi-party computation" and "authentication information distributed share generation", legitimacy proof and verification of a ZKIP system or MAC system, which are existing MPCs, are not necessary. Therefore, it is possible to execute these MPCs at high speed.

Next, among the operations of the first exemplary embodiment, a description is given of details that differ from the present exemplary embodiment.

First, the user side assistance device user authentication MPC part 4311[i] is similar to the user side assistance device user authentication MPC part 4311[i] of the sixth exemplary embodiment. That is, the user side assistance device user authentication MPC part 4311[i] receives a verification information distributed share v[i], an authentication information distributed share s[i] and pre-computation data (if it exists) as input, proceeds with computation of MPC while performing inter-communication with the user side assistance device user authentication MPC part 4311 of another user side assistance device 43, and outputs the authentication result distributed share a[i]. However, unlike the first exemplary embodiment, the user device 41 does not participate in this MPC. For reasons similar to the sixth exemplary embodiment, in the case of the present exemplary embodiment, when performing MPC it is possible to omit execution of a legitimacy proof verification part 94.

For reasons similar to the sixth exemplary embodiment, the user authentication result reconstruction part 4124 only receives M distributed shares as input.

It is to be noted that for reasons similar to the sixth exemplary embodiment, in the case of the present exemplary embodiment, by MPC performed by the user side assistance device user authentication MPC part 4311[i], it is possible to omit execution of the legitimacy proof verification part 94.

[User Authentication Advance Preparation]

The user authentication advance preparation is as follows.

First the user device 41 executes the following.

The acquisition part 4111 obtains user unique information E from the user 44. Using the user unique information E, "user unique information distributed share creation for MPC input verification" is executed, and user unique information distributed shares e[1], ... , e[M] are obtained as output.

Using the assistance communication part 4141 of the communication part 414, e[1] is transmitted to the user side assistance devices 43[1], ... , e[M] is transmitted to the user side assistance device 43[M].

The user unique information E and distributed shares e[1], ... , e[M] are deleted.

Next, for i=1, ... , M, the user side assistance device 43[i] executes the following.

The user device 41 receives the transmitted e[i] using the assistance communication part 4331[i] of the communication part 433[i].

An algorithm of a verification information derivation part and pre-computation data p[i] (if it exists) are read from the storage part 432, and by using e[i], pre-computation data p[i] (if it exists) and the verification information derivation part algorithm, the "verification information distributed share creation multi-party computation" is executed while performing inter-communication with the user side assistance devices 43. The verification information distributed share v[i] is obtained as output of this multi-party computation.

By inputting v[i] "distributed share creation for storing" is executed. As a result, the user side assistance device 43[i] obtains its own share for storage w[i] to store it in the distributed share database 4321[i], and the user device 41 obtains its own shares for storage W=(u[1], ..., u[M]).

The user side assistance device 43[i] deletes v[i], u[i].

The user device 41 executes the following.

The shares for storage W=(u[1], ..., u[M]) are stored in the storage part 413.

[Apparatus Authentication Advance Preparation]

This is the same as the first Exemplary Embodiment.

[User Authentication]

User authentication in the present exemplary embodiment is as follows.

The user device 41 executes the following.

The acquisition part 4111 obtains user unique information from the user 44.

The user unique information and the number M of user side assistance devices 43 are used to perform secret sharing of user unique information, and authentication information distributed shares f[1], ..., f[M] are obtained.

Distributed shares for storage W=(u[1], ..., u[M]) are read from the storage part 413.

For i=1, ..., M, f[i] and u[i] are transmitted to the user side assistance device 43[i] using the assistance communication part 4141 of the communication part 414.

The user unique information and f[1], ..., f[M] are deleted.

For i=1, ..., M, the user side assistance device 43[i] executes the following.

The assistance communication part 4331[i] of the communication part 433[i] is used to receive f[i] and u[i].

The distributed share database 4321[i] reads the share for storage w[i].

By inputting shares for storage u[i] and w[i] and executing "verification information distributed share reconstruction", the verification information distributed share v[i] is reconstructed.

An algorithm of an authentication information derivation part and pre-computation data q[i] (if it exists) are read from the storage part 432, and by using f[i], pre-computation data q[i] (if it exists) and the authentication information derivation part algorithm, the "authentication information distributed share generation" is executed while performing inter-communication with the "authentication information distributed share generation" of another user side assistance device 43, and authentication information distributed share s[i] is obtained as output.

An algorithm for user authentication and pre-computation data b[i] (if it exists) are read from the storage part 432, v[i], s[i] and b[i] (if they exist) and the algorithm for user authentication are inputted to the user side assistance device user authentication MPC part 4311[i], the user side assistance device user authentication MPC part 4311[i] is executed while performing inter-communication with the user side assistance device user authentication MPC part 4311 of another user side assistance device 43, and distributed share a[i] of the user authentication result is obtained as an execution result.

Using the assistance communication part 4331[i], a[i] is sent to the user part 41.

f[i], c[i], v[i], s[i] and a[i] are deleted.

The user device 41 executes the following.

a[1], ... a[M] are received using the assistance communication part 4141.

a[1], ... a[M] are inputted to the user authentication result reconstruction part 4124, and a user authentication result acc is obtained as output thereof.

A judgment is made as to whether the user authentication result acc is "accept" or "reject".

In a case where the user authentication result acc is "accept", the user device 41 receives apparatus authentication from the apparatus authentication server device 42, while being assisted by the user side assistance device 43[1], ..., user side assistance device 43[M].

In a case where the user authentication result is "reject", the user device 41 communicates that the authentication has been rejected to the user 44 via the notification part 415, and finishes.

In the present exemplary embodiment, similar to the sixth exemplary embodiment, after the apparatus authentication simulator MPC of the third exemplary embodiment is executed, a notification of "reject" may be made to the user 44. In this way, it is possible to arrange such that the user side assistance devices 43 do not know whether or not the user authentication result is "reject".

In the present exemplary embodiment also, similar to the fourth exemplary embodiment, it is possible to fix an upper limit to the number of times that user authentication is rejected, and to improve security.

In the authentication system according to the present exemplary embodiment also, an effect similar to the above-mentioned exemplary embodiments is realized. That is, according to the authentication system of the present exemplary embodiment, in an authentication system that performs user authentication and apparatus authentication, it is possible to use a communication front end for an existing apparatus authentication server, without requiring a secure area within the user device. In the present exemplary embodiment, respective algorithms for authentication information derivation, verification information derivation and user authentication are stored in the user side assistance devices only. Therefore, according to the present exemplary embodiment, these algorithms need not be disclosed to a user device used by an unspecified large number of people, and these algorithms may be protected as corporate secrets (for example, corporate secrets of a corporation providing a server side assistance device).

Eighth Exemplary Embodiment

Next, a description is given concerning an authentication system according to an eighth exemplary embodiment, making reference to the drawings.

A configuration of the authentication system of the present exemplary embodiment is the same as the configuration of the first exemplary embodiment, excepting the following points.

The present exemplary embodiment has server machines, known as a "user authentication information distributed share generation device" and a "user verification information distributed share generation device". Below the description is given assuming that these are separate server machines, but these may also be the same server machine.

In the first exemplary embodiment, the user device 41 is provided with a verification information distributed share generation part 4122. On the other hand in the present exemplary embodiment, the user device 41 does not have this unit, but a unit is provided in a user verification information distributed share generation device. A verification information distributed share generation part 4122, similar to the first exemplary embodiment, has a verification information derivation part 41221 and a verification information distribution part 41222.

In the first exemplary embodiment, the user device 41 is provided with the verification information distributed share generation part 4121. On the other hand, in the present exemplary embodiment the user device 41 does not have this unit, but a unit is provided in a user authentication information distributed share generation device. The authentication information distributed share generation part in the present exemplary embodiment, similar to the first exemplary embodiment, has an authentication information derivation part 41211 and an authentication information distribution part 41212.

In the present exemplary embodiment, unlike the first exemplary embodiment, neither verification information distributed shares nor authentication information distributed shares for the user device 41 are created. That is, the verification information distribution part 41222 only generates M shares held by a user side assistance device 43[1], . . . , user side assistance device 43[M]. Similarly, the authentication information distribution part 41212 only generates M shares held by the user side assistance device 43[1], . . . , user side assistance device 43[M].

In the present exemplary embodiment the user device 41 does not participate in user authentication MPC. Therefore, the user device 41 is not provided with the user device user authentication MPC part 4123. For i=1, . . . M, a user side assistance device user authentication MPC part 4311[i] of the user side assistance device 43[i] communicates with other user side assistance devices 43, but does not communicate with the user device 41.

Details of the present exemplary embodiment are as follows.

[User Authentication Advance Preparation]

The user device 41 obtains user unique information from the user 44, similar to Step 511 in FIG. 5. Next, the user device 41 sends the user unique information to the user verification information distributed share generation device. Thereafter, the user device 41 deletes the user unique information. The user verification information distributed share generation device executes Steps 512 to 516, instead of the user device 41. That is, the user verification information distributed share generation device executes the following.

The user verification information distributed share generation device inputs the user unique information received from the user device 41 to a verification information derivation part 41221, and obtains verification information. Next, verification information and the number M of user side assistance devices 43 are inputted to the verification information distribution part 41222, and distributed shares v[1], . . . , v[M] of verification information are obtained as output thereof. For i=1, . . . , M, the user verification information distributed share generation device sends verification information distributed shares v[i] to the user side assistance device 43[i]. Thereafter, the user verification information distributed share generation device deletes user unique information, verification information, and verification information distributed shares v[1], . . . , v[M].

For i=1, . . . , M, the user side assistance device 43[i] receives verification information distributed share v[i] to be stored in the distributed share database 4321[i].

[Apparatus Authentication Advance Preparation]

This is the same as the first Exemplary Embodiment.

[User Authentication]

Points of difference from the first exemplary embodiment are as follows.

The user device 41 obtains user unique information from the user 44, similar to Step 711 in FIG. 7. Next, the user device 41 sends the user unique information to the user verification information distributed share generation device. Thereafter, the user device 41 deletes the user unique information. The user authentication information distributed share generation device executes Steps 712 to 715 of FIG. 7, instead of the user device 41. That is, the user authentication information distributed share generation device executes the following.

The user authentication information distributed share generation device inputs the user unique information received from the user device 41 to the authentication information derivation part 41211, and obtains authentication information. Next, authentication information and the number M of user side assistance devices 43 are inputted to the authentication information distribution part 41212, and distributed shares s[1], . . . , s[M] of the authentication information are obtained as output thereof. For i=1, . . . , M, the user authentication information distributed share generation device sends s[i] to the user side assistance device 43[i]. Thereafter, the user authentication information distributed share generation device deletes the user unique information, authentication information, and authentication information distributed shares s[1], . . . , s[M].

Since a user device user authentication MPC part 4123 does not exist, Step 716 in FIG. 7 that reads input of the user device user authentication MPC part 4123 is unnecessary. Similarly, in Step 73 of FIG. 7, there is no processing related to the user device user authentication MPC part 4123. The user device 41 does not participate in the user authentication MPC of Step 73 of FIG. 7. For i=1, . . . M, the user side assistance device user authentication MPC part 4311[i] communicates with the user side assistance devices 43 but does not communicate with the user device 41. At this time, the user device 41 does not obtain a[0] as output of the user authentication MPC.

Since there is no a[0], in Step 752 of FIG. 7, a user authentication result is reconstructed from a[1], . . . , a[M].

It is to be noted that in the present exemplary embodiment it is assumed there is one user authentication information distributed share generation device and one user verification information distributed share generation device. However, by providing a plurality of these devices and executing MPC among the plurality of devices, the user authentication information distributed shares and verification information distributed shares may be computed.

In the authentication system according to the present exemplary embodiment also, an effect similar to the above-mentioned exemplary embodiments is realized. That is, according to the authentication system of the present exemplary embodiment, in an authentication system that performs user authentication and apparatus authentication, it is possible to use a communication front end for an existing apparatus authentication server, without requiring a secure area within the user device. In the present exemplary embodiment user authentication information and verification information, along with a dedicated server machine to compute shares thereof, instead of a user device, are provided. Therefore, according to the present exemplary embodiment, algorithms for deriving the authentication information and verification information need not be disclosed to a user device used by an unspecified large number of people, and the algorithms may be protected as corporate secrets (for example, corporate secrets of a corporation providing a dedicated server machine and a server side assistance device).

The disclosure of the present application may be applied to various uses. For example, authentication is used in many websites including payment systems. The disclosure of the present application may be widely used in authentication systems requiring this type of authentication. In particular, since the disclosure of the present application may use the front end of an existing authentication system as it is, for authentication systems already widely used as a defector standard including the FIDO system, usage is possible by only changing internal configuration of the user device.

(Note)

The entire scope of the claims of the present invention is incorporated below as exemplary embodiments. However, "claim" is to be read as "mode", and in this regard, dependent relationships merely indicate preferable relationships, and there is no limitation thereto.

The entire disclosed content of the abovementioned Non-Patent Literature is incorporated into this document by reference thereto. Modifications and adjustments of exemplary embodiments are possible within the bounds of the entire disclosure (including the scope of the claims) of the present invention, and also based on fundamental technological concepts thereof. Furthermore, various combinations and selections of various disclosed elements (including respective elements of the respective claims, respective elements of the respective exemplary embodiments, respective elements of the respective drawings, and the like) are possible within the scope of the entire disclosure of the present invention. That is, the present invention clearly includes every type of transformation and modification that a person skilled in the art can realize according to the entire disclosure including the scope of the claims and to technological concepts thereof. In particular, with regard to numerical ranges described in the present document, arbitrary numerical values and small ranges included in the relevant ranges should be interpreted to be specifically described even where there is no particular description thereof.

Figure 2:
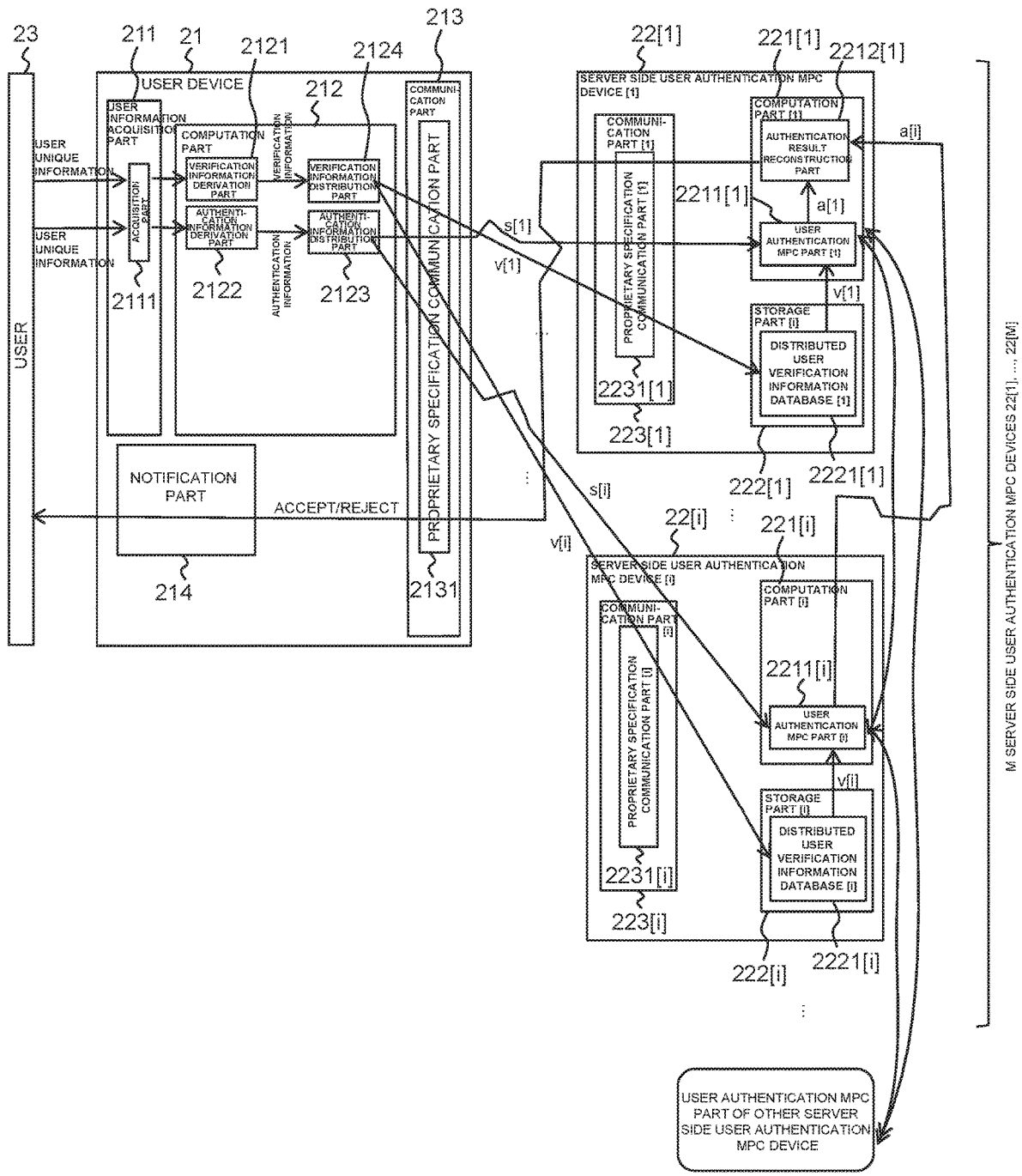
FIG. 2 is a block diagram showing an example of a configuration of a server side MPC system.
Figure 3:
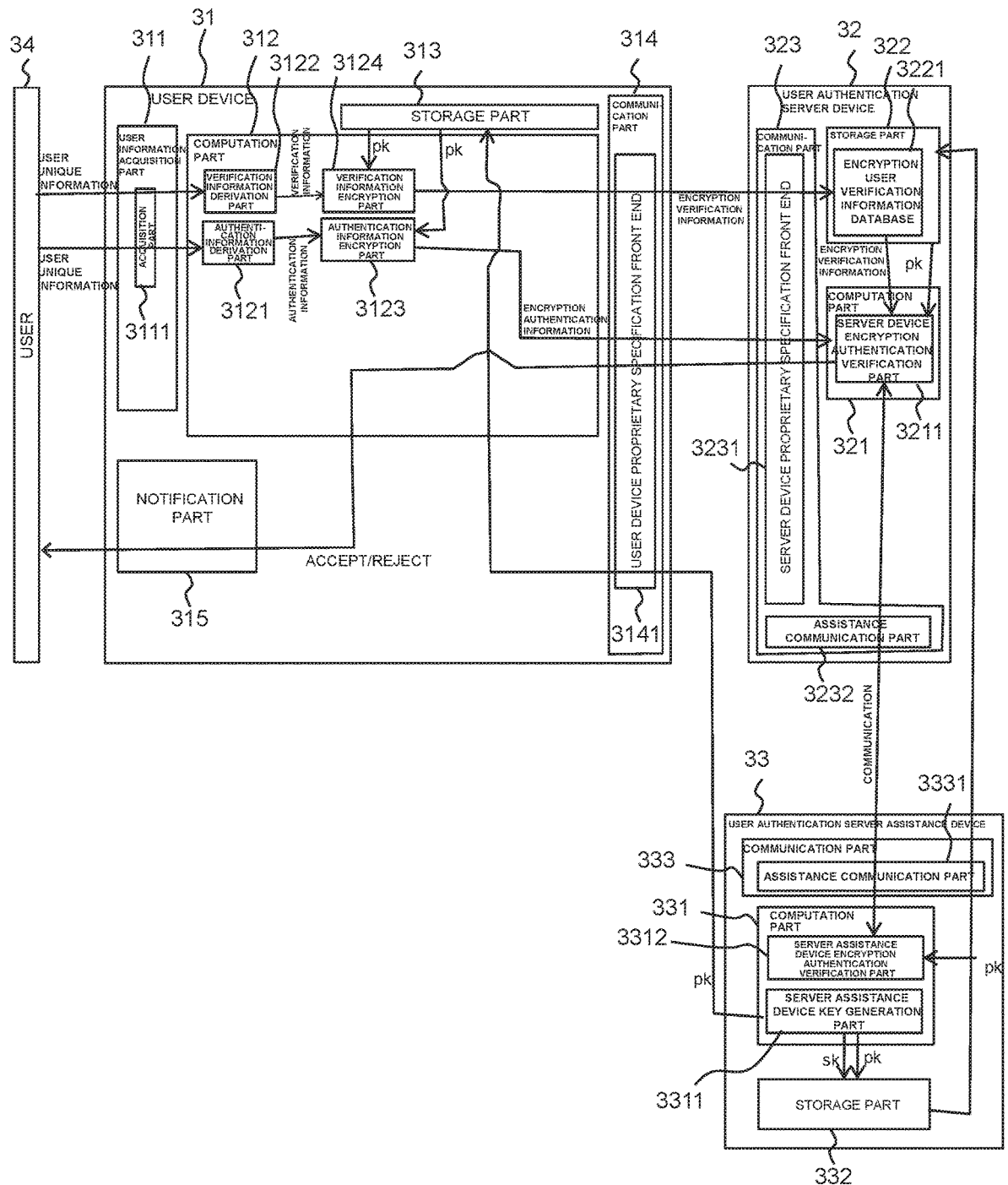
FIG. 3 is a block diagram showing an example of a configuration of an encrypted communication system.

REFERENCE SIGNS LIST (FIG. 1)
11 user device
111 user information acquisition part
1111 acquisition part
112 secure area
1121 computation part
11211 verification information derivation part
11212 authentication information derivation part
11213 user authentication part
11214 key pair generation part
11215 apparatus authentication part
1122 storage part
113 communication part
1131 user device front end
114 notification part
12 apparatus authentication server device
121 computation part
1211 user authentication method selection part
1212 apparatus authentication verification part
122 storage part
1221 public key database
123 communication part
1231 server device front end
13 user (FIG. 2)
21 user device
211 user information acquisition part
2111 acquisition part
212 computation part
2121 verification information derivation part
2122 authentication information derivation part
2123 authentication information distribution part
2124 verification information distribution part
213 communication part
2131 proprietary specification communication part
214 notification part
22 server side user authentication MPC device
221 computation part
2211 user authentication MPC part
2212 authentication result reconstruction part (server side user authentication MPC device 22[1] only)
222 storage part
2221 distributed user verification information database
223 communication part
2231 proprietary specification communication part
23 user (FIG. 3)
31 user device
311 user information acquisition part
3111 acquisition part
312 computation part
3121 authentication information derivation part
3122 verification information derivation part
3123 authentication information encryption part
3124 verification information encryption part
313 storage part
314 communication part
3141 user device proprietary specification front end
315 notification part
32 user authentication server device
321 computation part
3211 server device encryption authentication verification part
322 storage part
3221 encryption user verification information database
323 communication part
3231 server device proprietary specification front end
3232 assistance communication part
33 user authentication server assistance device
331 computation part
3311 server assistance device key generation part
3312 server assistance device encryption authentication verification part
332 storage part
333 communication part
3331 assistance communication part
34 user (FIG. 4)
41 user device
411 user information acquisition part
4111 acquisition part
412 computation part
4121 authentication information distributed share generation part
41211 authentication information derivation part
41212 authentication information distribution part
4122 verification information distributed share generation part
41221 verification information derivation part
41222 verification information distribution part
4123 user device user authentication MPC part 4124 user authentication result reconstruction part
4125 key pair generation part
4126 secret key distribution part
4127 user device apparatus authentication MPC part
413 storage part
414 communication part
4141 assistance communication part
4142 user device front end
415 notification part
42 apparatus authentication server device
421 computation part
4211 user authentication method selection part
4212 apparatus authentication verification part
422 storage part
4221 public key database
423 communication part
4231 server device front end
43 user side assistance device
431 computation part
4311 user side assistance device user authentication MPC part
4312 user side assistance device apparatus authentication MPC part
432 storage part
4321 distributed share database
433 communication part
4331 assistance communication part
44 user
(FIG. 8)
81 input part
82 temporary storage part
83 user authentication MPC execution part
84 legitimacy proof generation part
85 output part
(FIG. 9)
91 input part
92 temporary storage part
93 user authentication MPC execution part
94 legitimacy proof verification part
95 output part
(FIG. 11)
111 input part
112 receiving part
113 secret key use computation MPC execution part
114 secret key use computation legitimacy proof generation part
115 secret key unnecessary computation part
116 output part
(FIG. 12)
121 input part
122 secret key use computation MPC execution part
123 secret key use computation legitimacy proof verification part
124 output part
(FIG. 14)
141 input part
142 GC generation part
143 GC output generation part
144 output part
(FIG. 15)
151 input part
152 GC execution part
153 output part
(FIG. 17)
17 apparatus authentication simulator MPC part
171 input part
172 receiving part
173 secret key use computation MPC execution part
174 secret key use computation legitimacy proof generation part
175 secret key unnecessary computation part
176 public key authentication verification part
177 output part

What is claimed is:

1. An authentication system, comprising:

a user device;

one or more user side assistance device to assist user authentication that authenticates a user of said user device, and apparatus authentication that authenticates said user device; and an apparatus authentication server device to perform said apparatus authentication in association with said user device; wherein said one or more user side assistance device use distributed shares of verification information to perform multi-party computation for said user authentication in association with said user device, and use distributed shares of a secret key generated by said user device to perform multi-party computation for said apparatus authentication in association with said user device, said system is configured to perform user authentication advance preparation, user authentication, verification information distributed share generation, apparatus authentication advance preparation and apparatus authentication, in said user authentication advance preparation, necessary information is prepared prior to said user authentication, in said apparatus authentication preparation, necessary information is prepared prior to said apparatus authentication, in said user authentication advance preparation, user unique information for verification, which is unique information of a user that holds said user device, is obtained, in said verification information distributed share generation, verification information distributed shares are computed, which are distributed shares of verification information for checking with information obtained in said user authentication from said user unique information for verification, said one or more user side assistance device obtains said verification information distributed shares, some or all of said verification information distributed share generation is performed in said user authentication advance preparation, if some of said verification information distributed share generation is performed in said user authentication advance preparation, and remainder of said verification information distributed share generation is performed in said user authentication, in said apparatus authentication advance preparation, said secret key of said user device is created, said user device performs secret sharing of said secret key, a few of plural secret key distributed shares generated by said secret sharing are sent to said one or more user side assistance device, and said one or more user side assistance device store said secret key distributed shares, in said user authentication, user unique information for authentication, which is unique information of said user, is obtained, said user is authenticated by using said user unique information for authentication or information calculated from said user unique information for authentication to execute user authentication multi-party computation, said one or more user side assistance device use said verification information distributed shares to participate in said user authentication multi-party computation, and said one or more user side assistance device, as a result of said user authentication multi-party computation, obtain user authentication result distributed shares that are distributed shares of data indicating whether said user has been accepted or rejected, in said apparatus authentication, by said user device communicating with said apparatus authentication server device, authentication is received from said apparatus authentication server device, said user device and said apparatus authentication server device perform communication one or a plurality of times, said apparatus authentication server device creates data necessary for verification of said apparatus authentication and transmits to said user device, said user device receives data necessary for said verification sent by said apparatus authentication server, and said user device creates data necessary for proof of said apparatus authentication by communicating with said one or more user side assistance device, in order to create data necessary for said proof said user device transmits, to said one or more user side assistance device, data obtained by processing, as necessary, data that is necessary for said verification sent by said apparatus authentication server, said one or more user side assistance device use said secret key distributed shares and data necessary for said verification that has been processed as necessary, and has been sent by said user device, to perform apparatus authentication multi-party computation, and said user device uses a plurality of distributed shares obtained as a result of said apparatus authentication multi-party computation, to send, to said apparatus authentication server, reconstructed data processed as necessary, as data necessary for said proof.

2. The authentication system according to claim 1, wherein in said user authentication, execution is performed of authentication information distributed share generation that creates authentication information distributed shares which are distributed shares of said user unique information for authentication;
   said one or more user side assistance device obtains said authentication information distributed shares; and
   said one or more user side assistance device use said authentication information distributed shares in said user authentication multi-party computation.

3. The authentication system according to claim 2, wherein said user device holds one of said verification information distributed shares which is output of said verification information distributed shares generation,
   said user device holds one of said authentication information distributed shares which is output of said authentication information distributed shares generation,
   said user device participates in said user authentication multi-party computation, said user device uses said verification information distributed share and said authentication information distributed share, that are self-held, in said user authentication multi-party computation, and
   said user device obtains said one or more user authentication result distributed share as a result of said user authentication multi-party computation.

4. The authentication system according to claim 3, wherein
   in said user authentication multi-party computation, only said user device creates a legitimacy proof indicating legitimacy of data send by itself, and
   said one or more user side assistance device verifies said legitimacy proof.

5. The authentication system according to claim 4 wherein, in said user authentication multi-party computation, said legitimacy proof created by said user device is Zero-Knowledge Interactive Proof (ZKIP).

6. The authentication system according to claim 4 wherein, in said user authentication multi-party computation, said legitimacy proof created by said user device is Message Authentication Code (MAC).

7. The authentication system according to claim 1, wherein
   a Secure Function Evaluation system is used as said user authentication multi-party computation.

8. The authentication system according to claim 7 wherein said Secure Function Evaluation system used in said user authentication multi-party computation is a Garbled Circuit method.

9. The authentication system according to claim 2, wherein a Garbled Circuit (GC) method or another Secure Function Evaluation system is used as said user authentication multi-party computation,
   in said Secure Function Evaluation system said one or more user side assistance device make a request to said user device for computation of function f(a,b) holding 2 variables a and b as arguments,
   said user device uses said authentication information distributed share held by said user device as said a, with regard to said request for computation from said one or more user side assistance device, and uses said verification information distributed share held by said user device as said b,
   said function f(a,b) is a function that uses said a and said authentication information distributed share held by said one or more user side assistance device to reconstruct authentication information x, uses said b and said verification information distributed share held by said one or more user side assistance device to reconstruct authentication information y, and uses said authentication information x and said verification information y to perform user authentication, and output an authentication result.

10. The authentication system according to claim 7, wherein
   in said user authentication, said user device computes authentication information for said user from said user unique information for authentication,
   in said Secure Function Evaluation, said one or more user side assistance device makes a request to said user device for computation of a function g(a,b) having 2 variables a and b as arguments,
   said user device, with regard to said computation request from said one or more user side assistance device, uses said authentication information held by said user device as said a, and uses said authentication information distributed share held by said user device as said b, and
   said function g(a,b) is a function that uses said b and said verification information distributed shares held by said one or more user side assistance device to reconstruct verification information y, uses said authentication information a and said verification information y to perform user authentication, and outputs an authentication result.

11. The authentication system according to claim 2 wherein
said user device does not hold said one or more verification information distributed share, and
said user device does not participate in said user authentication multi-party computation.

12. The authentication system according to claim 1, wherein, in said apparatus authentication advance preparation,
said user device, by executing key generation of a public key authentication system, creates said secret key for said user device and a public key for said user,
said user device transmits said public key to said one or more user side assistance device and said apparatus authentication sever device,
said server side assistance device and said apparatus authentication server device store said received pubic key, in said apparatus authentication,
said apparatus authentication server device, by sending and receiving data based on said public key authentication system, verifies said apparatus authentication of said user device, and
said user device, by sending and receiving data based on said public key authentication system, receives said apparatus authentication from said apparatus authentication server device.

13. The authentication system according to claim 12, wherein said user device holds one of said secret key distributed shares generated in said apparatus authentication advance preparation,
said user device participates in said apparatus authentication multi-party computation,
said user device uses said one or more secret key distributed share that are self-held, in said apparatus authentication multi-party computation, and
said user device obtains one of said distributed shares as a result of said apparatus authentication multi-party computation.

14. The authentication system according to claim 13, wherein in said apparatus authentication multi-party computation,
said user device only creates a legitimacy proof indicating legitimacy of data send by itself, and
said one or more user side assistance device verifies said legitimacy proof.

15. The authentication system according to claim 14 wherein in said apparatus authentication multi-party computation, said legitimacy proof created by said user device is Zero-Knowledge Interactive Proof (ZKIP).

16. The authentication system according to claim 14 wherein in said apparatus authentication multi-party computation, said legitimacy proof created by said user device is Message Authentication Code (MAC).

17. The authentication system according to claim 13, wherein in said public key authentication performed in said apparatus authentication,
in an answer computation process that computes data returned by said user device to said apparatus authentication server from data sent to said user device from said apparatus authentication server,
a computation that does not use said secret key in said answer computation process is executed by said user device or one of said one or more user side assistance device, and
a computation that uses said secret key in said answer computation process is computed by executing said apparatus authentication multi-party computation.

18. An authentication method in an authentication system, comprising:
a user device; one or more user side assistance device to assist user authentication that authenticates a user of said user device and apparatus authentication that authenticates said user device; and an apparatus authentication server device that performs said apparatus authentication in association with said user device,
said method comprising:
generating, by said user device, distributed shares of a secret key; performing multi-party computation for said user authentication in association with said one or more user side assistance device using distributed shares of verification information; and
performing multi-party computation for said apparatus authentication in association with said one or more user side assistance device using distributed shares of said secret key,
said system is configured to perform user authentication advance preparation, user authentication, verification information distributed share generation, apparatus authentication advance preparation and apparatus authentication,
in said user authentication advance preparation, necessary information is prepared prior to said user authentication,
in said apparatus authentication preparation, necessary information is prepared prior to said apparatus authentication,
in said user authentication advance preparation, user unique information for verification, which is unique information of a user that holds said user device, is obtained,
in said verification information distributed share generation, verification information distributed shares are computed, which are distributed shares of verification information for checking with information obtained in said user authentication from said user unique information for verification, said one or more user side assistance device obtains said verification information distributed shares, some or all of said verification information distributed share generation is performed in said user authentication advance preparation, if some of said verification information distributed share generation is performed in said user authentication advance preparation, and remainder of said verification information distributed share generation is performed in said user authentication,
in said apparatus authentication advance preparation, said secret key of said user device is created, said user device performs secret sharing of said secret key, a few of plural secret key distributed shares generated by said secret sharing are sent to said one or more user side assistance device, and said one or more user side assistance device store said secret key distributed shares,
in said user authentication, user unique information for authentication, which is unique information of said user, is obtained, said user is authenticated by using said user unique information for authentication or information calculated from said user unique information for authentication to execute user authentication multi-party computation, said one or more user side assistance device use said verification information distributed shares to participate in said user authentication multi-party computation, and said one or more user side assistance device, as a result of said user authentication multi-party computation, obtain user authentication result distributed shares that are distributed shares of data indicating whether said user has been accepted or rejected, in said apparatus authentication, by said user device communicating with said apparatus authentication server device, authentication is received from said apparatus authentication server device, said user device and said apparatus authentication server device perform communication one or a plurality of times, said apparatus authentication server device creates data necessary for verification of said apparatus authentication and transmits to said user device, said user device receives data necessary for said verification sent by said apparatus authentication server, and said user device creates data necessary for proof of said apparatus authentication by communicating with said one or more user side assistance device, in order to create data necessary for said proof said user device transmits, to said one or more user side assistance device, data obtained by processing, as necessary, data that is necessary for said verification sent by said apparatus authentication server, said one or more user side assistance device use said secret key distributed shares and data necessary for said verification that has been processed as necessary, and has been sent by said user device, to perform apparatus authentication multi-party computation, and said user device uses a plurality of distributed shares obtained as a result of said apparatus authentication multi-party computation, to send, to said apparatus authentication server, reconstructed data processed as necessary, as data necessary for said proof.

19. A non-transitory computer-readable recording medium storing a program in an authentication system, comprising:
   a user device; one or more user side assistance device to assist user authentication that authenticates a user of said user device and apparatus authentication that authenticates said user device; and an apparatus authentication server device that performs said apparatus authentication in association with said user device;
   said program executing, by a computer provided in said user device: a process of generating distributed shares of a secret key; a process of performing multi-party computation for said user authentication in association with said one or more user side assistance device using distributed shares of verification information; and
   a process of performing multi-party computation for said apparatus authentication in association with said one or more user side assistance device using distributed shares of said secret key,
   said system is configured to perform user authentication advance preparation, user authentication, verification information distributed share generation, apparatus authentication advance preparation and apparatus authentication,
   in said user authentication advance preparation, necessary information is prepared prior to said user authentication,
   in said apparatus authentication preparation, necessary information is prepared prior to said apparatus authentication,
   in said user authentication advance preparation, user unique information for verification, which is unique information of a user that holds said user device, is obtained,
   in said verification information distributed share generation, verification information distributed shares are computed, which are distributed shares of verification information for checking with information obtained in said user authentication from said user unique information for verification, said one or more user side assistance device obtains said verification information distributed shares, some or all of said verification information distributed share generation is performed in said user authentication advance preparation, if some of said verification information distributed share generation is performed in said user authentication advance preparation, and remainder of said verification information distributed share generation is performed in said user authentication,
   in said apparatus authentication advance preparation, said secret key of said user device is created, said user device performs secret sharing of said secret key, a few of plural secret key distributed shares generated by said secret sharing are sent to said one or more user side assistance device, and said one or more user side assistance device store said secret key distributed shares,
   in said user authentication, user unique information for authentication, which is unique information of said user, is obtained, said user is authenticated by using said user unique information for authentication or information calculated from said user unique information for authentication to execute user authentication multi-party computation, said one or more user side assistance device use said verification information distributed shares to participate in said user authentication multi-party computation, and said one or more user side assistance device, as a result of said user authentication multi-party computation, obtain user authentication result distributed shares that are distributed shares of data indicating whether said user has been accepted or rejected,
   in said apparatus authentication, by said user device communicating with said apparatus authentication server device, authentication is received from said apparatus authentication server device, said user device and said apparatus authentication server device perform communication one or a plurality of times, said apparatus authentication server device creates data necessary for verification of said apparatus authentication and transmits to said user device, said user device receives data necessary for said verification sent by said apparatus authentication server, and said user device creates data necessary for proof of said apparatus authentication by communicating with said one or more user side assistance device,
   in order to create data necessary for said proof said user device transmits, to said one or more user side assistance device, data obtained by processing, as necessary, data that is necessary for said verification sent by said apparatus authentication server, said one or more user side assistance device use said secret key distributed shares and data necessary for said verification that has been processed as necessary, and has been sent by said user device, to perform apparatus authentication multi-party computation, and said user device uses a plurality of distributed shares obtained as a result of said apparatus authentication multi-party computation, to send, to said apparatus authentication server, reconstructed data processed as necessary, as data necessary for said proof.

* * * * *